(12) United States Patent
Haberman

(10) Patent No.: US 10,858,818 B2
(45) Date of Patent: Dec. 8, 2020

(54) INTERLOCKING BUILDING SYSTEM USING ONE-PIECE SKIN-AND-FRAME PANELS, VACUUM-INSULATION, VERTICAL SLIDE-LOCKS, MULTI-STORY SLIDES, AND SNAP-LOCKS

(71) Applicant: Kurt Evan Haberman, North Freedom, WI (US)

(72) Inventor: Kurt Evan Haberman, North Freedom, WI (US)

( * ) Notice: Subject to any disclaimer, the term of this patent is extended or adjusted under 35 U.S.C. 154(b) by 0 days.

(21) Appl. No.: 15/731,693

(22) Filed: Jul. 18, 2017

(65) Prior Publication Data
US 2019/0024360 A1    Jan. 24, 2019

(51) Int. Cl.
| | |
|---|---|
| *E04B 1/08* | (2006.01) |
| *E04B 1/32* | (2006.01) |
| *E04B 1/342* | (2006.01) |
| *E04B 1/61* | (2006.01) |
| *E04B 1/76* | (2006.01) |
| *E04B 1/35* | (2006.01) |

(Continued)

(52) U.S. Cl.
CPC .............. *E04B 1/08* (2013.01); *E04B 1/3211* (2013.01); *E04B 1/342* (2013.01); *E04B 1/35* (2013.01); *E04B 1/54* (2013.01); *E04B 1/76* (2013.01); *E04C 2/08* (2013.01); *E04C 2/34* (2013.01); *E04C 2/36* (2013.01); *E04C 2/384* (2013.01); *E04C 2/50* (2013.01); *E04C 2/526* (2013.01); *E04B 1/803* (2013.01); *E04B 2001/0061* (2013.01); *E04B 2001/3276* (2013.01); *E04B 2001/3288* (2013.01); *E04B 2001/3588* (2013.01); *E04B 2103/06* (2013.01); *E04C 2/48* (2013.01); *E04C 2002/004* (2013.01); *E04H 9/02* (2013.01); *E04H 9/04* (2013.01); *E04H 9/14* (2013.01); *E04H 9/145* (2013.01)

(58) Field of Classification Search
CPC .......... E04B 1/08; E04B 1/3211; E04B 1/342; E04B 1/35; E04B 1/54; E04B 1/76; E04B 2001/0061; E04B 2001/3276; E04B 2001/3288; E04B 2001/3588; E04B 2103/06; E04B 2001/0069; E04C 2/08; E04C 2/34; E04C 2/48; E04C 2/50; E04C 2/526; E04C 2/528; E04H 9/02; E04H 9/04; E04H 9/14; E04H 9/145
USPC ............................ 52/80.1, 81.1, 81.3, 81.4
See application file for complete search history.

(56) References Cited

U.S. PATENT DOCUMENTS

| | | | | |
|---|---|---|---|---|
| 2,670,298 | A | * | 2/1954 | Frokjaer-Jensen .... C04B 20/068 501/84 |
| 2,908,236 | A | * | 10/1959 | Kiewitt ................... E04B 7/105 52/81.2 |

(Continued)

*Primary Examiner* — William V Gilbert

(57) ABSTRACT

A system of structural interlocking panels for forming disaster-resistant buildings, comprising: a hollow, internally-braced, vacuum-insulated panel shell having at least two interlocking sides, the first side having a convex-inward single-curvature, the second side having a straight surface, the third side having a straight surface with at least one integral tongue with at least one head extending vertically-upward for receiving a complementary groove of a first side of an adjacent panel. Panels are thus vertically slide-locked along panel sides and faces, thereby triggering automatic snap joints that prevent backward movement of the panel. The system can assemble spheres, cylinders, toroids, tetrahedrons, flat shapes, and irregular shapes.

12 Claims, 42 Drawing Sheets

(51) Int. Cl.
  *E04C 2/08*   (2006.01)
  *E04C 2/34*   (2006.01)
  *E04B 5/02*   (2006.01)
  *E04C 2/52*   (2006.01)
  *E04C 2/38*   (2006.01)
  *E04C 2/36*   (2006.01)
  *E04B 2/00*   (2006.01)
  *E04B 1/00*   (2006.01)
  *E04H 9/02*   (2006.01)
  *E04H 9/04*   (2006.01)
  *E04H 9/14*   (2006.01)
  *E04C 2/00*   (2006.01)
  *E04B 1/80*   (2006.01)

(56) References Cited

U.S. PATENT DOCUMENTS

| | | | | |
|---|---|---|---|---|
| 3,077,961 A * | 2/1963 | Deicke | ............... | E04B 7/105 |
| | | | | 403/217 |
| 3,655,090 A * | 4/1972 | Rothrock | ............... | F16J 13/12 |
| | | | | 220/298 |
| 3,942,290 A * | 3/1976 | O'Sheeran | ............... | E04B 1/6137 |
| | | | | 52/57 |
| 4,726,974 A * | 2/1988 | Nowobilski | ............... | B32B 15/08 |
| | | | | 428/69 |
| 5,007,666 A * | 4/1991 | Kyfes | ............... | B29C 65/58 |
| | | | | 138/162 |
| 5,247,773 A * | 9/1993 | Weir | ............... | E01F 8/0011 |
| | | | | 52/592.3 |
| 5,452,555 A * | 9/1995 | Lee | ............... | E04B 1/3211 |
| | | | | 403/388 |
| 5,500,305 A * | 3/1996 | Bridges | ............... | E04B 1/803 |
| | | | | 428/621 |
| 5,628,154 A * | 5/1997 | Gavette | ............... | E04B 1/3211 |
| | | | | 52/81.4 |
| 5,900,299 A * | 5/1999 | Wynne | ............... | B29C 44/1266 |
| | | | | 156/257 |
| 6,192,634 B1 * | 2/2001 | Lopez | ............... | E04B 1/32 |
| | | | | 52/639 |
| 6,216,410 B1 * | 4/2001 | Haberman | ............... | E04B 1/02 |
| | | | | 52/591.1 |
| 6,308,490 B1 * | 10/2001 | Saebi | ............... | E04B 1/32 |
| | | | | 52/200 |
| 6,397,548 B1 * | 6/2002 | Martin | ............... | E04B 1/6125 |
| | | | | 403/334 |
| 6,782,939 B2 * | 8/2004 | Perks | ............... | B60J 5/14 |
| | | | | 160/235 |
| 6,804,926 B1 * | 10/2004 | Eisermann | ............... | B27F 1/04 |
| | | | | 52/592.1 |
| 6,823,638 B2 * | 11/2004 | Stanchfield | ............... | E04F 15/02 |
| | | | | 52/586.2 |
| 7,600,354 B2 * | 10/2009 | Knauseder | ............... | E04F 15/02 |
| | | | | 52/578 |
| 8,074,418 B2 * | 12/2011 | Thiagarajan | ............... | E04C 2/543 |
| | | | | 403/290 |
| 8,281,529 B2 * | 10/2012 | Cluff | ............... | E04B 1/26 |
| | | | | 52/271 |
| 8,342,474 B2 * | 1/2013 | Gilbreath | ............... | F16L 3/222 |
| | | | | 165/162 |
| 8,365,474 B2 * | 2/2013 | McSweeney | ............... | E04B 1/3211 |
| | | | | 52/81.1 |
| 2016/0332411 A1 * | 11/2016 | Weissteiner | ............... | B27M 3/0066 |

* cited by examiner

INTERLOCKING BUILDING SYSTEM USING ONE-PIECE SKIN-AND-FRAME PANELS, VACUUM-INSULATION, VERTICAL SLIDE-LOCKS, MULTI-STORY SLIDES, AND SNAP-LOCKS

FIELD OF THE INVENTION

The present invention relates to a heavy-duty interlocking building system, and more specifically, to a sequential set of one-piece, vacuum-insulated, skin-and-frame panels with vertically slide-locking sides and snap-locks that interlock with the vertically slide-locking sides and snap-locks of adjacent skin-and-frame panels to form a durable linear or curved wall, floor, foundation, dome, retaining-wall, or the like.

BRIEF DESCRIPTION OF THE PRIOR ART

Large-scale building construction is typically performed by the conventional process of erecting a metal or concrete frame on a reinforced-concrete foundation, pouring concrete floor slabs on the ground, pouring upper concrete floor slabs on metal-decking, applying tar or rubber sealant to a roof deck, adding an enclosure, such as: brick, concrete block, marble, limestone, aluminum siding, or the like, and adding interior elements such as enclosure insulation, non-structural walls with aluminum studs, sound insulation, drywall, wood paneling, plaster, utilities, or the like, and other elements such as floor tiles and suspended ceiling tiles. Such conventional building techniques have numerous disadvantages. A large amount of specialized skilled labor from a number of different construction trades is required for preparing and installing the building materials, including such tasks as welding, brazing, sizing and cutting, and installing rivets, bolts, screws, nails, adhesives, and other like parts. Additionally, much material, such as: concrete formwork and cut pieces of drywall, insulation boards, floor tiles, and ceiling tiles ends up in landfills.

Further, most concrete and steel buildings are built with separate frames, walls, and enclosures that do not work together to resist extreme natural and man-made disasters, such as, but not limited to: man-made explosions, earthquakes and liquifaction, tornadoes, hurricanes, tsunamis, volcanic explosions, fires, floods, avalanches, and mud-slides. Also, with conventional construction, special joints are required between dissimilar materials with varying rates of thermal expansion and contraction, requiring a significant amount of skilled-labor man-hours.

Furthermore, conventional wooden or aluminum structures have the disadvantages of cracking concrete floor slabs, foundations, and plaster wall surfaces due to settling of the earth, all of which can allow penetration of the structure by insects, water, and high levels of harmful radon gas. Such structures also produce a great deal of waste from the sizing and cutting of materials, such as, but not limited to, insulation boards, drywall, aluminum or wood siding, gutters, tar paper, and the like. Further yet, most attempts to solve these problems focus mainly on particular parts of a building, such as the walls, floors, or siding, and not the whole building. These structures also have very low resistance to natural disasters and especially man-made disasters.

In this context, efforts to strengthen and simplify building structural systems have produced several advanced braced-dome structures, and more particularly, lamella braced-domes. Lamella domes exhibit the same maximum rigidity as geodesic domes, but have only seventy-percent of their strength, except in long-spans, where a lamella dome becomes the system of choice. The largest dome on earth, the Louisiana Superdome, is a lamella dome. This dome and others are disclosed by U.S. Pat. No. 2,908,236 to Kiewitt, U.S. Pat. No. 3,077,961 to Deicke, and U.S. Pat. No. 6,192,634 to Lopez.

Such domes are usually provided with a deep metal frame and a separate attached lightweight skin. In the case of the Superdome, however, the sheet-metal skins proved to detach from the rivets in particular areas of the dome, allowing heavy rain to penetrate the structure, thereby highlighting the need for a more durable connection between frames and skins. In this way, a large number of efforts to form more durable structures have focused on the joints of interlocking structural systems, often an integral part of a one-piece panel, and often using dovetail interlocks. In a broader context, another very common type of joint is a vertically slide-locking joint, which is disclosed by U.S. Pat. No. 5,380,579 to Bianchi, U.S. Pat. No. 7,621,691 to Hannah, U.S. Pat. No. 1,032,674 to Holland, U.S. Pat. No. 4,769,963 to Meyerson, DE Pat. No. 1,609,310 to Fink, U.S. Pat. No. 5,165,213 to Finch et al., and U.S. Pat. No. 9,528,241 to Hargrave et al.

One type of vertically slide-locking joint has several similarities to the joint of the present invention and is disclosed by U.S. Pat. No. 6,250,035 to Bristow et al. The similarities between the two are vertical grooves with upper semi-circular pocket-joints and vertical tongues that conceal catch-surfaces beneath their sides, all of which is repeated across a given length of a panel side. The main difference between the two is that the present invention additionally provides heavy-duty features, such as: angled vertical catch-surfaces with angled armatures and integral angled supports beside tongue necks; durable snap-locks along the upper and lower panel sides; rounded tongue-heads along the lower panel side; and a maximized total linear distance of the catch-surfaces by way of small spacings between interlocks, thereby increasing the strength of the joint.

Other known joints provide horizontal interlocks and are disclosed by U.S. Pat. No. 3,942,290 to O'Sheeran, U.S. Pat. No. 8,342,474 B2 to Gilbreath, U.S. Pat. No. 7,600,354 to Knauseder, EP Pat. No. 1,736,613 to Chris et al., and U.S. Pat. No. 8,281,529 to Cluff.

Such joints generally do not use gravity to assist panel placements as do vertical slide-locks. Still other known joints provide fitted joints, snap joints, and rotation joints, and are disclosed by U.S. Pat. No. 6,397,548 to Martin et al., U.S. Pat. No. 3,655,090 to Rothrock et al., DE Pat. No. 9,212,050 to Grisley, U.S. Pat. No. 5,007,666 to Kyfes, U.S. Pat. No. 5,247,773 to Weir, U.S. Pat. No. 6,804,926 to Eisermann, U.S. Pat. No. 6,823,638 to Stanchfield, U.S. Pat. No. 6,782,939 to Perks, and CA Pat. No. 2,670,298 to Michalk et al.

These joints do not use a forged metal head bonded to a horizontally-acting compressible-solid that first retracts under pressure from an adjacent slide-locking panel, and secondly, expands with enough shape-memory and rebound to drive the head directly into the mating void of an opposite panel. Further, all panels of the present invention have widely-spaced hollow cores with internal perforated braces that allow a complete vacuum to be drawn through a single sealed vacuum-port in the panel shell. Vacuum, in turn, is the best sound and heat insulator known to humankind. Several walls and methods involving a vacuum are disclosed by U.S. Pat. No. 4,726,974 to Nowcbliski et al., U.S. Pat. No. 5,500,305 to Bridges et al., U.S. Pat. No. 5,900,299 to Wynne, U.S. Pat. No. 9,157,230 to Feinerman et al, and CA Pat. No. 2,775,977 to D'aoust.

Such vacuum-insulation systems typically use an evacuated honeycomb core made of an insulating plastic that adheres to a sheet-metal skin on both of its faces, sometimes with a barrier, or multiple barriers, that minimize leakage of the vacuum. Such panel constructions may work well as insulators. However, the entire honeycomb structure and such barriers are completely unecessary when compared to a widely-spaced forge-welded double-walled structure having large evacuated spaces connected together through the perforations of the integral internal bracing. Also, such honeycomb panels and all others that use sheet-metal skins simply do not resist extreme natural and man-made disasters, for they can crimp, puncture, bend, and tear under unexpected heavy live-loads, whereas the present invention has relatively-thick sides and faces that resist such damage.

Accordingly, what is needed but not found or suggested in the prior art is a heavy-duty interlocking building system of one-piece, double-sided, vacuum-insulated, skin-and-frame panels built of a single material and a single repeated joint to eliminate varying rates of expansion and contraction inside the joints, with vertically slide-locking sides and snap-locks that exhibit efficient material usage with enough durability to resist heavy loads from natural and man-made disasters, such as, but not limited to: explosions, building fires, tornadoes, hurricanes, tsunamis, floods, earthquakes, wildfires, liquifaction, sinkholes, volcanic explosions, mudslides, and in rare cases, continental drift.

SUMMARY OF THE INVENTION

Generally described, the first preferred embodiment of the present invention provides a heavy-duty interlocking building system wherein internally-braced vacuum-insulated panels interlock with adjacent panels to form a building structure that is capable of withstanding the most extreme loads caused by natural and man-made disasters. The overall shape of the first preferred embodiment also resists such loads, for it is entirely convex-outward, having resistance to all loads acting on the enclosure from the outside, whether they are from above, below, or the sides.

All panels of the system are first joined together by a straight-downward sliding motion along all panel sides. The locking actions occur when a series of vertical tongues with rounded tips fully penetrate a series of vertical grooves with rounded pocket joints that stop the sliding action. Additionally, a series of snap-lock has cavities in half of the system panels and mating inserts in the other half, such that the features lock in place when the cavities and inserts align at the ends of panel sliding motions, thereby preventing backward movement of all panels.

Each snap joint consists of: a rectangular cavity inside a first panel side; a wedge-shaped cavity inside a second panel side; a wedge-shaped head that projects from the rectangular cavity; and a rectangular block of a compressible solid that adheres to both the back-surface of the rectangular cavity and the inner-surface of the wedge-shaped head, having sufficient shape-memory and rebound to drive the wedge-shaped head into the wedge-shaped cavity of the first preferred embodiment. The compressible solid of the snap joint is preferably composed of Teflon, as it provides a high compressibility factor of fifty-percent. Other materials may work for this function, including materials that are known to those skilled in the art. Alternatively, a spring-loaded insert-lock can be used.

All panels of the interlocking building system are insulated against sound-transmission, heat-gain, and heat-loss by an internal vacuum that is contained by the dense metal sides and faces of the panels without the need for internal foils, sheets, foams, or the like. The vacuum is produced in the panel by way of an open threaded vacuum-port for receiving a simple, threaded, open/close ball-valve that becomes a permanent fixture of the panel and connects with a portable heavy-duty vacuum-pump by way of a high-performance steel-braided hose, or the like. All panels of the building system have internal structural braces with large perforations that allow a single vacuum to be drawn throughout the panel interior. The close spacings between the internal panel perforations are such that a very small amount of sound or heat will pass through the material being used there. Also, all vacuum-ports are located in the panel faces of the building interior, such that: foundation panels have a vacuum-port in their upper face; interior-wall panels and perimeter-wall panels have ports in their interior faces; and floor-panels and dome-panels have ports in their lower faces.

A first preferred embodiment of the present invention provides: a spheric foundation assembled of double-curved panels that are shaped as triangles, circles, and curved rectangles, having two closed faces and internal bracing; a cylindrical perimeter wall assembled of single-curved panels that are shaped as rectangles, also having two closed faces and internal bracing; interior-walls assembled of straight vertical rectangular panels, also having two closed faces and internal bracing; floors assembled of flat panels shaped as triangles, also having two closed faces and internal bracing; and a spheric dome assembled of double-curved panels shaped as triangles, circles, and curved rectangles, also having two closed faces and internal bracing.

The first preferred embodiment of the present invention also provides a braced dome known as a lamella. In the double-curved, braced, lamella building foundation and the braced lamella dome of the first preferred embodiment, there are eight half-arches made rigid by multiple intersecting braces in each of eight repeating sections having six triangulated rows, one row of curved rectangles, and a central circular panel. A lamella dome has the stiffness of a geodesic and has seventy-percent of its strength, except in long-spans, where lamella domes are favored most. Additionally, a lamella dome has a circular base, whereas the base of a geodesic dome is angular.

The lamella pattern used for the dome is the same as that used for the bowl-shaped foundation except the slope on the dome is greater.

The interlocking building system is preferably made from a high-performance metal, steel, alloy, superalloy, or metal-ceramic composite, having a high service-temperature, high specific-strength, and high corrosion-resistance. If radiation-resistance is a top priority, Tungsten is used with small additions of Nickel, Cobalt, and Iron, the alloy having very high resistance to radiation and a service temperature that is far above the temperature of a building fire. Tungsten also has very high strength and high corrosion-resistance. Any panel of the interlock system that employs Tungsten will be heavy. When panels are composed of seventy-five percent Tungsten and twenty-five percent Nickel, the lightest panel weighs approximately five tons, and the heaviest panel of the system weighs approximately twenty-four tons. If structural-efficiency is the top priority, Titanium is used, having the highest specific-strength of all the metals and excellent corrosion-resistance. However, Titanium has a much lower service-temperature than Tungsten. On a more affordable level, the interlocking building system may be made of a metallic material such as SS 316, a well-used stainless-steel having high corrosion-resistance and a high specific-strength. Other steels and alloys can be used, including those known to those skilled in the art.

In a first preferred embodiment of the interlocking building system, forging processes are used to produce the panels. Forging generally yields the highest strengths in the metal manufacturing industry due to the parallel orientation of the metallic grains of the parts. Of all the forging processses, impression die forging is best suited to the requirements of the interlocking building system. Impression die forging routinely produces more complex shapes, closer dimensional tolerances, and the highest production rates of all the forging processes. Three types of presses can be used in impression die forging: hydraulic, mechanical, and hammer, however, hydraulic presses produce the greatest pressures of the three, forming part weights of up to thirty tons.

With impression die forging, two halves of each panel are pressed into shape and are subsequently joined together by a process known as forge welding. Forge welding is a solid state welding process wherein coalescence is produced first by heating a metallic material to between fifty-percent and ninety-percent of its melting point, and secondly, by applying pressure or blows sufficient to cause permanent deformation at the interface. Where applicable, other joining methods can be used. The materials that are shaped by impression die forging include Tungsten-steels and others such as, but not limited to: alloy-steels, stainless-steels, some titanium alloys, and other metallic materials known to those skilled in the art.

In a first preferred embodiment of the interlocking building system, on-site construction is performed by heavy-duty electromagnetic cranes, since the straps used by other methods will block the path of a panel being placed. Further, heavy-duty electromagnetic cranes have a lifting capacity of thirty-seven tons, which is considerably greater than the twenty-four ton maximum weight of the panels. Preferably, Teflon is applied to the panel interlocks for lubrication and sealing, since the material is not only slippery, but can also be compressed down to fifty-percent of its original volume. By either process, such panels can form partial or whole shapes such as spheres, cylinders, toroids, flat shapes, and otherwise irregular shapes. Furthermore, the panels of the building enclosure are deep, which imparts high resistance to bending loads and flexural loads.

In the first preferred embodiment of the interlocking building system, all panels have integral, internal, triangulated bracing with perforations formed therein. Additionally, the positions of the interior-walls and floors of the structure reinforce the perimeter wall, which already employs a pattern of panel offsets for stability and strength.

In the first preferred embodiment of the present invention, the central circular foundation panel is placed first, having eight open positions around its perimeter. Second, every other one of those positions is filled by curved rectangular female panels that are placed one side at a time, subsequently receiving the four, curved, trapezoidal, male panels that are placed three sides at a time, thereby completing the first row of foundation panels, having a complete perimeter of female features. In the five foundation rows that follow, all panels are placed one row at a time, with female panels placed first, followed by the male panels that complete the row. In this way, two types of panels are used for each row of the foundations, domes, and floors: female panels, having two or three sides that receive other panels, and male panels, having two or three sides that load other panels.

In the outer row of the building foundation, two types of panels form the transition between the triangulated foundation panels and the single-curved, rectangular, perimeter wall panels. Both are placed into every other panel position, and both provide the double-curved surfaces of the foundation and the lower toroid. The difference between the two is that one panel terminates at the top of the lower toroid, and the other continues straight upward with a generally square proportion. The result is an offset pattern of slots that receive perimeter-wall panels two opposite parallel sides at once.

Once the perimeter-wall panels are entirely in place, the rectangular interior-wall panels slide into place one side at a time. Subsequently, all triangular floor panels are placed two sides at a time, each having a clear, unobstructed, vertical path between panels being lowered into place and panels that are already in place. With this perimeter structure of walls and floors completely in place, dome panels are placed one row at a time in the reverse direction of the foundation panels, from the perimeter wall inward and upward to the central circular apex panel, which is lowered into place with vertical tongues sliding into the vertical grooves of the panel position.

The interlocking building system provides for several, basic, building enclosure treatments. A first preferred embodiment of the present invention provides an enclosure having no skylights in the dome and no windows in the perimeter-wall for the purpose of achieving maximum-resistance to the loads of external catastrophes.

A second preferred embodiment of the present invention provides a similar enclosure to that of the first-preferred embodiment. The second preferred embodiment additionally provides horizontal structural window-cylinders in the perimeter-wall of the building enclosure.

A third preferred embodiment of the present invention provides a similar enclosure to that of the first-preferred embodiment. The third preferred embodiment additionally provides structural skylight-cylinders in the dome of the building enclosure.

A fourth preferred embodiment of the present invention provides a similar enclosure to that of the first-preferred embodiment. The fourth preferred embodiment additionally provides the window-cylinders and the skylight-cylinders of the perimeter-wall and the dome, respectively, of the building enclosure.

Accordingly, it is an object of the present invention to provide a structure assembled of individual separate panels, each having an interlocking frame with an integral structural skin and integral perforated triangular bracing, together having high resistance to extreme loads from natural and man-made disasters, such as but not limited to: bomb explosions, earthquakes, liquification, tornadoes, hurricanes, tsunamis, floods, wildfires, volcanic explosions, mudslides, avalanches, and continental drift.

It is another object to provide a rounded overall building shape that is entirely convex-outward, having high resistance to all loads acting on the enclosure from the outside, whether they are from above, below, or the sides.

It is a further object to provide an exterior of the building enclosure that is completely smooth, having no features for tornados, hurricanes, and tsunamis to pull upon.

It is a further object to provide panels that are slide-locked together along the full lengths of their sides, thereby activating upper and lower courses of snap joints that hold the panels in place.

It is yet another object to provide an interlocking building system for constructing structures that are free of welds, rivets, screws, bolts, adhesives, siding, roofing materials, and interior gypsum boards.

It is an additional object to provide a non-corroding non-flammable structure that is also high in strength and service-temperature.

Further, it is an object to provide a building construction sequence allowing for multiple simultaneous panel placements, thereby accelerating the assembly process.

Further yet, it is an object to provide an interlocking building system of individual separate panels having integral frames, skins, and perforated bracing that allows a vacuum to be drawn from a single port.

Also, it is an object to provide an enclosure having a deep continuous triangulated frame from the central foundation panel up to the dome apex panel, thereby imparting high-resistance to the bending loads and flexural loads of severe geologic and atmospheric conditions.

Moreover, it is an object to provide a structure wherein the perimeter-wall supports the dome; the interior-walls brace the perimeter-wall; and the triangulated floor structure braces both the interior-walls and the perimeter-wall, thereby imparting high-resistance to the sudden lateral loads of earthquakes, volcanoes, and explosions.

To add, it is an object to provide the interfaces of all panels with a compressible solid lubricant/sealant that prevents penetration of the joints by radon gas, floodwaters, ants, and roaches.

Further, it is an object to provide a single metallic composition for the entire interlocked building structure, wherein the surfaces of all the joints are free of any possible electrogalvanic-corrosion.

It is another object to provide panels that are large or small and double-faced, additionally providing panel faces and sides that are flat, single-curved, double-curved, or multi-curved.

It is yet another object to provide panel faces having an overall shape that is triangular, square, rectangular, trapezoidal, hexagonal, octagonal, circular, or any combination therefrom.

The interlocking building system additionally provides optional features, such as windows and skylights.

Additionally, the interlocking building system may have panels with interlocking features on their sides in spaced-apart groups of two or more with flat sections in-between the groups for lighter panel weight.

These and other objects, features, and advantages of the present invention are discussed or are apparent in the following detailed description of the invention, in conjunction with the accompanying and the appended claims.

DETAILED DESCRIPTION OF THE PREFERRED EMBODIMENTS

Figure 1:
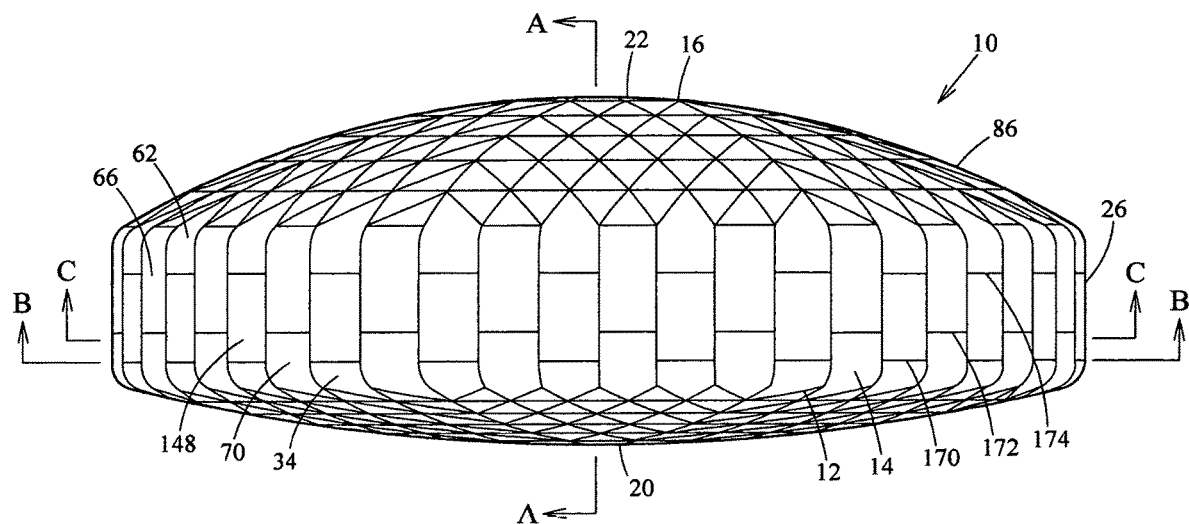
FIG. 1 is an elevation view of a first preferred embodiment of the present invention.

Referring to FIG. 1, there is illustrated an elevation view of the first preferred embodiment of the exterior of the heavy-duty interlocking building system 10 of the present invention. The system 10 preferably consists of multiple, internally-braced, vacuum-insulated one-piece panels of forged stainless steel that interlock with adjacent panels to form a structural building frame 12 with integral structural skins 14, together having high-resistance to natural and man-made disasters, such as, but not limited to: explosions, earthquakes, liquifaction, landslides, tornadoes, hurricanes, tsunamis, floods, wildfires, volcanic explosions, and continental drift.

Figure 2:
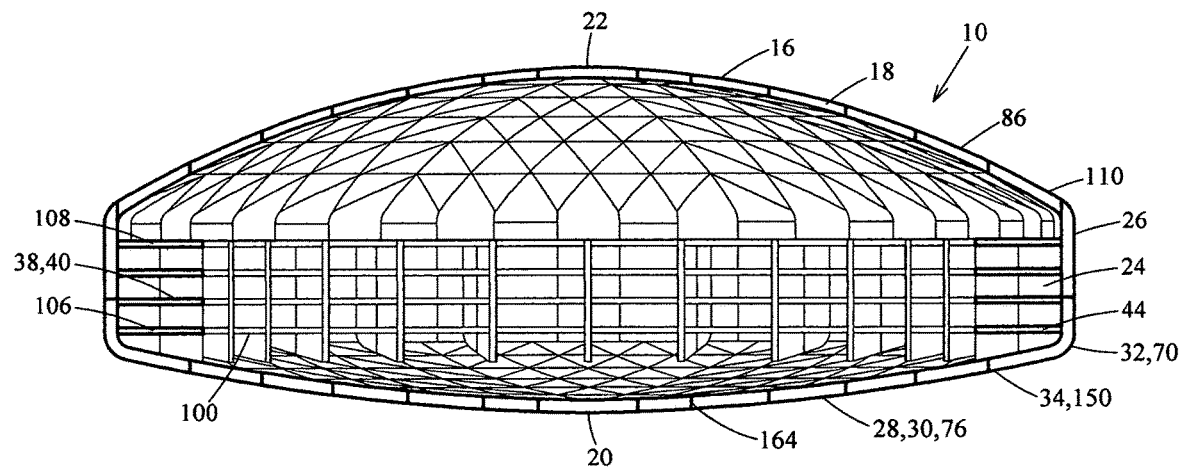
FIG. 2 is a vertical sectional view of the first preferred embodiment taken at line AA of FIG. 1.

Additionally, the rounded overall shape of the first preferred embodiment is entirely convex-outward, having high resistance to all loads acting on the enclosure 16 from the outside, whether they are from above, below, or the sides. Further, the exterior of the building enclosure 16, including the spheric-dome 86, is completely smooth, having no features for tornadoes, hurricanes, and tsunamis to pull upon. Furthermore, all panels of the building system 10 are locked together along the full lengths of their sides by a straight-downward motion that connects the integral, vertical, mating tongues and grooves of adjacent panels, thereby activating upper and lower courses of snap joints that hold the panels in place. Also, there is illustrated the central-foundation panel 20, the dome apex panel 22, the perimeter-wall 26, an upper-perimeter panel 66, a perimeter-wall panel 148, perimeter wall offsets 170, 172, 174, a perimeter-dome panel 62, a lower-perimeter panel 70, and a foundation-toroid panel 34, of the first preferred embodiment. Referring to FIG. 2, there is illustrated a sectional elevation view of the first preferred embodiment, showing the foundation interior without interior earth and gravel, wherein the enclosure 16 of the interlocking building system 10 has a deep continuous triangulated frame 18 from the central foundation panel 20 up to the dome apex panel 22, thereby imparting high-resistance to the loads of severe geologic and atmospheric conditions. Further yet, the perimeter-wall 26 supports the spheric dome 86; the long-slide interior-walls 24 brace the perimeter-wall 26; and the triangulated floor structure 44 braces both the interior-walls 24 and the perimeter-wall 26, imparting high-resistance to the sudden lateral loads of earthquakes.

In the first preferred embodiment of the interlocking building system 10, the layouts and sequences of the system allow for multiple panel placements to take place at any given time. In sequence, two types of panels are used to form the triangulated rows of the spheric foundation 28 and the spheric dome 86 of the building system 10: female panels, having two sides that receive descending male panels, and male panels, having two sides that load stationary female panels. Accordingly, panel placements proceed: first, from the center of the central foundation panel 20 outward; second, from the foundation perimeter 150 upward; third, from the completed perimeter-wall 26 to the interior walls 24; fourth, from lower floors 106 to upper floors 108; and last, from the dome perimeter 110; inward and upward to its apex 22.

Additionally, there is illustrated the double-curved panels 30 of the spheric foundation 28 shaped as triangles, circles, and curved trapezoids, having: a closed lower face 76, a closed upper face 164, and a lower toroid 32 formed by outer foundation-toroid panels 34 and lower perimeter-toroid panels 70. Further, there is illustrated: floors 38 assembled of flat panels 40 shaped as triangles; central floor-panel facias 100; and the spheric-dome 86 assembled of double-curved panels 30 shaped as triangles, circles, and curved trapezoids of the interlocking building system 10 of the first preferred embodiment.

Figure 3:
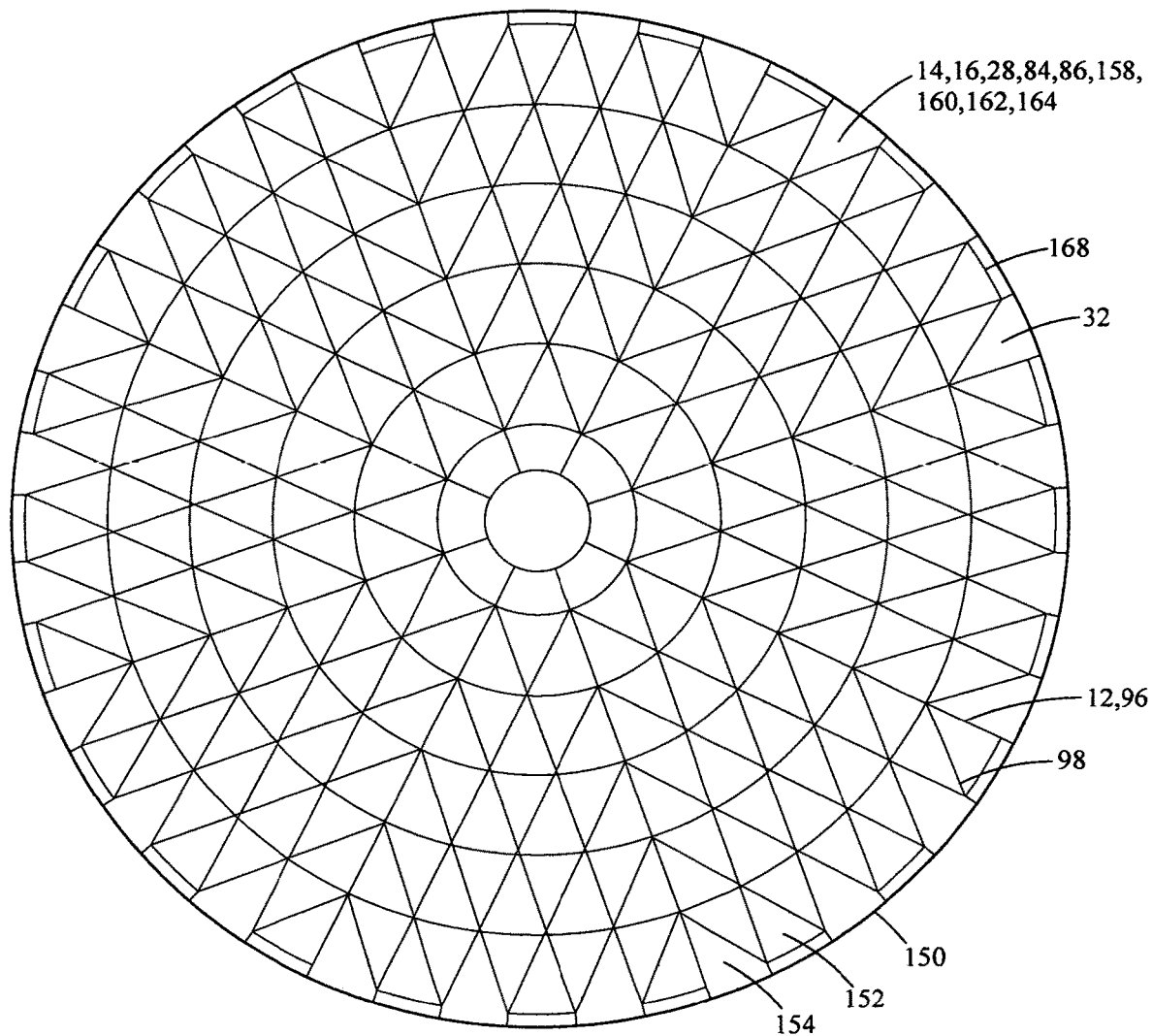
FIG. 3 is a plan view of the dome and the foundation of the first preferred embodiment taken at line BB of FIG. 1.

Referring now to FIG. 3, there is illustrated a sectional plan view of the double-faced, concave-upward, spheric, lamella building foundation 28 and the double-faced, concave-downward, lamella spheric-dome 86 of the first preferred embodiment, each having eight sections, six rows, and a central circular panel. The lamella pattern described hereinafter is only used in conjunction with the interlocked frames 12 and the integral structural skins 14 of the enclosure 16 of the interlocking building system 10. The enclosure panels that form the lamella patterns of the dome and the foundation have integral joints, integral bracing, and integral structural skins. The lamella pattern is further constructed of eight primary arcs 96 braced by multiple intersecting structural members 98, the total system having the same stiffness as a geodesic dome and seventy percent of its strength.

The double-curved lamella pattern used for the spheric dome 86 is the same as that used for the spheric foundation 28, except the spheric dome 86 is defined by a spheric segment having a smaller radius but a larger surface area. Additionally, there is illustrated: a lower toroid 32; the foundation perimeter 150; an isosceles-triangle foundation panel 152; a right-triangle perimeter foundation panel 154; a perimeter foundation-panel row 158; a lower transition panel 160; and the interior face of a perimeter-toroid panel 162 of the interlocking building system 10 of the first preferred embodiment.

Also in FIG. 3, there is illustrated two types of panels that form the transition between the triangulated foundation panels 84 and the lower, single-curved, rectangular perimeter-wall panels 36. Both types are placed into every other panel position, and both provide the double-curved surfaces of the spheric foundation 28 and the lower toroid 32. The difference between these two types of panels is that the lower transition panel 160 receives the bottom floor level only, whereas the other transition panel 164 extends straight upward from the lower toroid 32, providing an inner face 168 that receives the bottom floor level, plus the next floor level above. The result is a pattern of perimeter panel offsets that provide open slots for receiving descending perimeter-wall panels 36, two, opposite, vertical parallel sides at a time.

Figure 4:
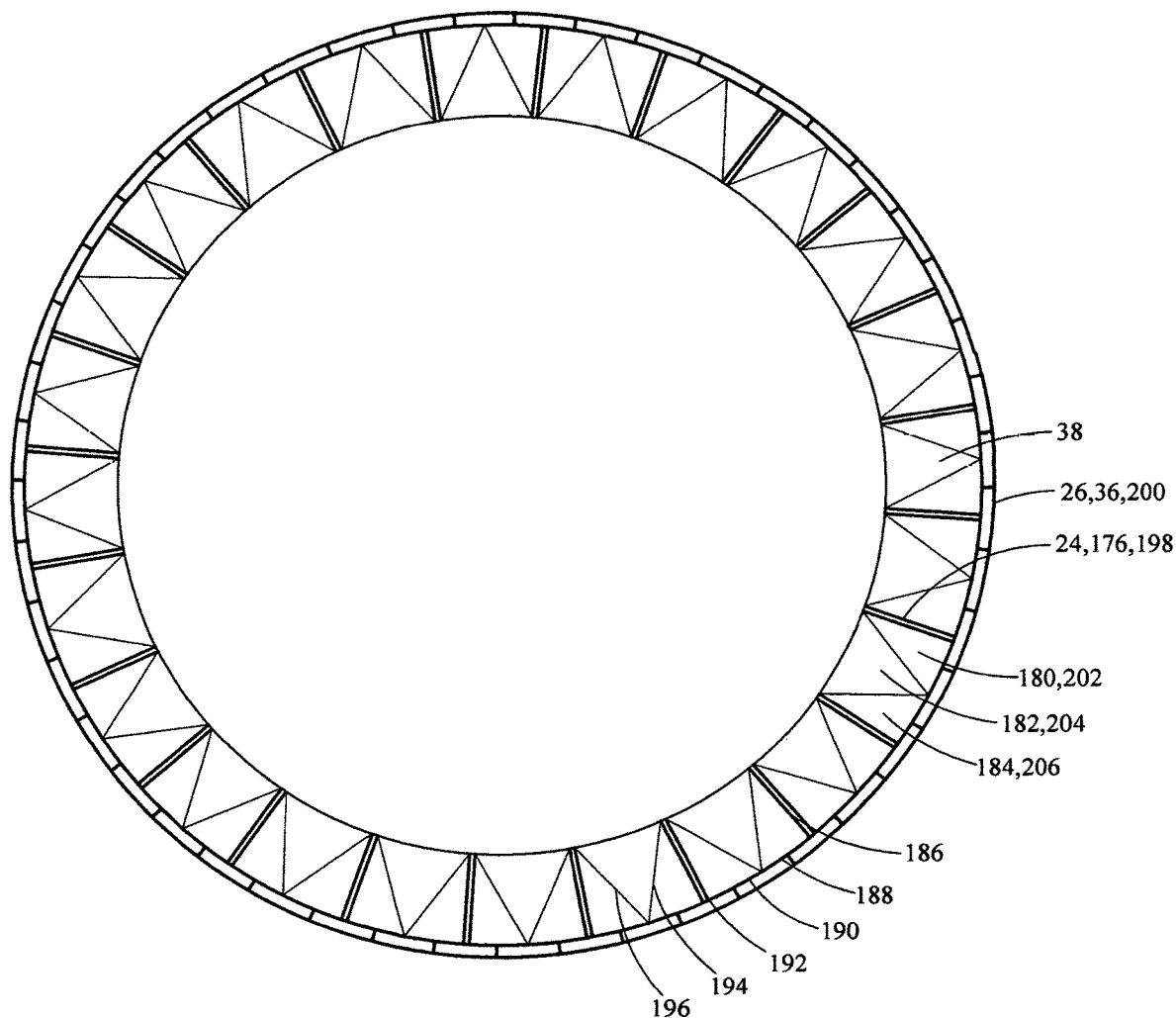
FIG. 4 is a sectional plan view of the walls and the floors of the first preferred embodiment taken at line CC of FIG. 1.

Referring to FIG. 4, there is illustrated a sectional plan view of the floors 38, the interior-walls 24, and the perimeter-wall 26 of the first preferred embodiment. Once the perimeter-wall panels 36 are entirely in place, the long-slide vertical female interlocks of a first interior-wall panel side are slidingly received by a set of long-slide vertical male interlocks provided by the vertical central axis of every other panel of the perimeter-wall 26. Thereafter, second interior wall panels 176 are slidingly received by a set of long-slide vertical male interlocks provided by the interior side of the first interior wall panel. In sequence, three types of triangular floor panels 180, 182, 184 are placed two sides 186, 188, 190, 192, 194, 196 at a time. With this perimeter structure of walls 198, 200 and floors 202, 204, 206 completely in place, dome panels are placed one row at a time in the reverse direction of the foundation panels, from the perimeter wall 26 inward and upward to the central circular apex panel of the spheric dome.

Figure 5:
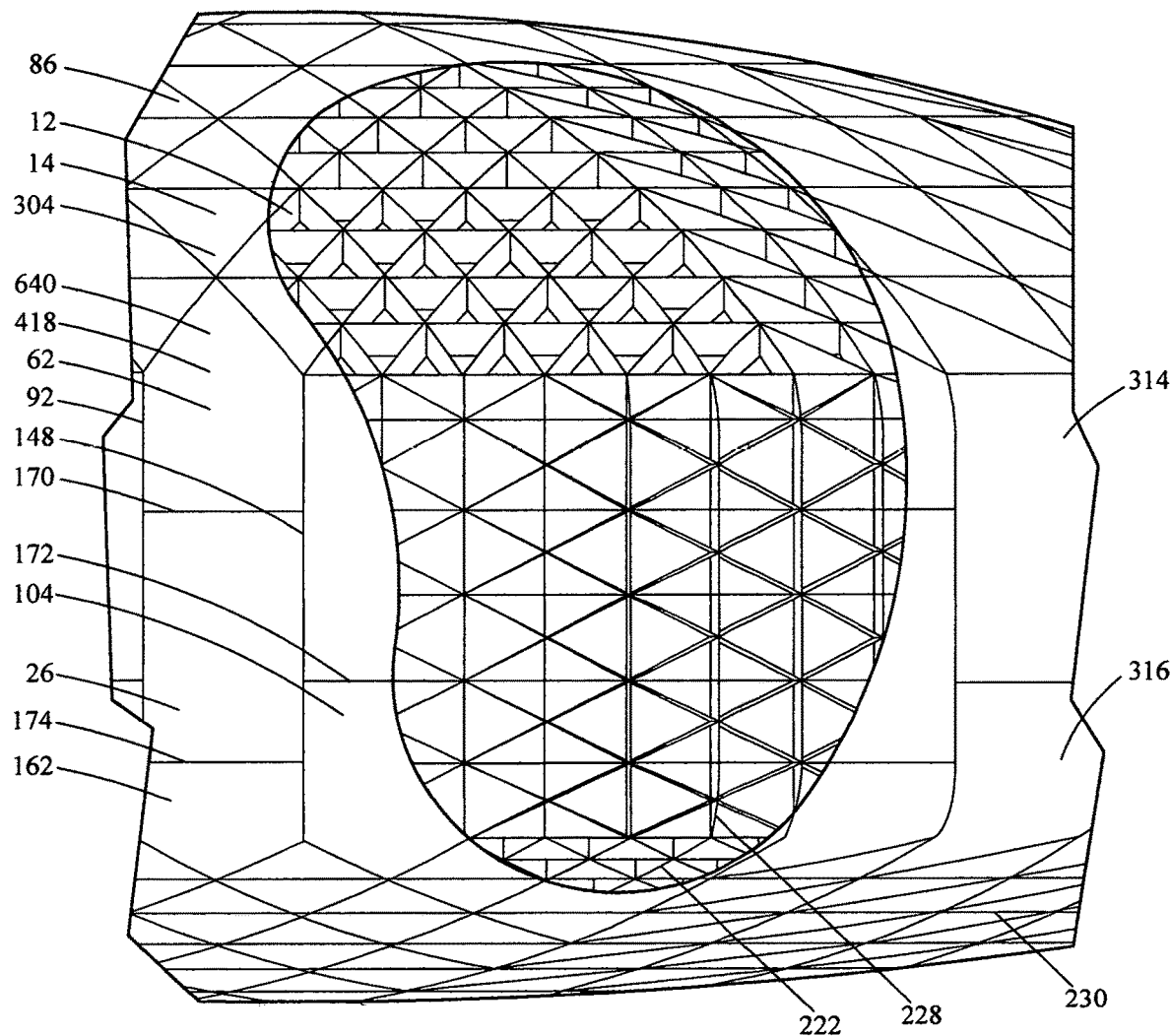
FIG. 5 is a cutaway perspective view of the building enclosure of the first preferred embodiment.

In FIG. 5, there is illustrated a cutaway elevation view of the panels, the seams, and the integral internal bracing of the enclosure of the first preferred embodiment, showing: the spheric dome 86; the internal double-curved dome frame 12; the integral outer double-curved skin 14; a dome panel 304; a perimeter-dome panel 62 with an upper-perimeter toroid 418 and a triangular panel-extension 640; the vertical seams 92, 148, and the horizontal perimeter offsets 170, 172, 174, of the perimeter wall 26; the foundation-toroid panel 162; the upper-perimeter panel 314, and the lower-perimeter panel 316 of the interlocking building system 10. Additionally, there is illustrated a lower-perimeter toroid panel 104, the internal double-curved foundation frame 222, the internal lower toroid bracing 228, and the exterior seams of the inverted lamella foundation 230.

Figure 6:
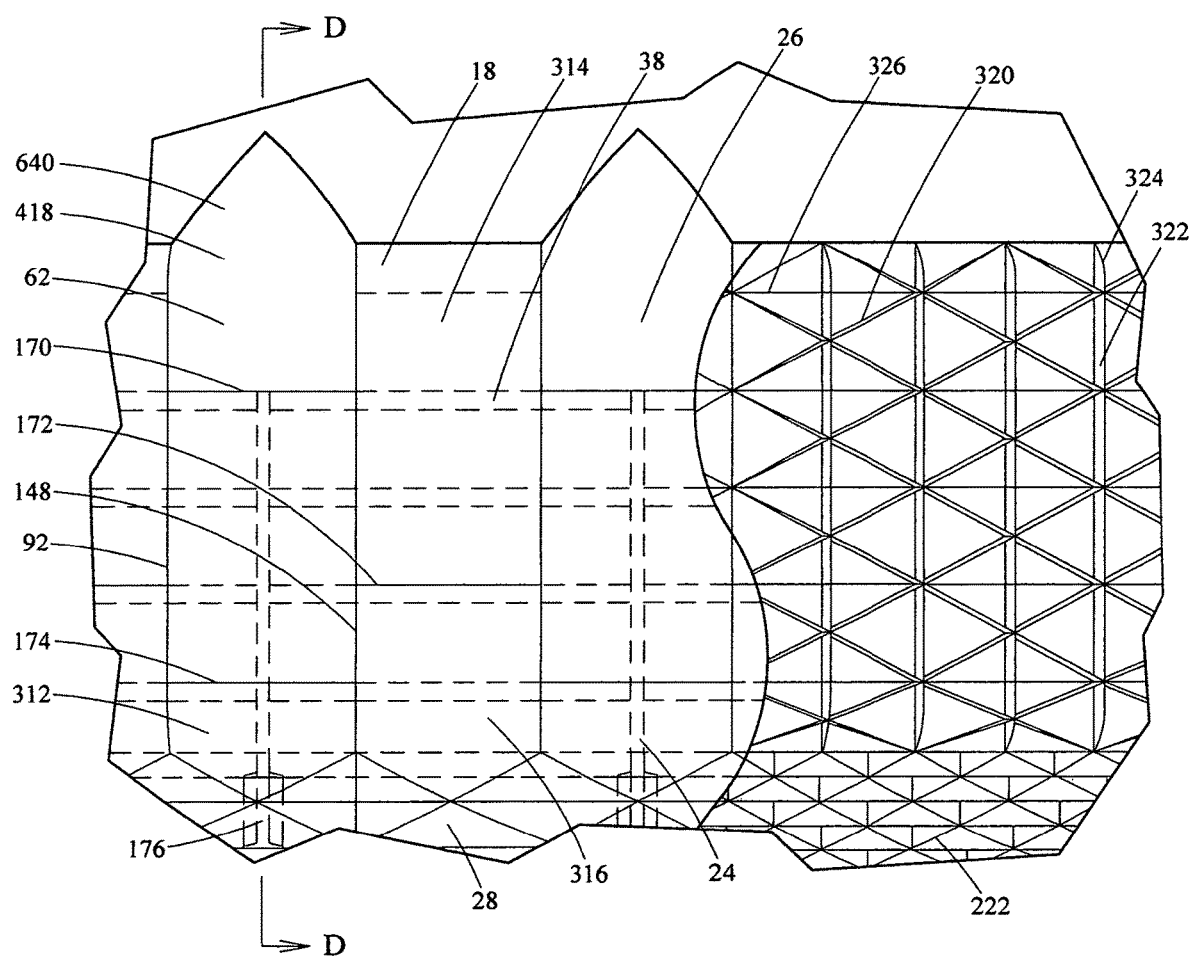
FIG. 6 is a cutaway elevation view of the perimeter-wall of the first preferred embodiment.

Referring now to FIG. 6, there is illustrated a cutaway elevation view of the panels, the seams, the internal bracing of the perimeter-wall 26 and the foundation 28 of the interlocking building system 10 of a first preferred embodiment, showing: the horizontal perimeter offsets 170, 172, 174; the footings 176 of the interior-walls 24; the perimeter-dome panel 62 having an integral upper-toroid 418 with an integral triangular extension 640; vertical seams 92, 148, a foundation-toroid panel 312, an upper-perimeter panel 314, a lower-perimeter panel 316, internal cross-bracing 320, internal vertical bracing 322, upper toroid bracing 324, horizontal bracing 326, and the lamella foundation frame 222. Further, there is illustrated: the positions of the interior walls 24, the floors 38, and the horizontal slide-locked juncture 18 between the dome 86 and the perimeter-wall 26 relative to the positions of the horizontal perimeter offsets.

Figure 7:
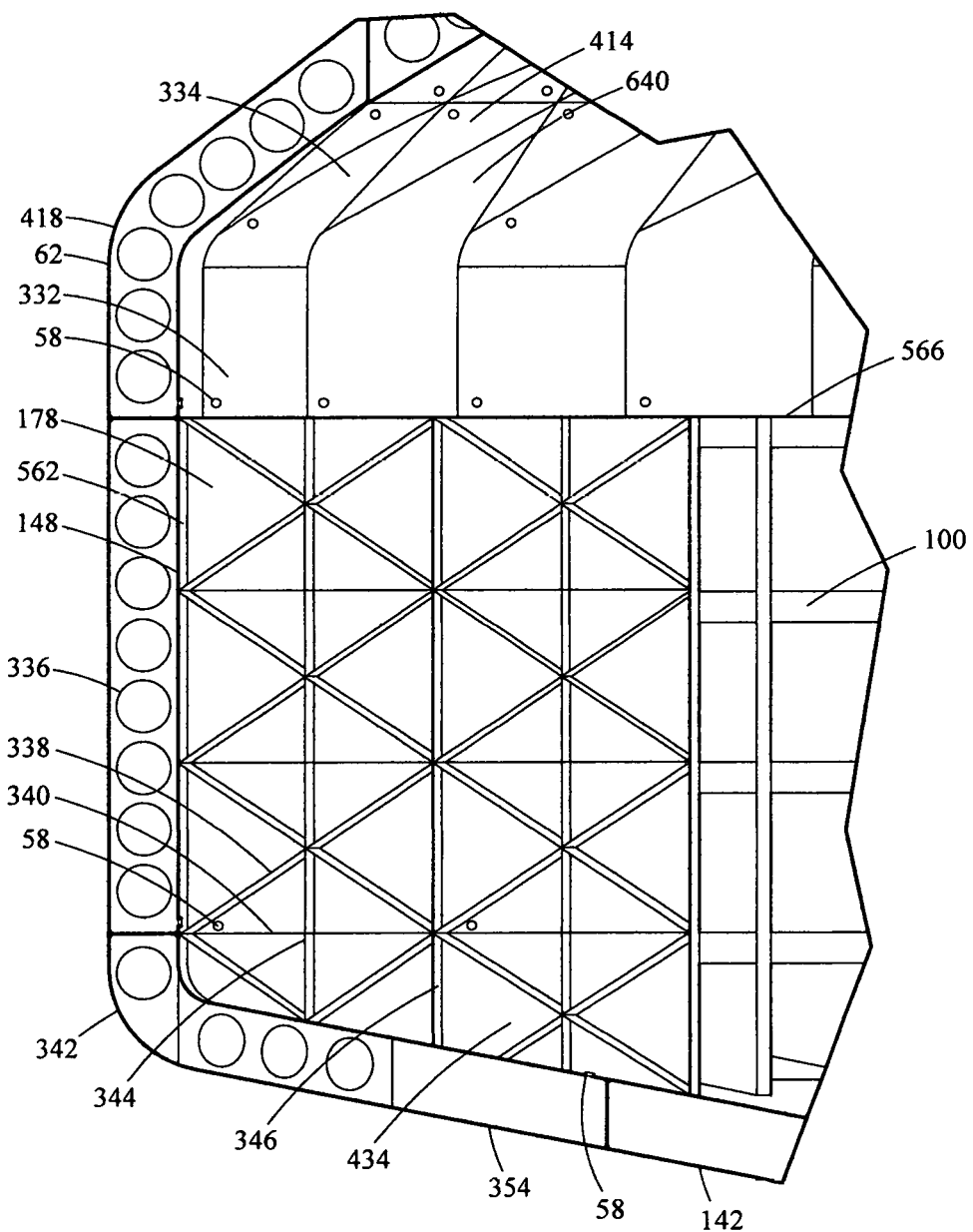
FIG. 7 is a sectional elevation view of the perimeter-wall and the interior-walls of the first preferred embodiment taken at line DD of FIG. 6.

Referring to FIG. 7, there is illustrated a sectional elevation view of the structure of the perimeter enclosure and the two, vertical, long-slide interior-wall panels 178, 434, of the interlocking building system 10 of a first preferred embodiment, showing: a first, vertical, female long-slide joint 562 situated between the interior face of a perimeter-wall panel 148 and a first adjacent side of a first perpendicular interior-wall panel 178; a second side of the first interior-wall panel providing the second vertical long-slide interlocks 346 that mate with the second interior wall panel 434 of the interlocking building system 10 of the the first preferred embodiment. Further, there is illustrated: a foundation panel 142; a foundation-toroid panel 354 having an integral outer lower-toroid 342; an upper-perimeter panel 332; a perimeter-dome panel 62 having an integral upper-toroid 418 with an integral triangular extension 640; a female dome-panel 334; and a male dome-panel 414. Furthermore, there is illustrated: the wall-panels 178, 434, having integral diagonal bracing 338; integral horizontal bracing 340; integral vertical bracing 344 with structurally-efficient perforations 336; the central floor-panel facia 100; the concourse floor 566; and the vacuum-ports 58, as described hereafter.

Figure 8:
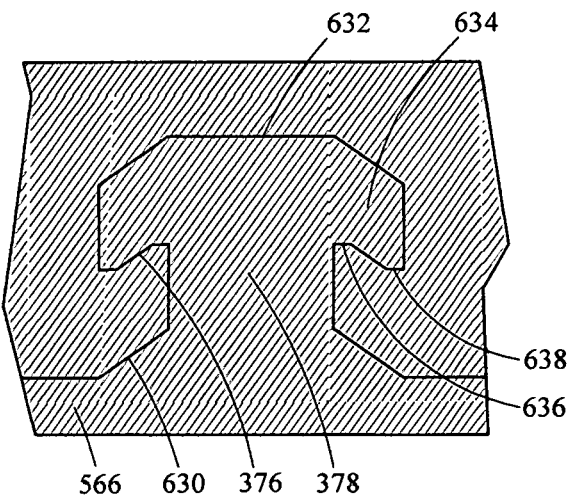
FIG. 8 is a horizontal sectional detail view of the heavy-duty vertical interlocks that repeat throughout a building assembly to form foundations, walls, floors, and domes of the first preferred embodiment.
Figure 9:
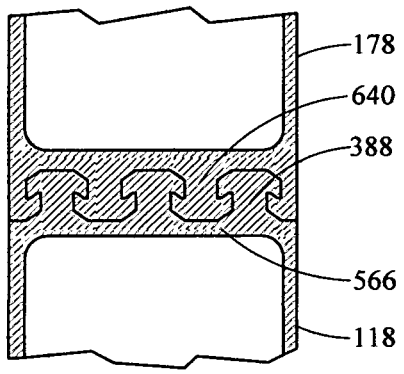
FIGS. 9-11 are horizontal sectional views of the heavy-duty wall-interlocks of the first preferred embodiment.
Figure 11:
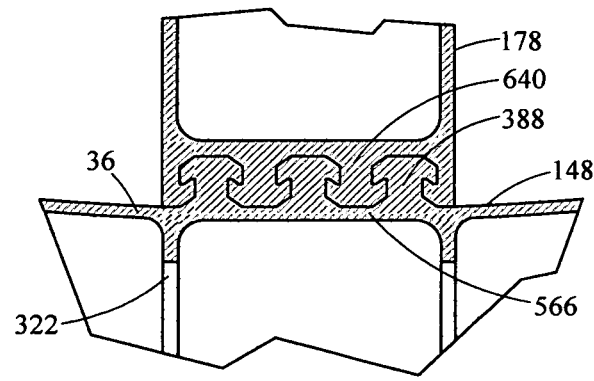
Figure 10:
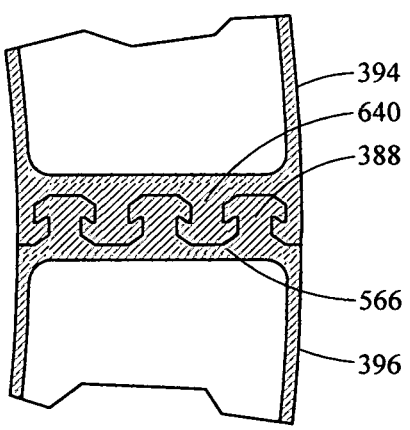
Figure 12:
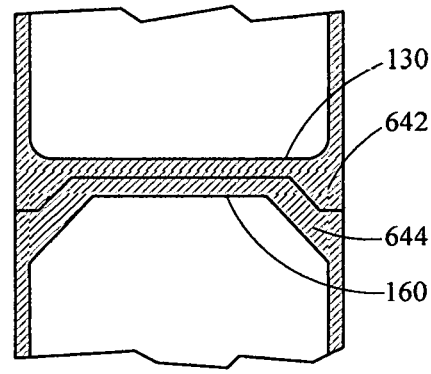
FIG. 12 is a vertical sectional view of a horizontal perimeter-wall joint of the first preferred embodiment.

Referring now to FIGS. 8-20, there are illustrated sectional views and sectional detail views of the vertically slide-locking joints of the interlocking building system 10 of the first preferred embodiment. In FIG. 8, there is illustrated a horizontal sectional detail view of the heavy-duty vertical slide-locking interlock that is used in repetition on panel sides throughout building assemblies to form short-slides for spheric-foundations 28, triangulated floors 44, and spheric-domes 86, and vertical multi-story long-slides for perimeter-walls 26 and interior-walls 24 of the interlocking building system 10 of the first preferred embodiment. As illustrated, each interlock has a continuous back-plate 566, a tongue neck 378 having angled side supports 630 and a tongue head 632 with adjacent angled armatures 634 for providing angled catch-surfaces 376 with touch-safe blunt edges 636, 638, of the interlocking building system 10 of the first preferred embodiment. In FIGS. 9-11, there is illustrated sectional detail views of the long-slide interlock used in groups as joints that occur between the walls of the first preferred embodiment, with the lengths of the joints determined solely by manufacturing capabilties. As with all slide-locking joints having two or more tongues, long-slide male panel sides have pocket joints at the tops of the slide-lock grooves, whereas female panel sides have pocket joints at the bottoms of the slide-lock grooves, as described hereinafter, of the interlocking building system 10 of the first preferred embodiment. In FIG. 9, there is illustrated a horizontal sectional detail view of the long-slide joint used for connecting straight interior-wall panels 178, 118 of a first preferred embodiment, having the male and female interlocks 388, 640, respectively, therein. In FIG. 10, there is illustrated a horizontal sectional detail view of a long-slide joint used for connecting curved interior-wall panels 394, 396 of the first preferred embodiment, having a backplate 566 on each side of the joint, and male and female interlocks 388, 640, respectively, therein. In FIG. 11, there is illustrated a horizontal sectional detail view of an interior-wall panel 178 and the interior face 148 of a perimeter-wall panel 36 having perforated internal integral bracing 322 aligned with the outer plates of the interior wall 178 of the interlocking building system 10 of the first preferred embodiment, and further having male and female interlocks 388, 640, respectively, therein. In FIG. 12, there is illustrated a vertical sectional detail view of an upper panel-side 130 and a lower panel-side 160 of a horizontal perimeter-wall joint of the interlocking building system 10 of the first preferred embodiment, the upper panel side 130 having continuous reinforcing edge-ribs 642 extending downward, thereby transferring vertical loads through the continuous angled corner supports 644 of the lower panel-side 160.

Figure 13:
FIGS. 13-14 are horizontal sectional views of heavy-duty vertical interlocks on the sides of panels to form foundations, domes, and floors of the first preferred embodiment.
Figure 14:
Figure 15:
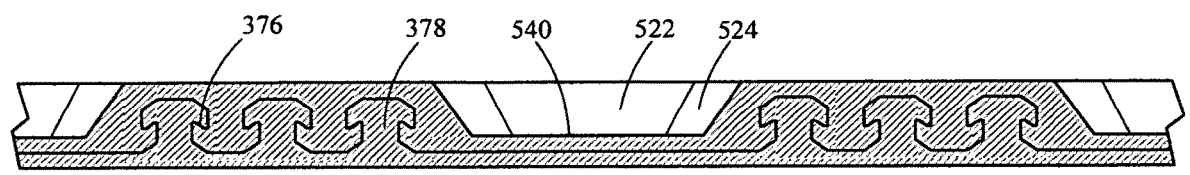
FIGS. 15-16 are horizontal sectional views of an alternate embodiment of heavy-duty vertical interlocks spaced apart on the sides of panels in groups to form foundations, floors, and domes.
Figure 16:
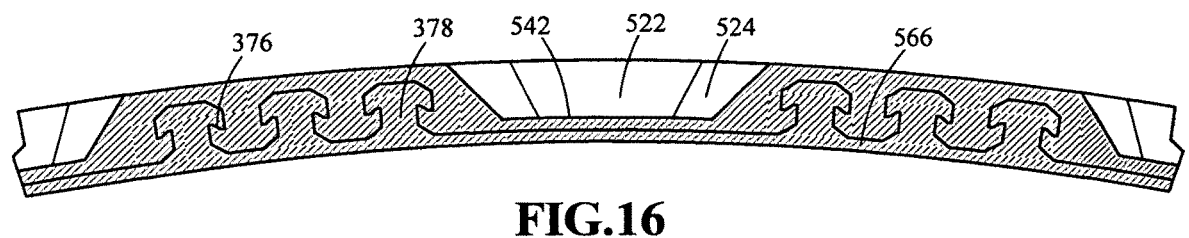

In FIG. 13 and FIG. 14, there are illustrated horizontal sectional detail views of the two interlocking joints used to connect the adjacent panel sides of domes, floors, and foundations, and the interior-faces of perimeter-wall panels of the interlocking building system 10 of the first preferred embodiment and corresponding with the interlock of FIG. 8. FIG. 13 shows a straight joint having the interlocks 388, 640, used to connect the adjacent concave-downward sides of dome panels and the adjacent concave-upward sides of foundation panels, the joint thereby forming the primary-arcs and the diagonal bracing-arcs of the domes and the foundations of a building assembly of the interlocking building system 10 of the first preferred embodiment. FIG. 14 shows a curved joint having the interlocks 388, 640, used to connect the curved sides of adjacent dome panels, the curved sides of adjacent foundation panels, and the curved sides of corner floor-panels, the joint thereby forming the horizontal rings of the domes and the foundations of a building assembly of the first preferred embodiment and corresponding with the interlock of FIG. 8. Referring to FIG. 15 and FIG. 16, there are illustrated sectional plan detail views of the joints of foundations 28, floors 38, and domes 86 of an alternate embodiment, for applications where lightweight panels are used and fewer interlocks are required. FIG. 15 shows the angled vertical catch-surfaces 376 in spaced-apart groups of interlocks 378 corresponding with the interlock of FIG. 8 and having a flat recessed surface 540 bordered by flat angled surfaces 522, 524, of an alternate embodiment. FIG. 16 shows the angled vertical catch-surfaces 376 in spaced-apart groups of interlocks 378 corresponding with the interlock of FIG. 8 and formed along a single-curved backplate 566 in perpendicular fashion, further showing a single-curved recessed surface 542 bordered by flat angled surfaces 522, 524, of an alternate embodiment.

Figure 17:
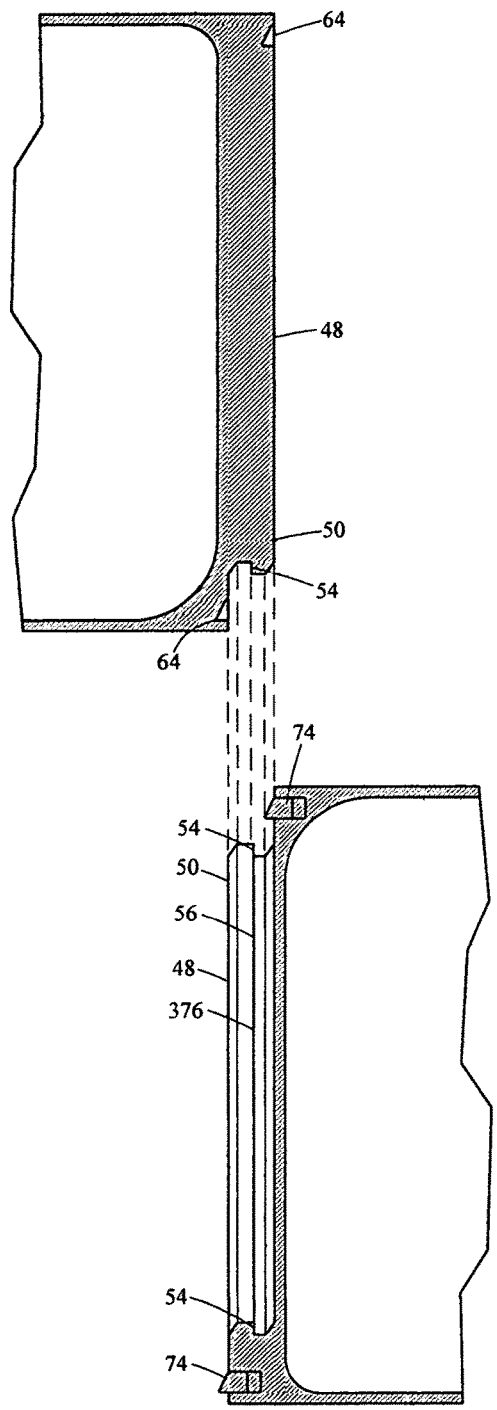
FIGS. 17-18 are vertical sectional views of the first preferred embodiment of panel sides of foundations, floors, and domes aligned for mating.
Figure 18:
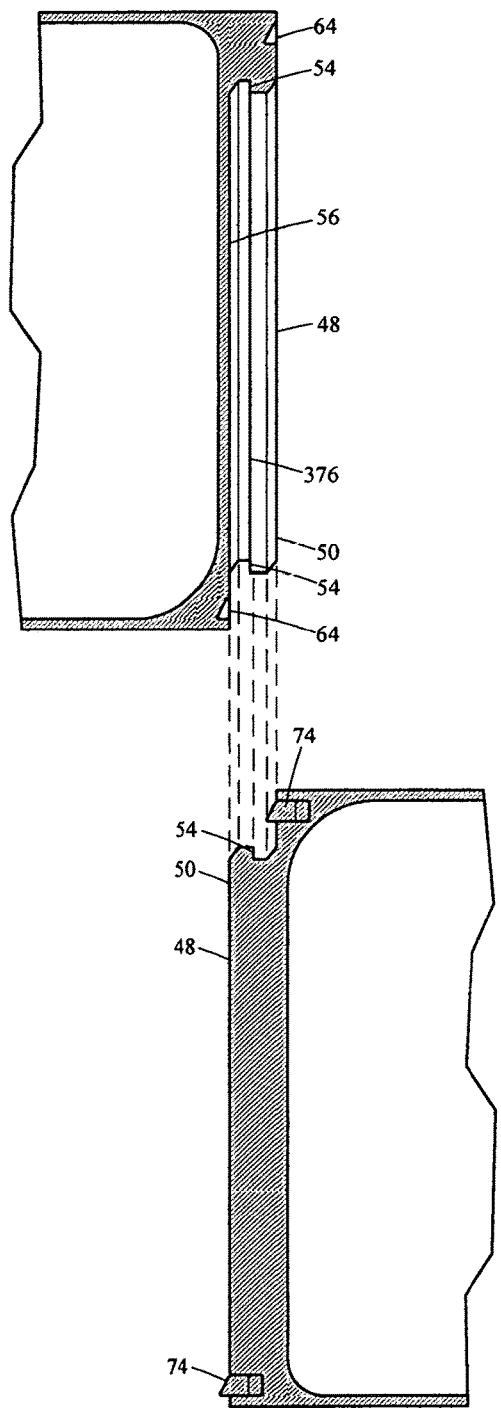

Referring to FIG. 17 and FIG. 18, there are illustrated vertical sectional views of the vertically slide-locking sides of panels used for spheric foundations 28, triangulated floors 44, and spheric domes 86 of a first preferred embodiment of the interlocking building system 10. Such panels are slide-locked together along the full lengths and widths of their sides, wherein the tongues 48 and grooves 56 of descending upper panels fully penetrate the tongues 48 and grooves 56 of stationary lower panels, the upper panels thereby activating the upper and lower courses of retractable snap joint heads 74 of the lower panels that mate with the upper and lower cavities 64 of the upper panels to lock the upper panels in place, as described in detail hereafter. Further, there is illustrated rounded tongue tips 50, vacuum ports 58, upper and lower pocket catch-surfaces 54, and vertical slide-lock catch-surfaces 376.

Figure 19:
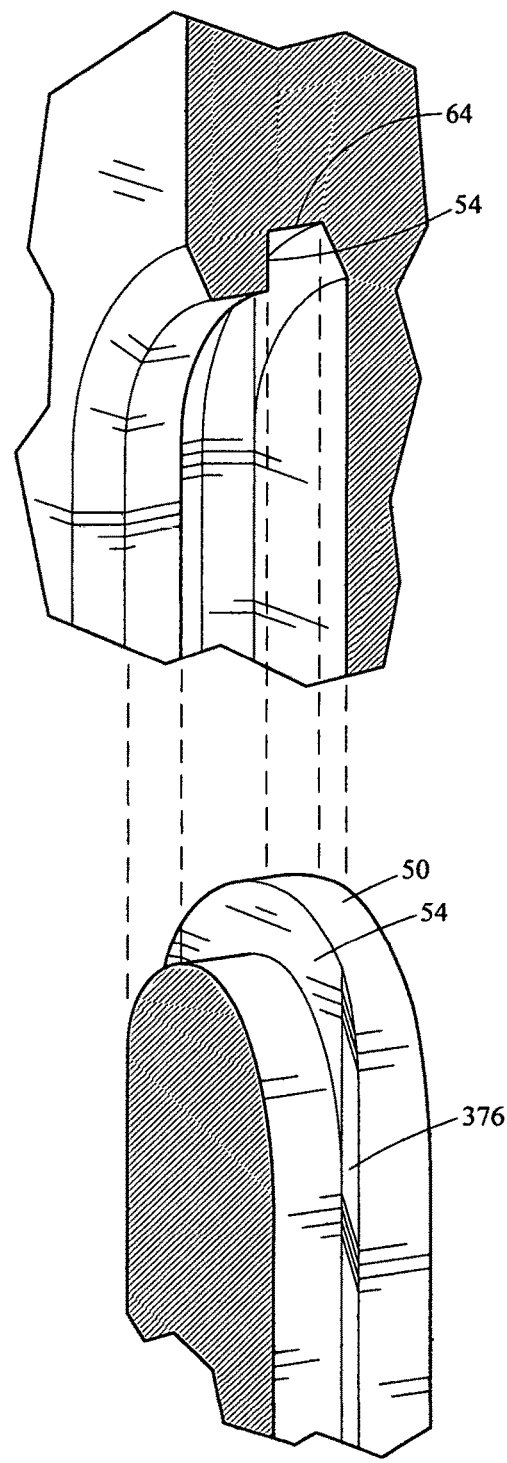
FIG. 19 is a vertical sectional detail view of an upper-groove pocket aligned for mating with a lower tongue head of the first preferred embodiment.
Figure 20:
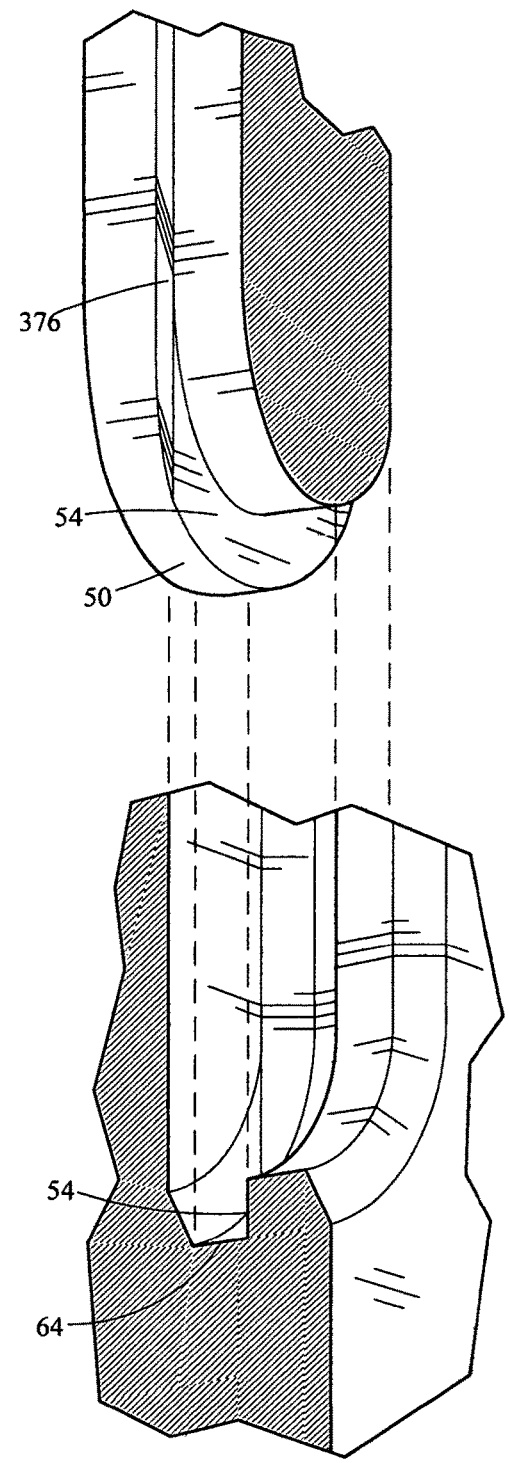
FIG. 20 is a vertical sectional detail view of an upper tongue head aligned for mating with a lower groove pocket of the first preferred embodiment.

Referring to FIGS. 19 and 20, there are illustrated twice-mirrored vertical sectional detail views of mating pocket joint interlocks located above the slide-locking grooves of male panel-sides and below the slide-locking grooves of stationary female panel-sides, as described heretofore and hereafter, of the first preferred embodiment. In FIG. 19, there is illustrated an upper pocket 64 of a descending male panel-side with an adjacent integral catch-surface 54 aligned for mating with the upper tongue tip 50 of a stationary female panel-side, the tongue also having an adjacent integral catch-surface 54 and an angled vertically-slide-locking catch-surface 376 of an upper female panel-side that penetrates into the sides of the upper pocket of the first preferred embodiment. In FIG. 20, there is illustrated a twice-mirrored image of the previous view, showing a lower pocket 64 of a stationary female panel-side with an adjacent integral catch-surface 54 aligned for mating with a lower tongue tip 50 of a descending male panel-side, the tongue also having an adjacent integral catch-surface 54, and an angled vertically-slide-locking catch-surface 376 of a male panel-side that penetrates into the sides of the lower pocket of the first preferred embodiment.

Figure 21:
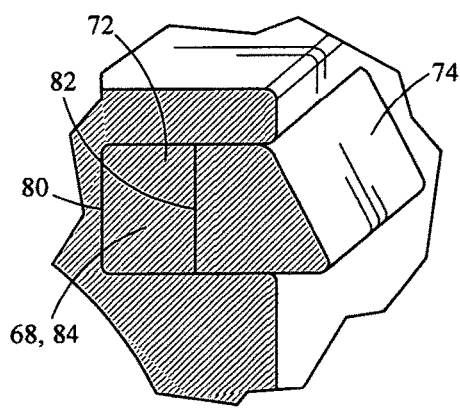
FIG. 21 is a vertical sectional detail view of an upper-row snap-lock of the first preferred embodiment.
Figure 24:
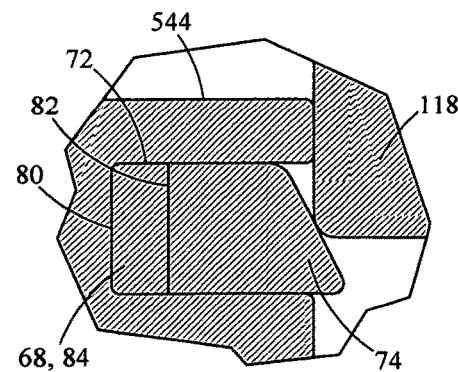
FIGS. 23-26 are vertical sectional detail views of the snap joint locking process of the first preferred embodiment.
Figure 22:
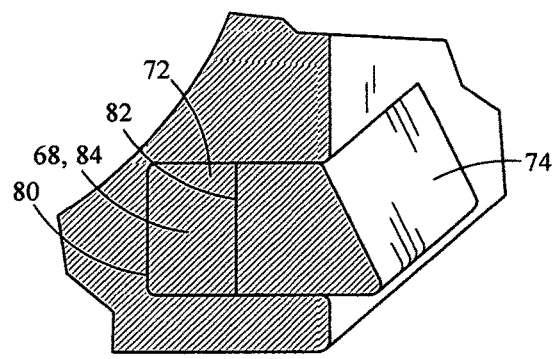
FIG. 22 is a vertical sectional detail view of a lower-row snap-lock of the first preferred embodiment.
Figure 25:
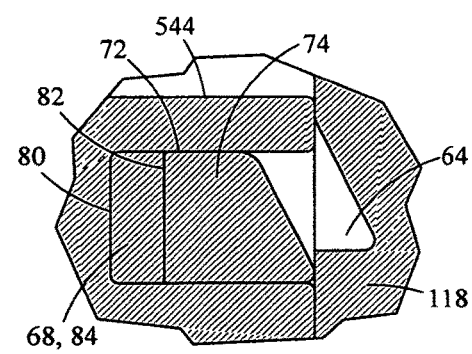
Figure 23:
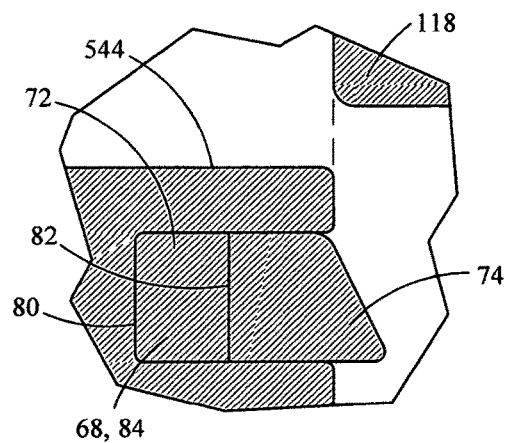
Figure 26:
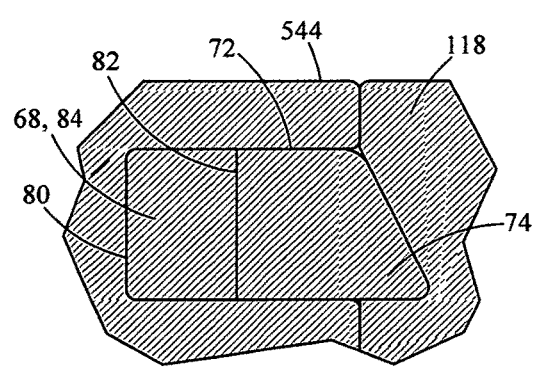

Referring to FIGS. 21-26, there are illustrated vertical sectional detail views of the snap joints located above and below the vertical slide-locks of all panels of the interlocking building system 10 of a first preferred embodiment. In FIGS. 21 and 22, there are illustrated vertical sectional perspective detail views of the horizontally-acting upper and lower male-halves of the snap-joints, showing: a rectangular cavity 72; a wedge-shaped metal head 74 that projects from the rectangular cavity 72; and a rectangular block 68 of a compressible solid 84 that adheres to both the back-surface 80 of the rectangular cavity 72 and the inner-surface 82 of the wedge-shaped head 74.

In FIGS. 23-26, there are illustrated vertical sectional detail views of the activation of an upper snap joint of the first preferred embodiment, showing: a heavy descending upper panel 118 and a stationary lower panel 544, having: a rectangular cavity 72 inside the stationary lower panel 544; a wedge-shaped cavity 64 inside the descending upper panel 118; a wedge-shaped metal head 74 that projects from the rectangular cavity 72; and a rectangular block 68 of a compressible solid 84, that is adhered to both the back-surface 80 of the rectangular cavity 72 and the inner-surface 82 of the wedge-shaped head 74, having sufficient shape memory and rebound to drive the wedge-shaped head 74 into the wedge-shaped cavity 64, thereby preventing reverse movement of the panels. Further, the wedge-shaped cavities 64 occur in half of the system panels, and mating wedge-shaped heads 74 occur in the other half, such that the features lock in place when the wedge-shaped cavities 64, and mating wedge-shaped heads 74, align at the ends of panel sliding motions. In a first preferred embodiment, the compressible solid 84 of the insert-joints is composed of Teflon, or the like, as it will compress down to half of its original size, then expand outward to its original size and shape. Materials known to those skilled in the art may also work for this function. In an alternate embodiment, a spring-loaded insert-joint may be used.

Figure 27:
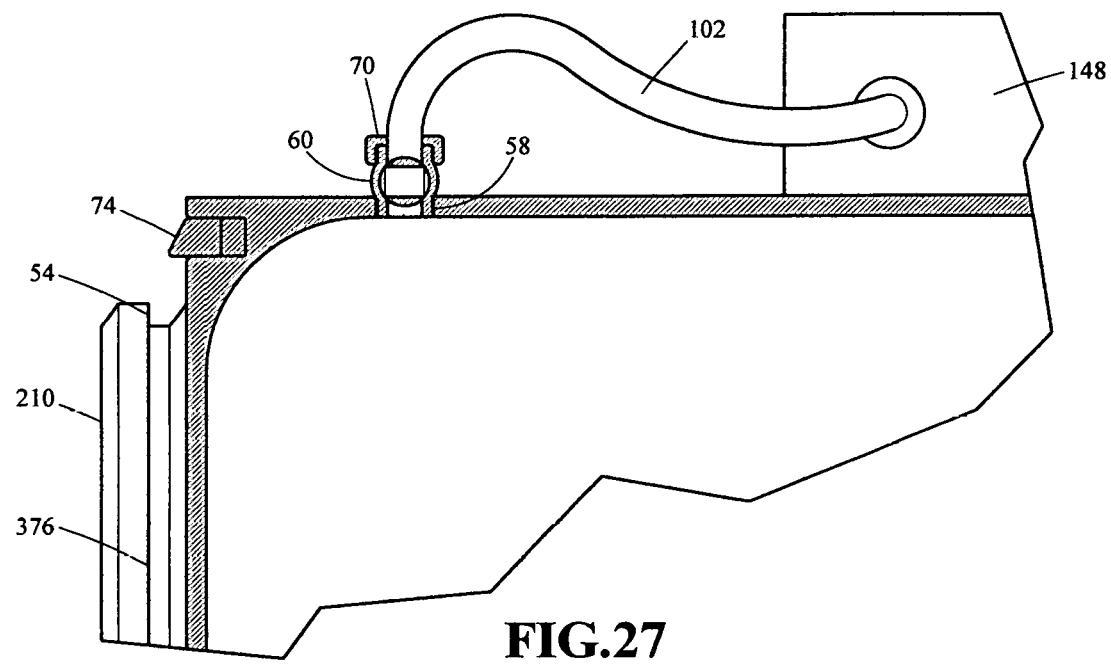
FIG. 27 and FIG. 28 are vertical sectional detail views of the vacuum system apparatus of the first preferred embodiment.
Figure 28:
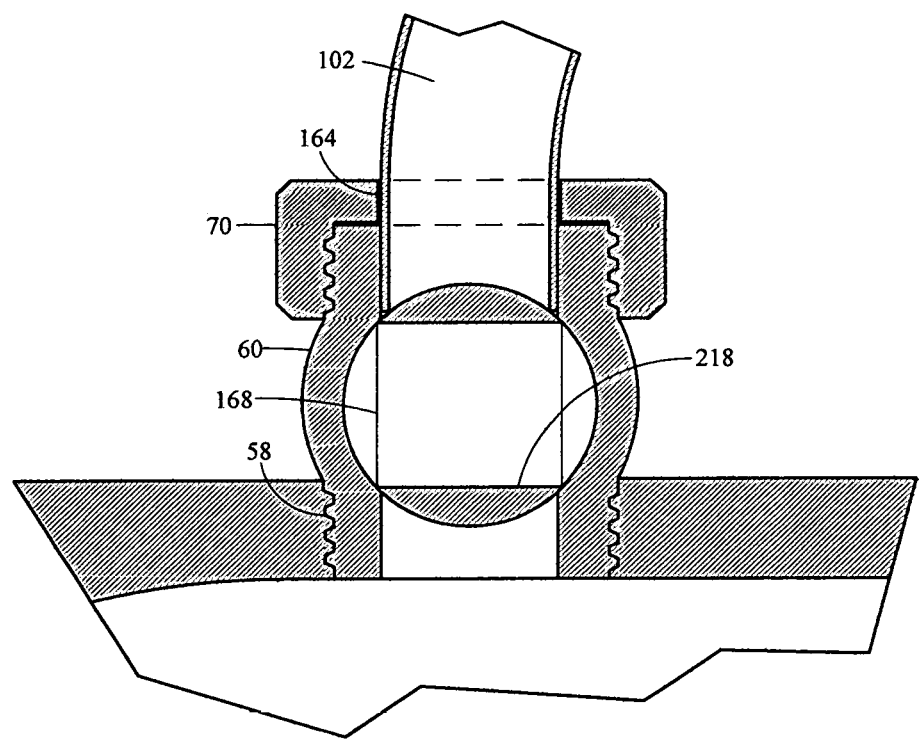

Referring now to FIG. 27 and FIG. 28, all panels of the interlocking building system 10 of the first preferred embodiment are insulated against sound-transmission, heat-gain, and heat-loss by an internal vacuum that is contained by the dense metal sides and faces of the panels without the need for internal foils, sheets, foams, or the like, as described heretofore and hereafter. The vacuum is produced in a panel by way of an open, threaded vacuum-port 58 for receiving a simple, threaded, open/close ball-valve that becomes a permanent fixture of the panel and connects with a portable heavy-duty vacuum-pump by way of a high-performance steel-braided hose, or the like. Also described heretofore, all panels of the building system 10 have internal structural braces with large perforations for structural-efficiency that allow a single vacuum to be drawn throughout the panel interior. The close spacings between the internal panel perforations are such that a very small amount of sound or heat will pass through the material being used there. Also, all vacuum-ports 58 are located in the panel faces of the building interior, such that: foundation-panels 142 have a vacuum-port 58 in their upper face; interior-wall panels 24 and perimeter-wall panels 36 have ports 58 in their interior faces; and floor-panels 42 and dome-panels 46 have ports 58 in their lower faces.

In FIG. 27, there is illustrated a vertical sectional view of a floor-panel vacuum-system of a first preferred embodiment, showing: a portable vacuum-pump 148; a steel-braided vacuum-hose 102; a manually-operated, open-close, double-threaded, quarter-turn ball-valve 60; the threads between the lower ball-valve 60 and the vacuum-port 58; the open sides of the internal ball 168 and a screw-down hose-lock 70. Additionally, there is shown: a snap-lock head 74; an upper catch-surface 54; a vertical female-tongue 210; and an angled vertical catch-surface 376 of the interlockin building systen 10 of the first preferred embodiment. In FIG. 28, there is illustrated a vertical sectional detail view of the floor-panel vacuum-systm of a first preferred embodiment, showing: the manually-operated, open-close, double-threaded, quarter-turn ball-valve 60; the threads between the lower ball-valve 60 and the vacuum-port 58; the open-sides of the rotating internal-ball 168; the closed-sides of the rotating internal-ball 218; a ring-shaped metal-angle 164 adhered to the steel-braided vacuum-hose 102 for controlling the depth of the insertion, and a screw-down hose-lock 70 of the interlocking building system 10 of the first preferred embodiment.

Figure 29:
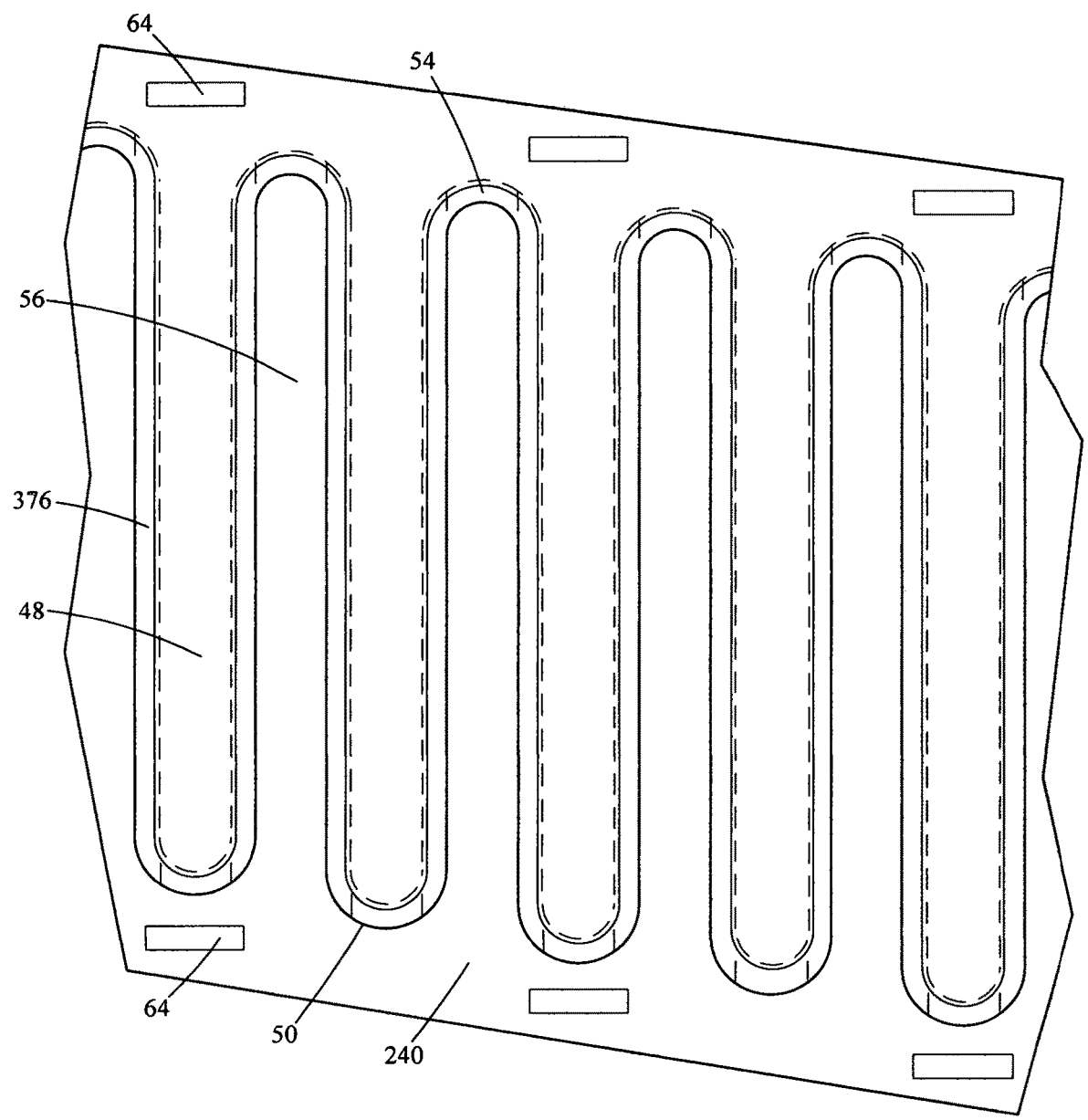
FIG. 29 and FIG. 30 are elevation views of the upper and lower vertical interlocks and snap-locks of mating foundation-panel sides of the first preferred embodiment.
Figure 30:
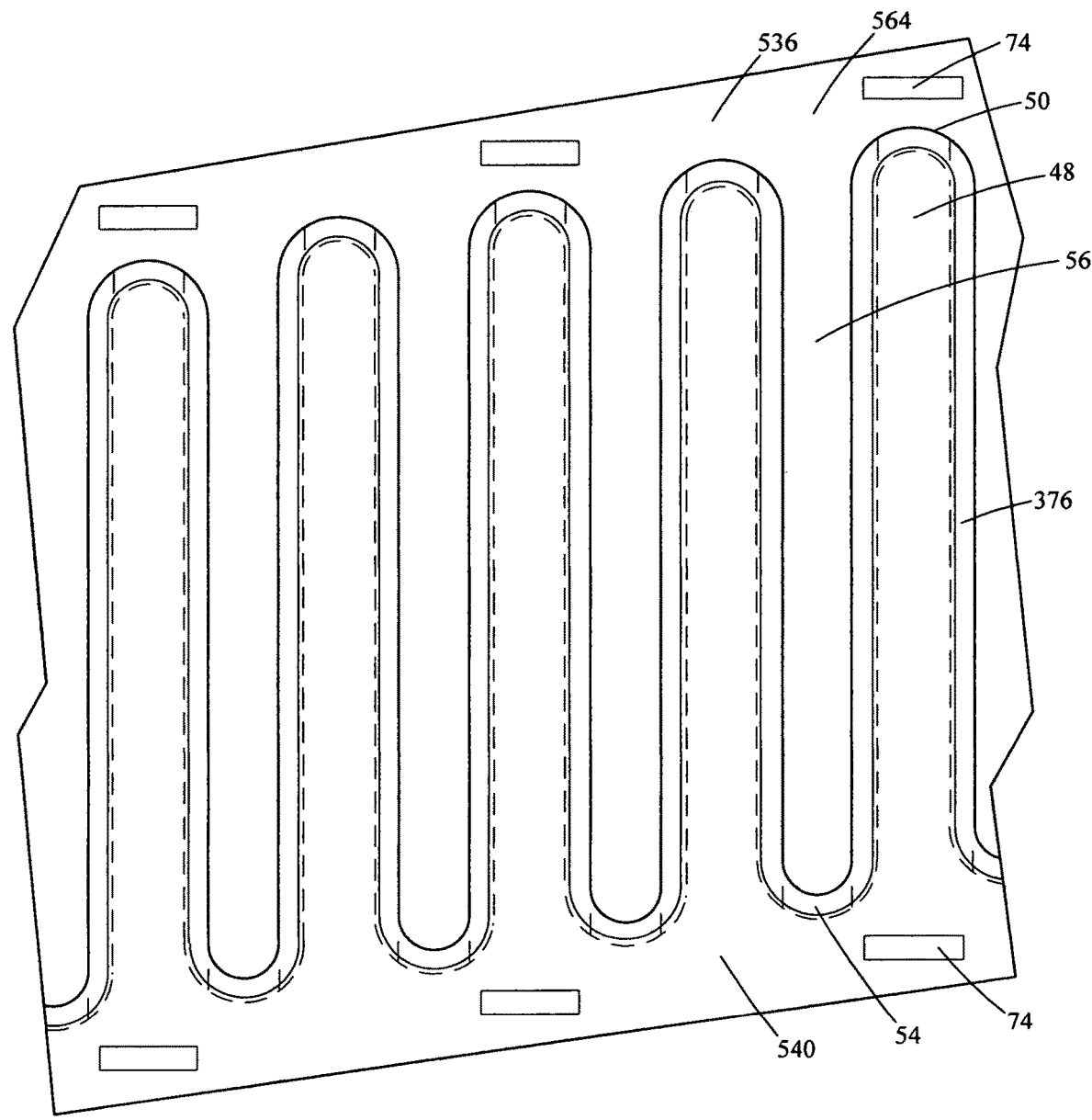

In FIG. 29 and FIG. 30, there are illustrated elevation views of sections of sloped panel sides having mating tongues and grooves of the interlocking building system 10 of a first preferred embodiment. The main advantage of using this alternating layout of catch-surfaces, such as those shown, is that it maximizes the linear distance of the heavy-duty catch-surfaces, thereby strengthening the panel-sides of the first preferred embodiment. In FIG. 29, there is illustrated: a recessed male panel-side 240 having the wedge-shaped cavities 64 of the snap-joints; the downward-extending tongues 48; the lower tongue tips 50; the grooves 56; the upper pocket joints 58; wedge-shaped heads 74; and the vertical angled catch-surfaces 376 of the first preferred embodiment. In FIG. 30, there is illustrated the mating female panel side 536 having a recessed receiving surface 564; an extended outer surface 540 having the wedge-shaped heads 74; the upper tongue tips 50; the upward-extending tongues 48; the grooves 56; the lower pocket joints 58; wedge-shaped cavities 64; and the vertical angled catch-surfaces 376 of the interlocking building system 10 of the first preferred embodiment.

Figure 31:
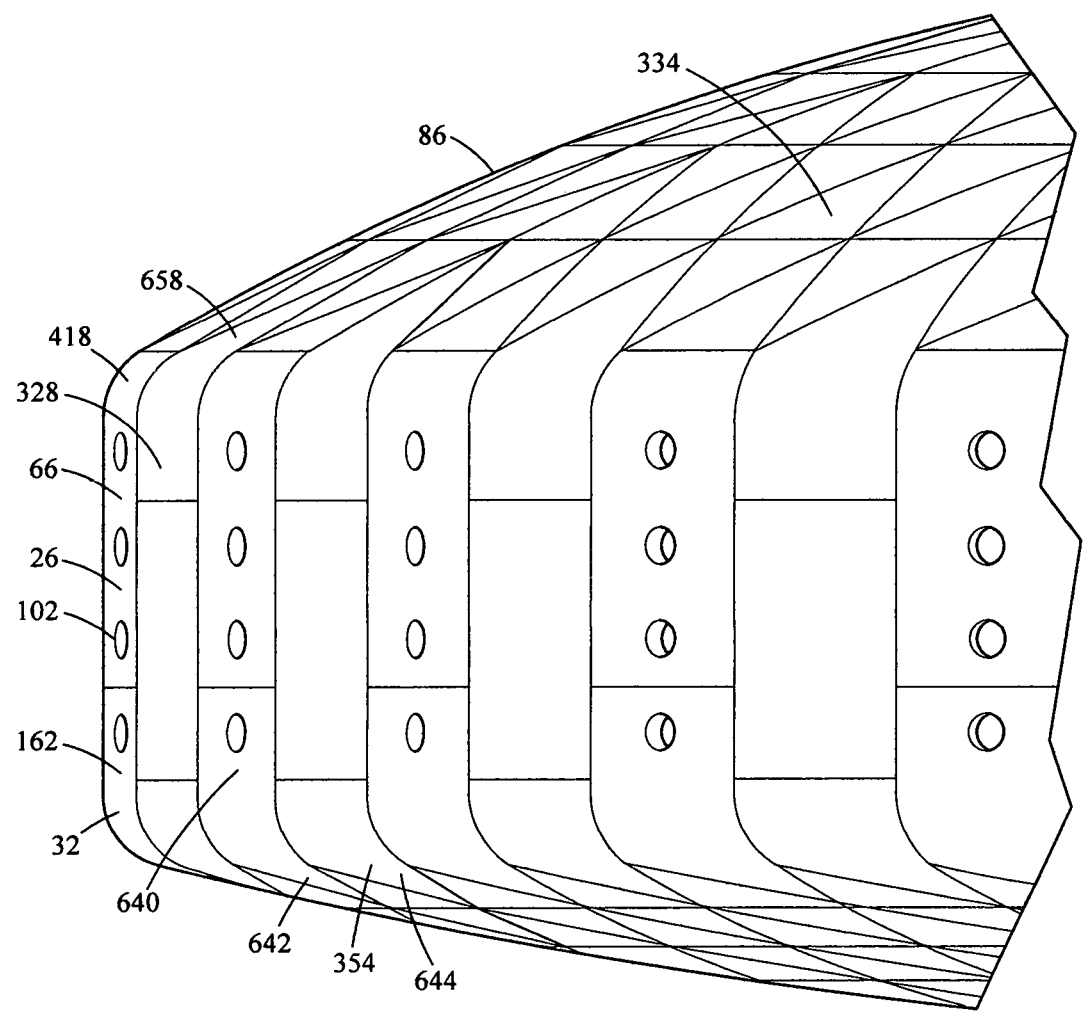
FIG. 31 is an elevation view of a segment of the building enclosure of the second preferred embodiment with window openings and without skylight openings.
Figure 32:
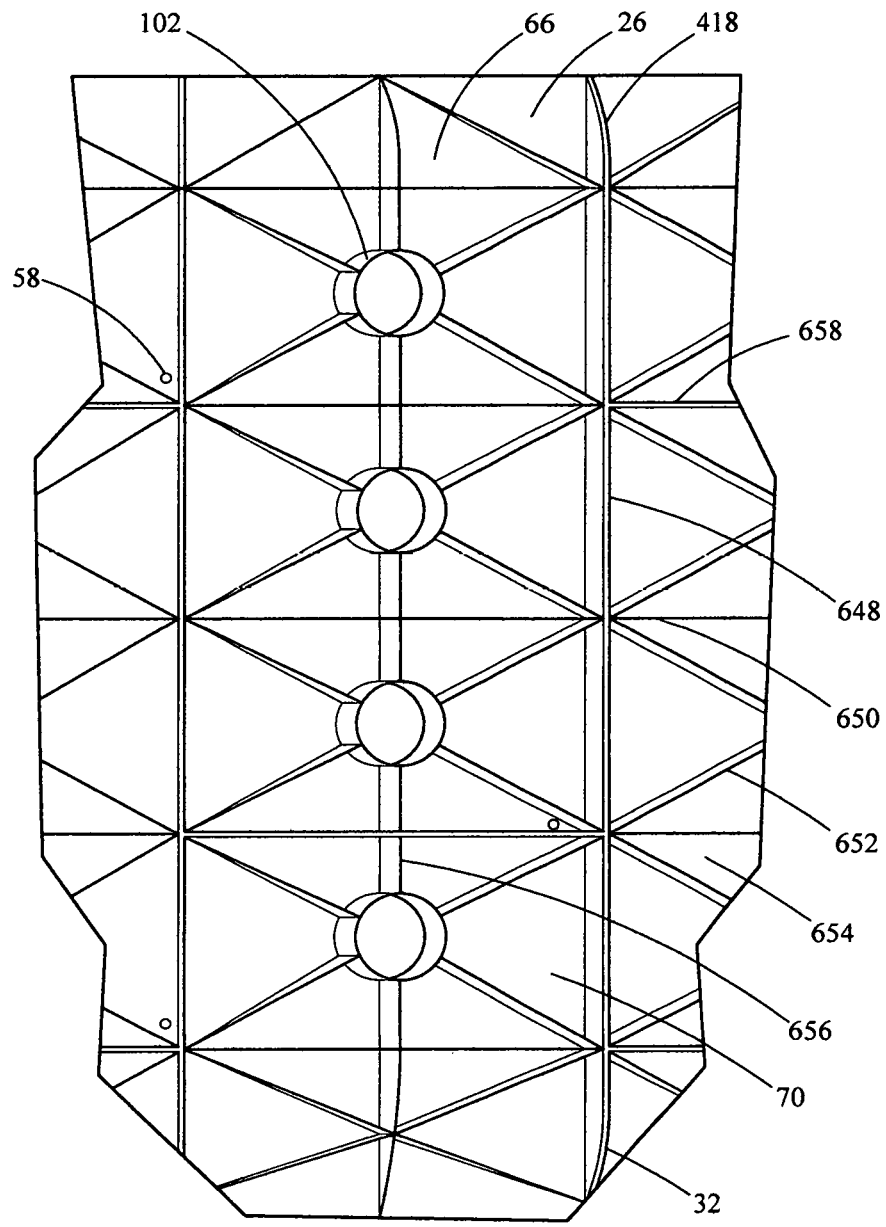
FIG. 32 is an elevation view of the integral internal bracing of the perimeter-wall panels of the assembly of the second preferred embodiment.
Figure 33:
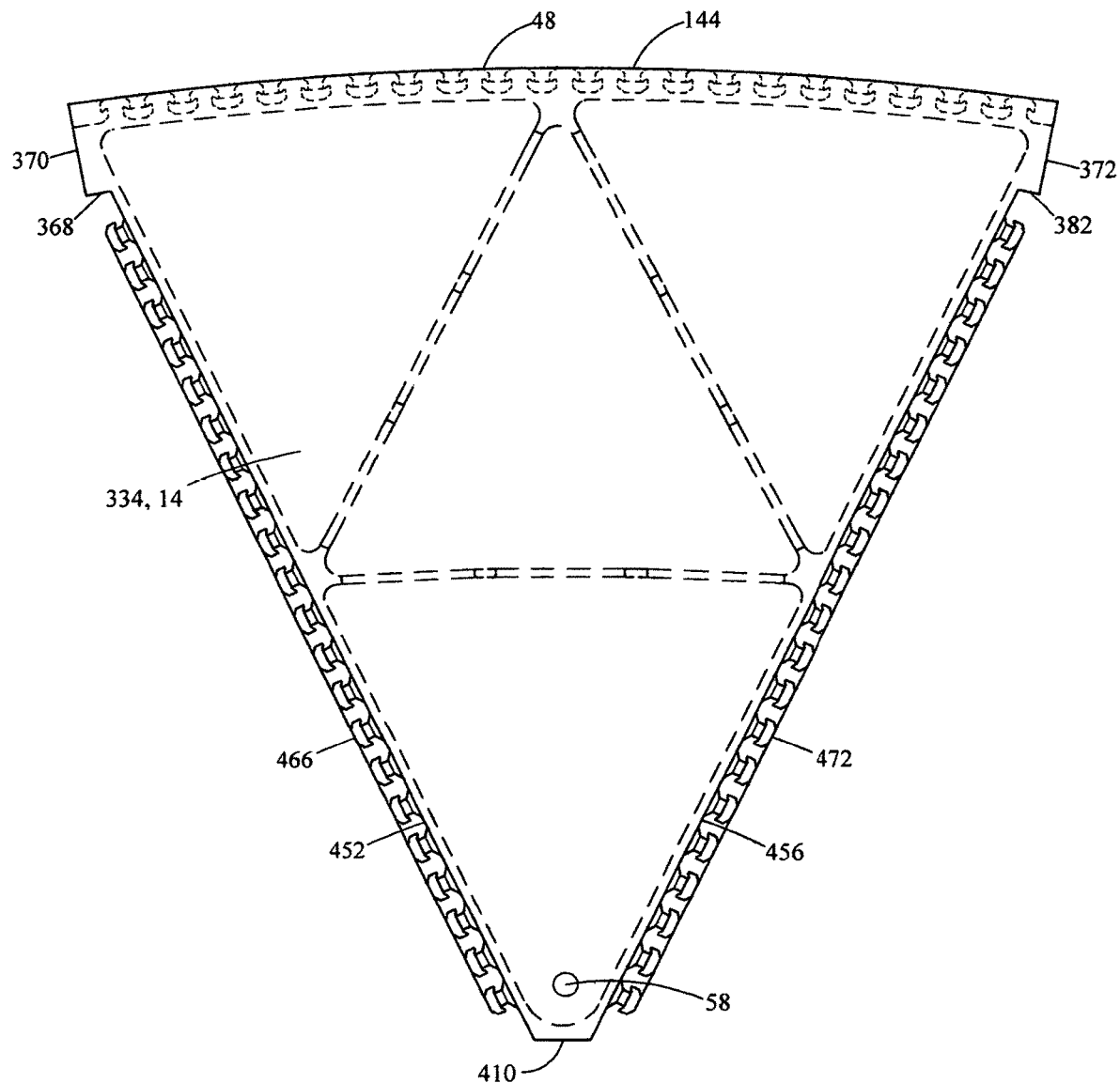
FIG. 33 is a plan view of a dome panel without skylight openings of the second preferred embodiment.
Figure 34:
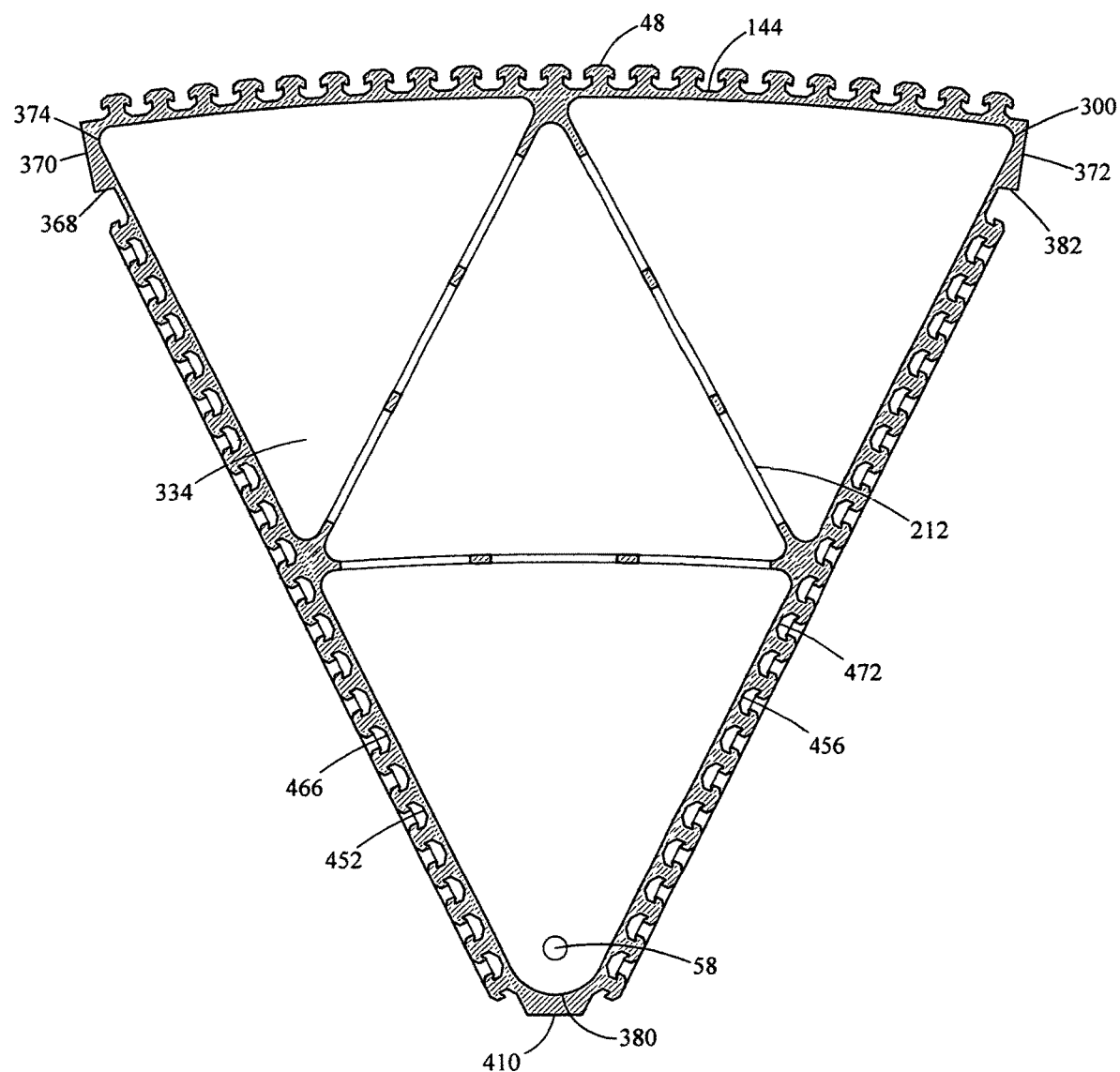
FIG. 34 is a sectional plan view of a dome panel without skylight openings of the second preferred embodiment.

In a second preferred embodiment, as shown in FIGS. 31-34, there is provided the building enclosure 16 of the first preferred embodiment with a modified perimeter structure for providing repeating vertical circular-window arrangements. The vertical circular window arrangements are necessary to allow vertical loads to transfer downward with minimal obstruction and to provide natural light and exterior views to the perimeter interiors of the building enclosure 16 of the present invention. FIG. 31 shows: the female dome panel 334; the perimeter-wall 26 having structural window cylinders 102 in the upper window-panels 66 and the lower window panels 162; the panels further having an upper toroid 418 and a lower toroid 32 with a generally-square integral upper extension 640 and a lower integral triangular extension 642; a foundation-toroid panel 354 also having a lower integral triangular extension 644; and concourse panels 328 defined by the single-curvature of the perimeter-wall 26, and the double-curvatures of the upper-toroid 418, and having an integral upper triangular extension 658 defined by the double-curvature of the spheric dome 86. FIG. 32 shows: the internal integral bracing and the joints of the perimeter wall 26 of the interlocking building system 10 of the first preferred embodiment, having: vacuum ports 58, structural window cylinders 102 in the upper window-panel 66; an upper-toroid joint 418; a horizontal joint 658; a vertical joint 648; a horizontal brace 650; a diagonal brace 652; a perimeter-wall panel 654; a vertical brace 656; a lower window-panel 70; and a lower-toroid joint 32. FIG. 33 shows the female dome panel 334 with an integral upper structural skin 14 having: a single-curved, vertical, male panel side 144 and two straight panel sides 452, 456 defined by vertical planes and having upward-extending female interlocks 466, 472 between exterior vertical corner surfaces 368, 370, 372, 382, 410. FIG. 34 shows the lower half of the female dome panel 334, having a lower panel skin that reinforces the bottom edges of all vertical panel members, further showing straight panel sides 452, 456 of exterior interlocks 466, 472, vacuum ports 58, a curved panel side 144 of exterior interlocks 48, perforated integral internal bracing 212, inner panel rounds 300, 380, and corner surfaces 368, 370, 372, 382, 410. The vertical corner surface 410 is flat to eliminate a sharp corner, thereby creating a void in a corner joint with adjacent panels. The remaining corner surfaces 368, 370, 372, 382 are thus shaped to fill the void in the joint, as described hereafter, such that the corner surfaces 370, 372, are perpendicular to the flat adjacent surfaces 368, 382 and the adjacent curved surface 144. All panels of the building enclosure 16 that are made of a metal, steel, or alloy are forged by the same necessary but effective method, wherein the upper half-panel of FIG. 33 and the lower half-panel of FIG. 34 are hydraulically-pressed separately and forge-welded together having thick panel sides with no interlocks, which are subsequently forged into the panel sides wherein metal is removed to establish smooth interlocking surfaces 48, 466, 472, 144, 452, 456 with close dimensional tolerances for easy panel sliding. Forge-welding is a solid-state welding process wherein coalescence between parts is produced first by heating a metal, steel, or alloy to between fifty-percent and ninety-percent of its melting point, and secondly, by applying pressure or blows sufficient to cause permanent bonding at the interface. Such an interface may be defined by a double-curved plane, for toroids 418, spheric domes 86, and spheric foundations 28, a single-curved plane, for cylinders 662, a flat level plane, for floors 38, a vertical plane, for straight interior walls 24, or any combination of planes therefrom. The positions of the panel interfaces are such that the vertical panel sides 144, 452, 456 and the perforated vertical internal bracing 212 of the female dome panel 334 intersect a double-curved plane that is centered halfway between and parallel to the two curved panel faces, thereby forming an interior panel space with three or more sides having interior corner rounds 300, 374, 380 and two or more panel faces.

Figure 35:
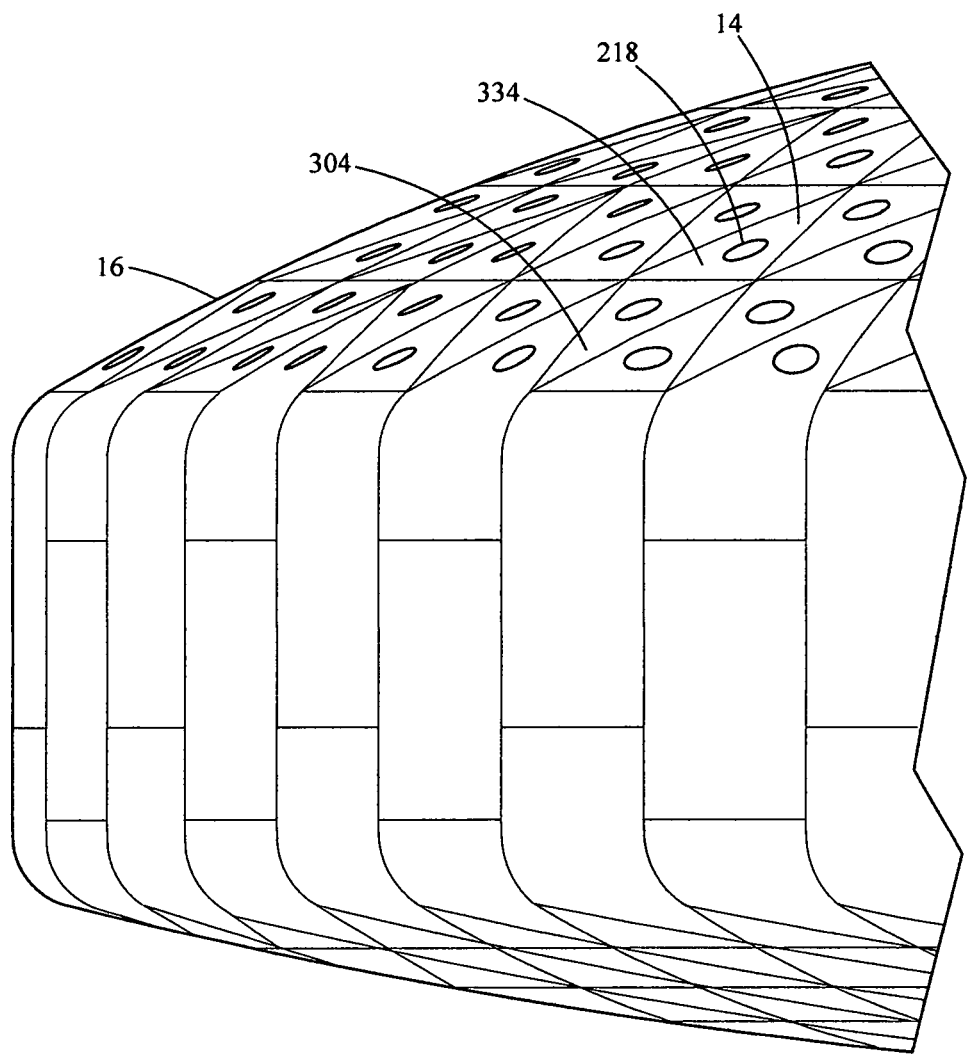
FIG. 35 is an elevation view of a segment of the building enclosure of the third preferred embodiment with skylight openings and without window openings.
Figure 36:
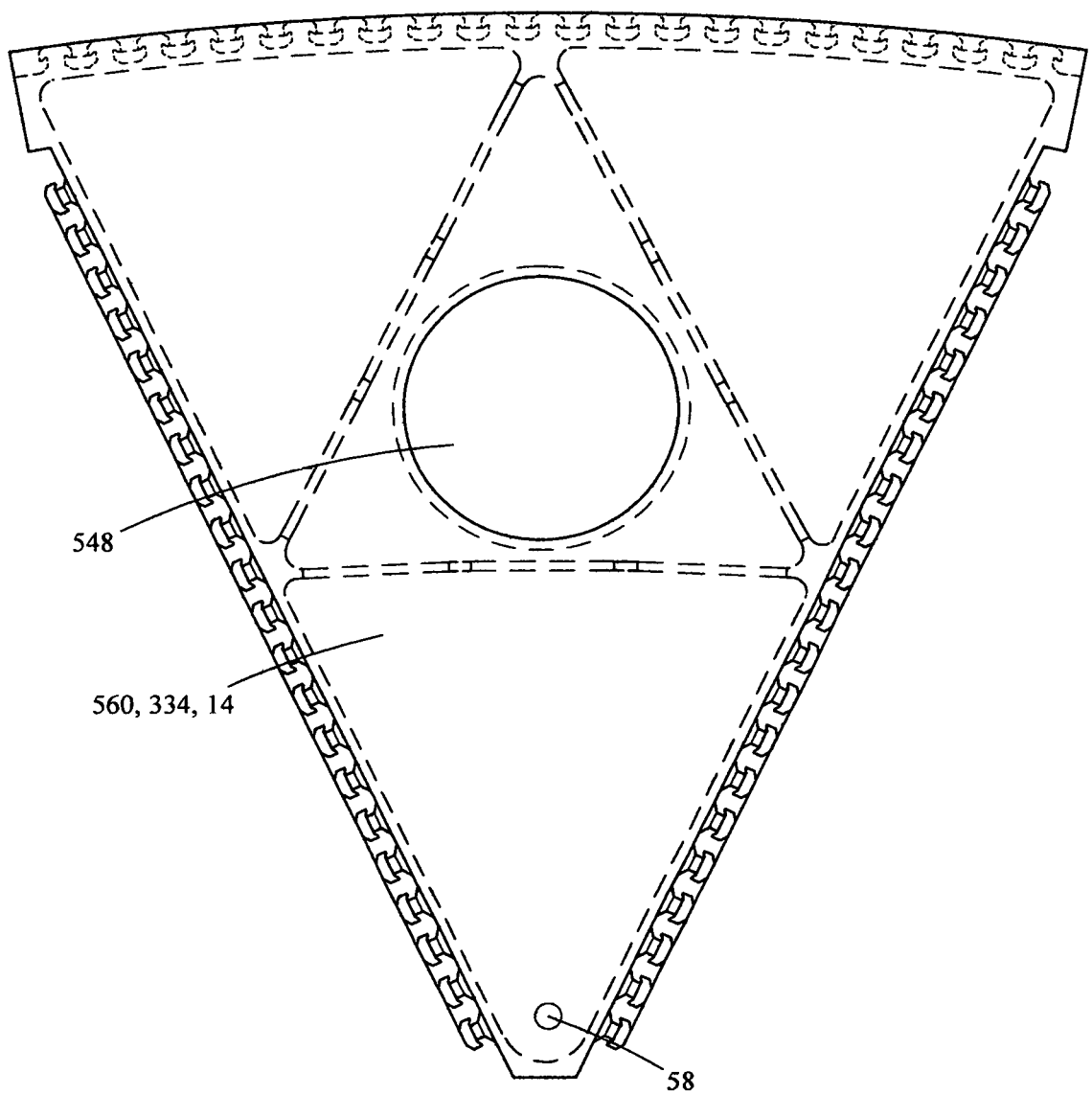
FIG. 36 is a plan view of a dome panel of the third preferred embodiment with a single skylight opening.
Figure 37:
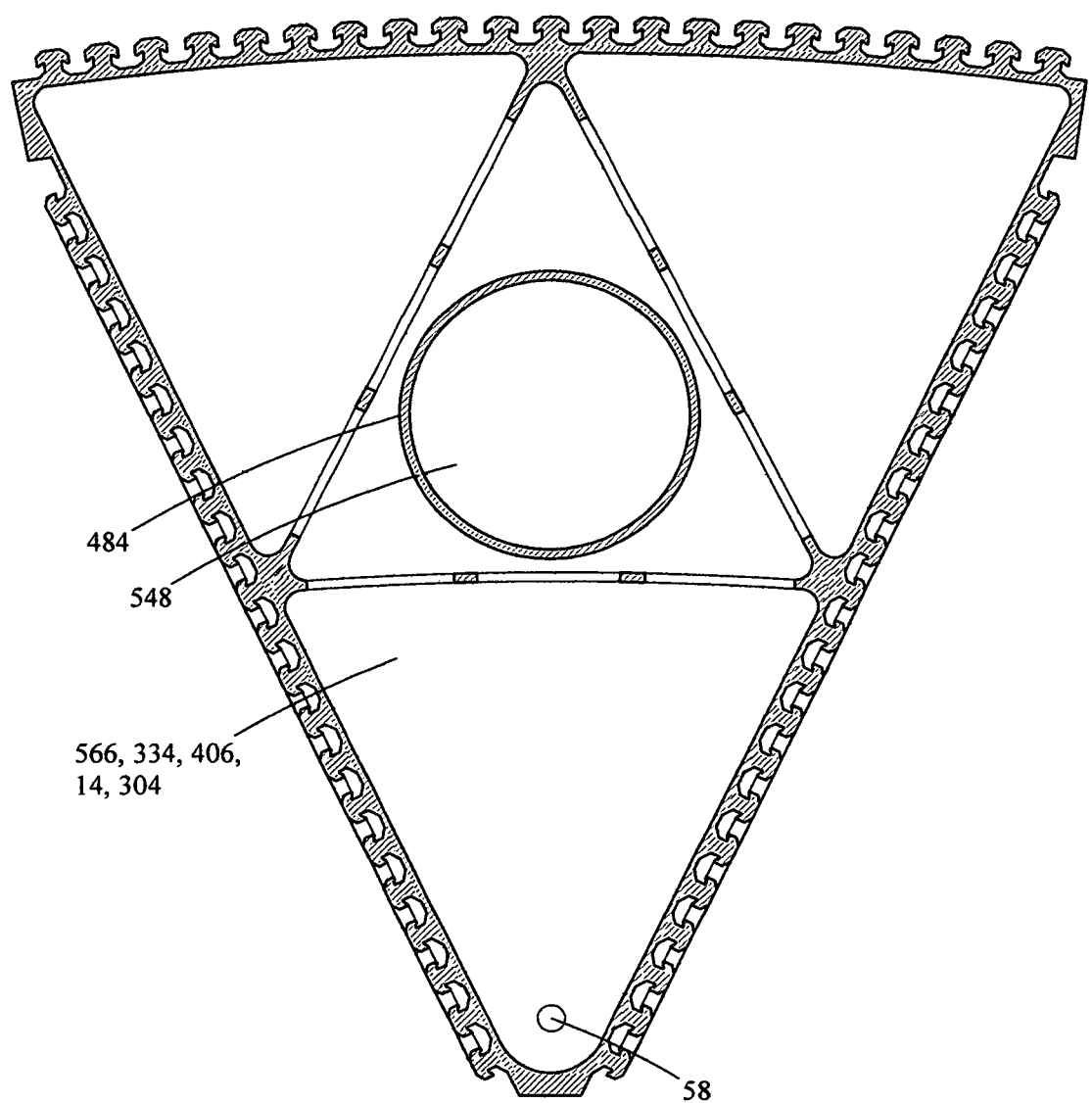
FIG. 37 is a sectional plan view of a dome panel of the third preferred embodiment with a single skylight opening.

In a third preferred embodiment, as shown in FIGS. 35-37, there is provided the building enclosure 16 of the first preferred embodiment as described heretofore, having modified male and female dome panels 304, 334 for providing one or more skylight openings 218 centered in the upper structural skin 14 of each panel. The skylight openings 218 are necessary to reduce panel dead weight and to provide sky-views and sunlight to the building interior. FIG. 35 shows the building enclosure 16 similar to the building enclosure of FIG. 31, except for the modifications described heretofore. FIG. 36 shows an upper half-panel similar to the upper half-panel of FIG. 33, except for the addition of one or more skylight openings 548, as described heretofore. FIG. 37 shows a vacuum port 58, a lower half-panel similar to the lower half-panel of FIG. 35, except for the addition of a structural window cylinder 484 and the addition of one or more skylight openings 548, as described heretofore.

Figure 38:
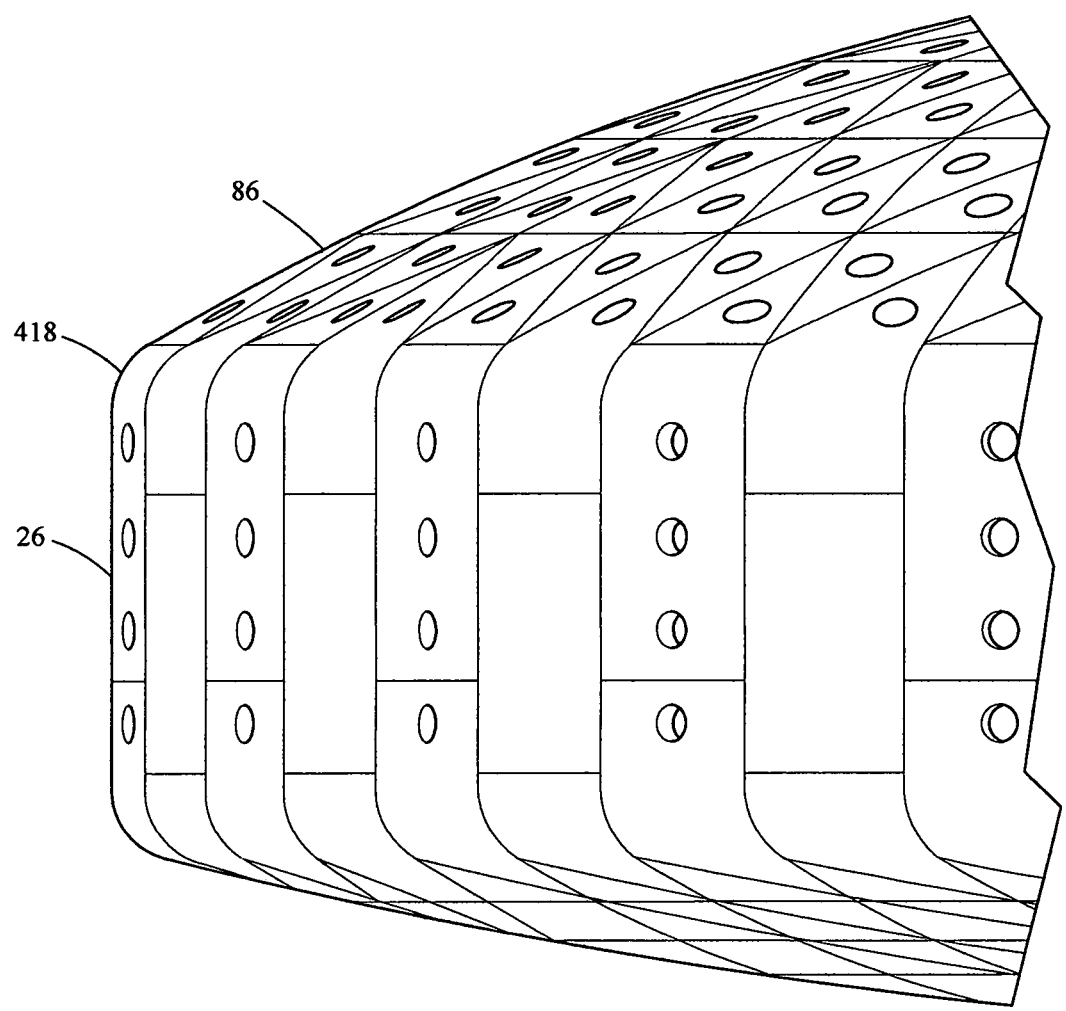
FIG. 38 is an elevation view of a segment of the building enclosure of the fourth preferred embodiment with skylight openings and window openings.

In a fourth preferred embodiment, as shown in FIG. 38, there is provided the building enclosure 16 of the first preferred embodiment as described heretofore, having the skylight openings of FIG. 35 of the third preferred embodiment, and the window openings of FIG. 31 of the second preferred embodiment, for providing a building enclosure 16 having full views, full natural lighting, and reduced panel dead-weights. FIG. 38 additionally provides the perimeter-wall 26, the spheric dome 86, and the upper-building toroid 418.

Figure 39:
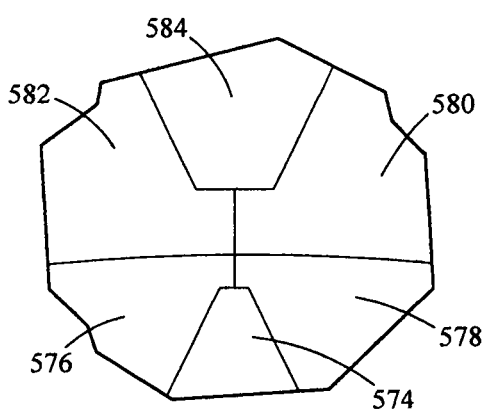
FIGS. 39-56 are detail views and horizontal sectional detail views of the joint intersections of domes and foundations of the first preferred embodiment.
Figure 40:
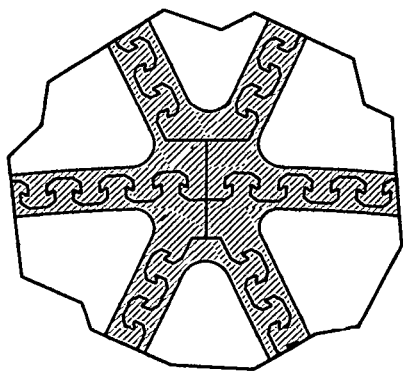
Figure 41:
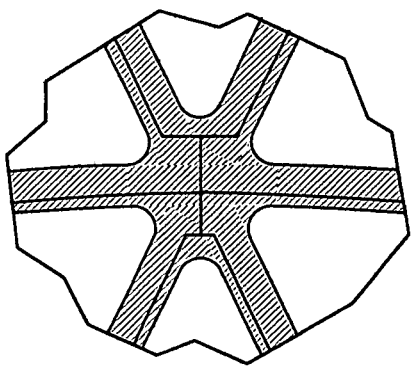

Referring to FIGS. 39-56, there is illustrated a plan detail view and sectional plan detail views for each of the six, vertically-slide-locking, heavy-duty joints of the first preferred embodiment. Each plan detail view shows the configuration of the upper seams of the joint and the critical order of the panel placements, as shown by the progression of the numeric references of the view. In FIG. 39, there is illustrated a plan detail view of a first six-panel foundation joint of the first preferred embodiment, showing: a first-placed female panel 574; a second-placed male panel 576; a third-placed male panel 578; a fourth-placed female panel 580; a fifth-placed female panel 582; and a sixth-placed male panel 584. In FIG. 40, there is illustrated a sectional plan detail view of the interlocks of the foundation joint of the first preferred embodiment, wherein four diagonal braces and a curved ring-segment brace one another against heavy dead-loads and catastrophic live-loads. In FIG. 41, there is illustrated a second sectional plan detail view showing the joint interfaces located just below the upper joint seams and above the panel slide-locks of the first preferred embodiment.

Figure 42:
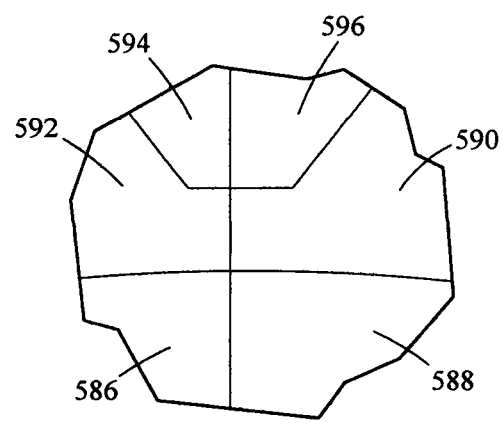
Figure 43:
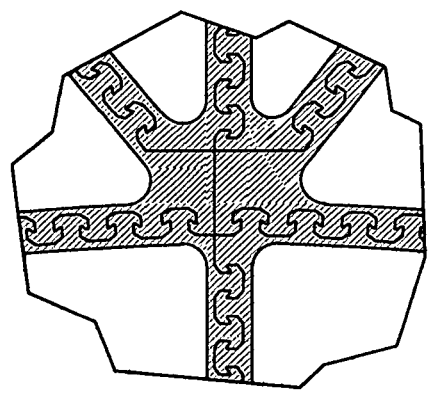
Figure 44:
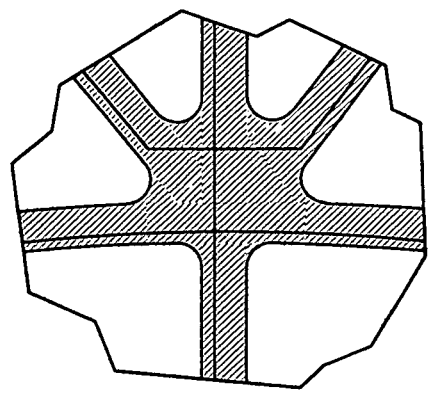

In FIG. 42, there is illustrated a plan detail view of a second six-panel foundation joint of the first preferred embodiment, showing: a first-placed female panel 586; a second-placed male panel 588; a third-placed female panel 590; a fourth-placed female panel 592; a fifth-placed female panel 594; and a sixth-placed male panel 596. In FIG. 43, there is illustrated a sectional plan detail view of the interlocks of the foundation-joint of the first preferred embodiment, wherein two diagonal braces, a ring-segment, and one of the eight primary foundation-arcs brace one another against heavy dead-loads and catastrophic live-loads. In FIG. 44, there is illustrated a second sectional plan detail view showing the joint interfaces located just below the upper joint seams and above the panel slide-locks of the first preferred embodiment.

Figure 45:
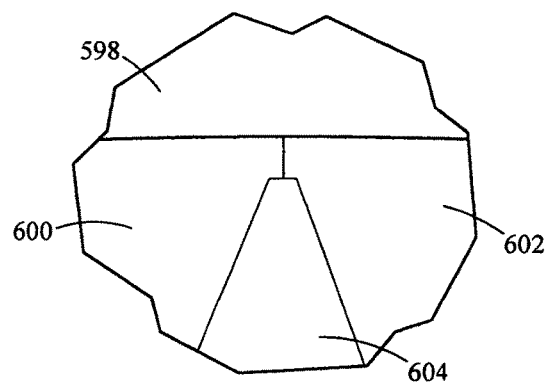
Figure 46:
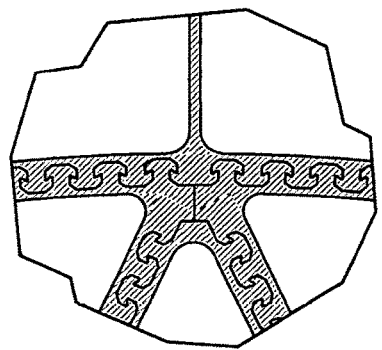
Figure 47:
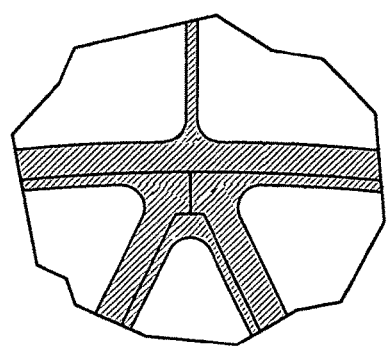

In FIG. 45, there is illustrated a plan detail view of a three-panel floor-joint adjacent to the perimeter-wall of the first preferred embodiment, showing: a first-placed perimeter wall panel 598; a second-placed male floor-panel 600; a third-placed male floor-panel 602; and a fourth-placed female floor-panel 604. In FIG. 46, there is illustrated a sectional plan detail view of the interlocks of the floor-joint of the first preferred embodiment, wherein two braces, an internal brace, and a ring-segment brace one another against heavy dead-loads and catastrophic live-loads. In FIG. 47, there is illustrated a second sectional plan detail view showing the joint interfaces located just below the upper joint seams and above the panel slide-locks of the first preferred embodiment.

Figure 48:
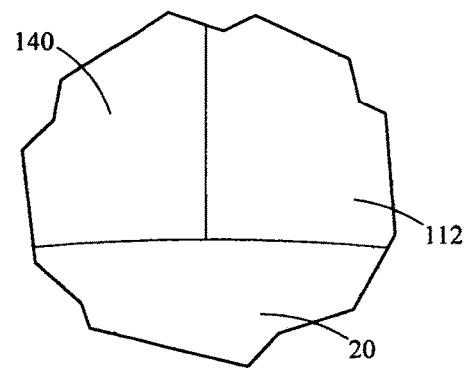
Figure 49:
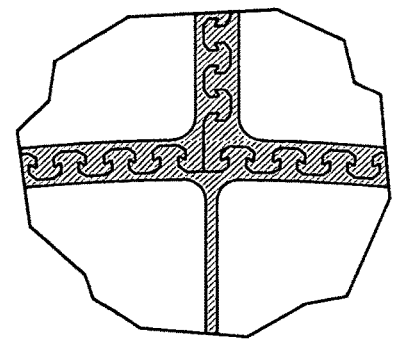
Figure 50:
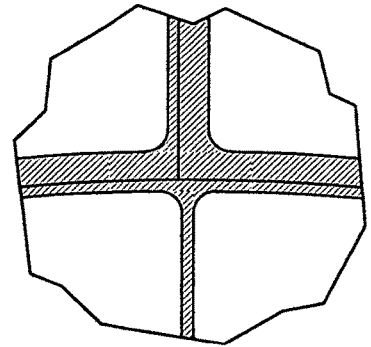

In FIG. 48, there is illustrated a plan detail view of a three-panel central-foundation joint of the first preferred embodiment, showing: a first-placed, circular, female central-foundation panel 20; a second-placed, four-sided, female foundation-panel 112; and a third-placed, four-sided, male foundation-panel 140. In FIG. 49, there is illustrated a sectional plan detail view of the interlocks of the foundation-joint of the first preferred embodiment, wherein a central foundation-panel brace and two first-row foundation-panels brace one another against heavy dead-loads and catastrophic live-loads. In FIG. 50, there is illustrated a second sectional plan detail view showing the joint interfaces located just below the upper-joint seams and above the panel slide-locks of the first preferred embodiment.

Figure 51:
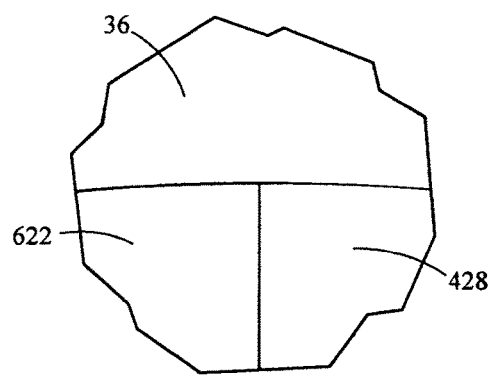
Figure 52:
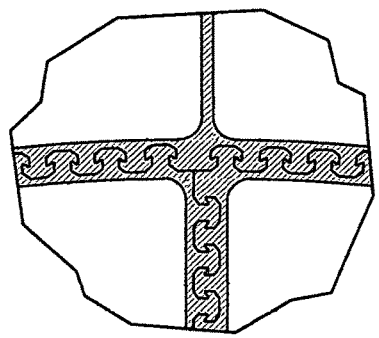
Figure 53:
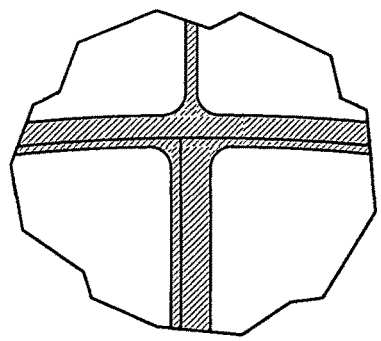

In FIG. 51, there is illustrated a plan detail view of a three-panel corner floor-joint of the first preferred embodiment, showing: a first-placed perimeter wall panel 36; a second-placed interior-wall panel 428; and a third-placed male floor-panel 622. In FIG. 52, there is illustrated a sectional plan detail view of the interlocks of the corner floor-joint of the first preferred embodiment, wherein an internal perimeter-wall brace, an interior-wall panel, and a corner floor-panel brace one another against heavy dead-loads and catastrophic live-loads. In FIG. 53, there is illustrated a second sectional plan detail view, showing the joint interfaces located just below the upper-joint seams and above the panel slide-locks of the first preferred embodiment.

Figure 54:
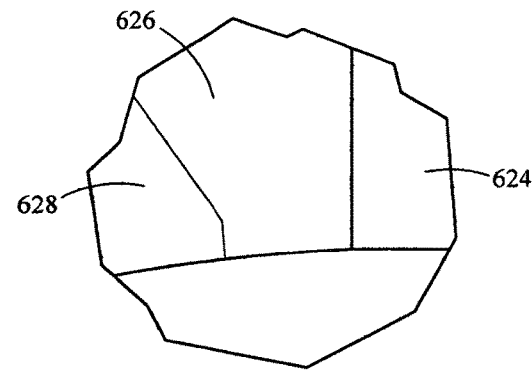
Figure 55:
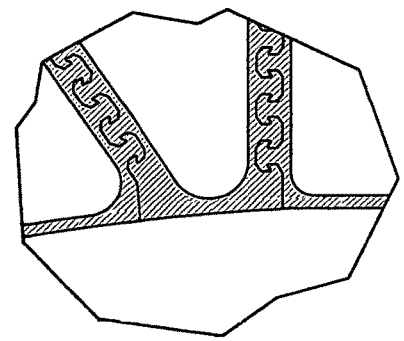
Figure 56:
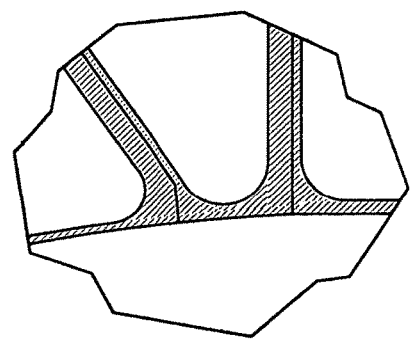

In FIG. 54, there is illustrated a plan detail view of a three-panel floor-joint of the first preferred embodiment, showing: a first-placed interior-wall panel 624; a second-placed, male, corner floor-panel 626; and a third-placed, male, panel 628. In FIG. 55, there is illustrated a sectional plan detail view of the interlocks of the floor-joint of the first preferred embodiment, wherein an interior-wall, a corner floor-panel, and a central floor-panel brace one another against heavy dead-loads and catastrophic live-loads. In FIG. 56, there is illustrated a second sectional plan detail view, showing the joint interfaces located just below the upper-joint seams and above the panel slide-locks of the first preferred embodiment.

Figure 57:
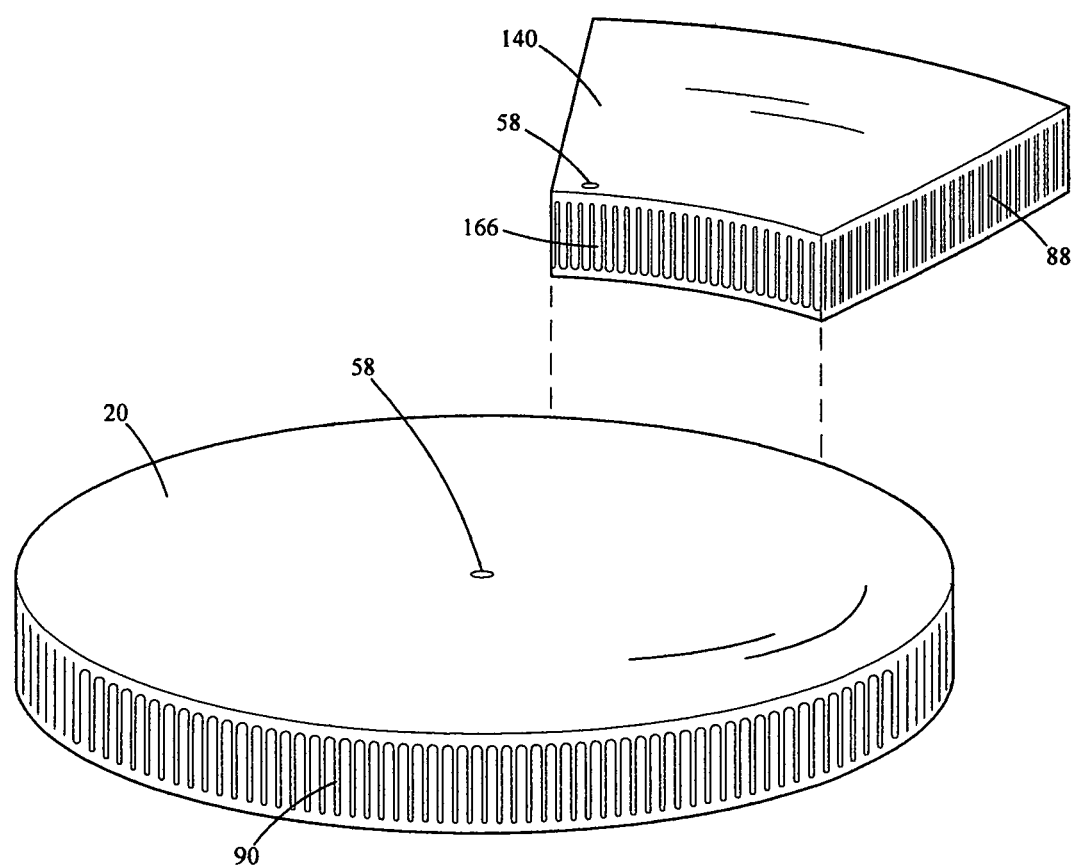
FIGS. 57-74 are perspective views of the step-by-step panel placements of the first preferred embodiment.
Figure 58:
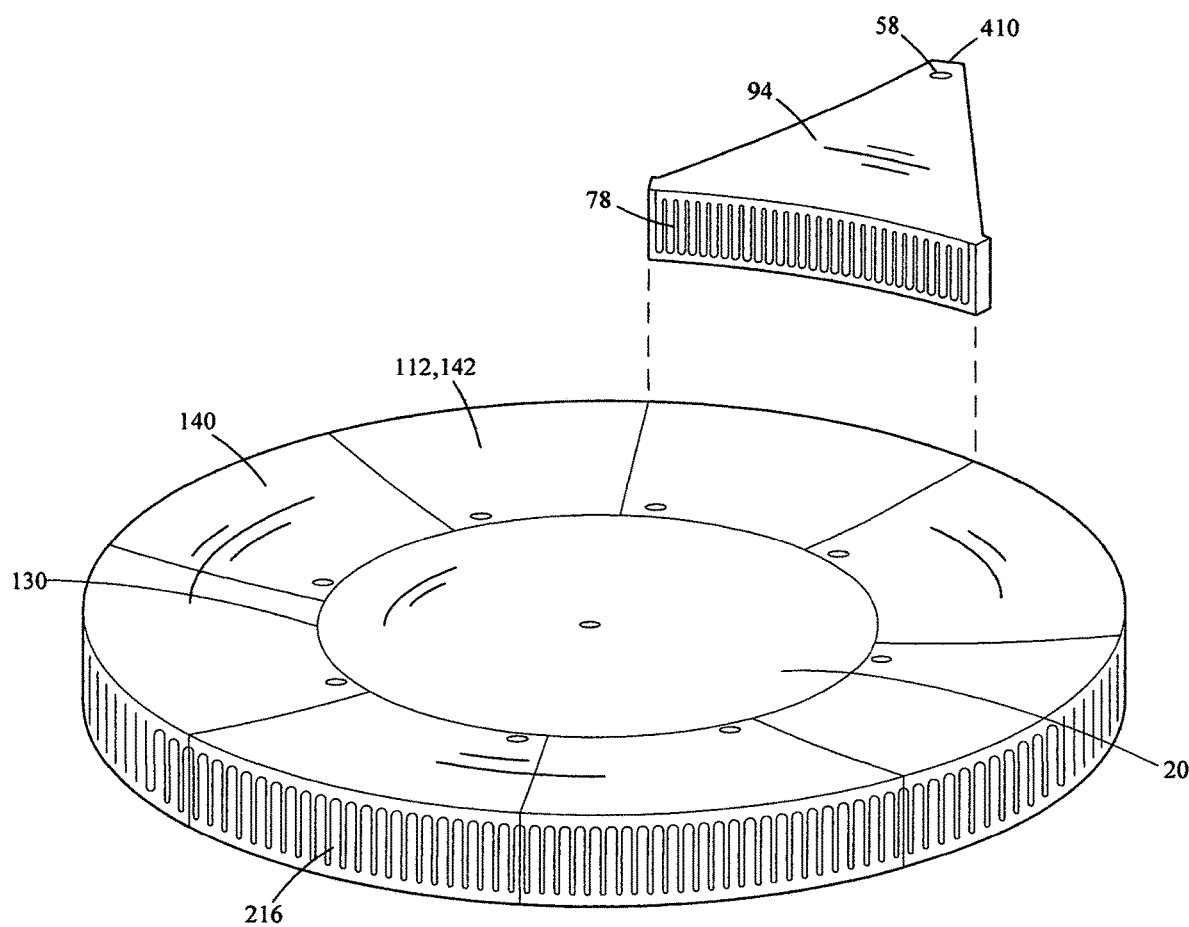
Figure 59:
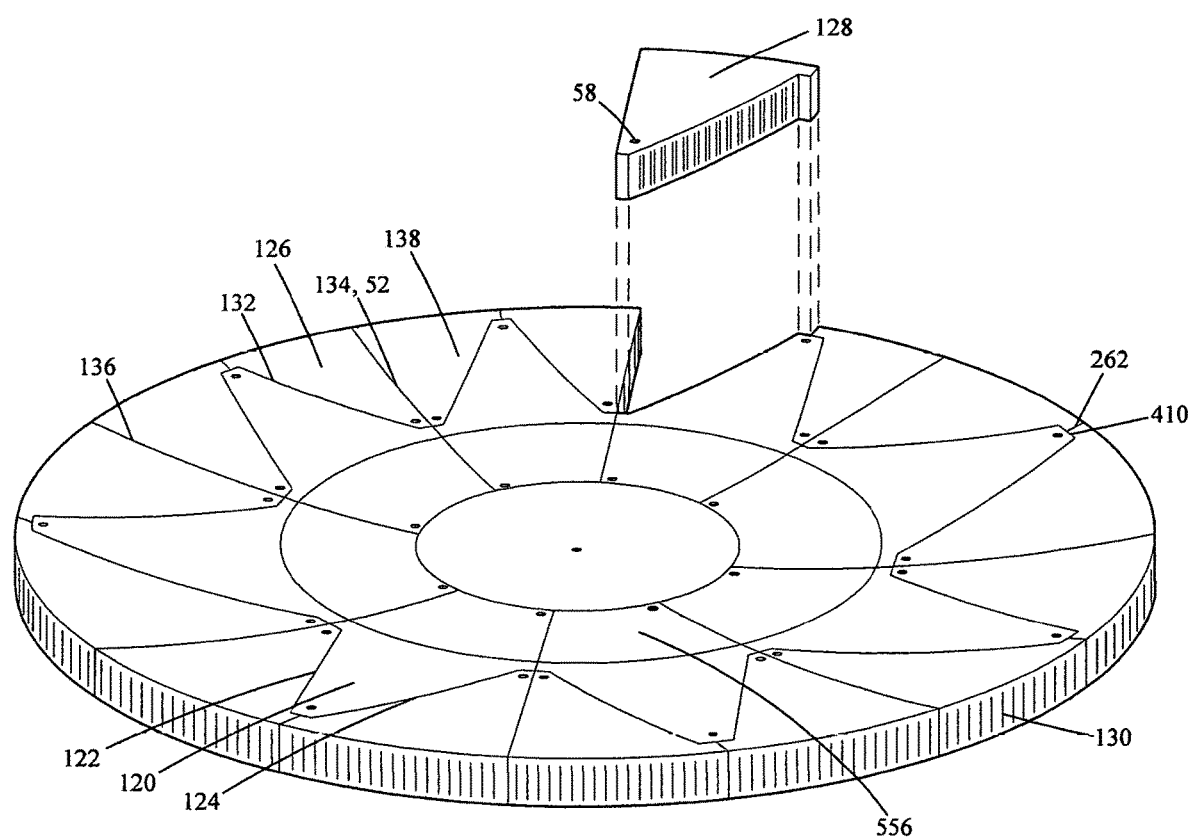

Referring now to FIGS. 57-75, there are illustrated perspective views of each type of panel placement of the interlocking building system 10 of the first preferred embodiment. In FIGS. 57-59, there are illustrated perspective views of the central foundation assembly. In FIG. 57, there is illustrated: the central foundation panel 20 having a perimeter of female interlocks 90; a curved generally-trapezoidal female panel 140 having sloped female interlocks 88 and male interlocks 166, the interlocks aligned for mating with the central foundation panel 20 of the first preferred embodiment. In FIG. 58, there is illustrated a perspective view of the first preferred embodiment, wherein the central circular foundation panel 20 provides eight open panel positions around its perimeter 130. Second, every other one of those positions is filled by curved trapezoidal female panels 112 that are placed one side at a time, subsequently receiving the four, curved, trapezoidal male panels 140 that are placed three sides at a time, thereby completing the first row of central foundation panels 142 and having a complete perimeter of female interlocks 216 for beginning the second foundation row, wherein all panels are placed one row at a time, with all triangular female panels 94 placed before the male panels of the row, each having a panel tip 410, a vacuum port 58, and one side of male-interlocks 78 that mate with the outer female interlocks of the first panel-row.

Figure 60:
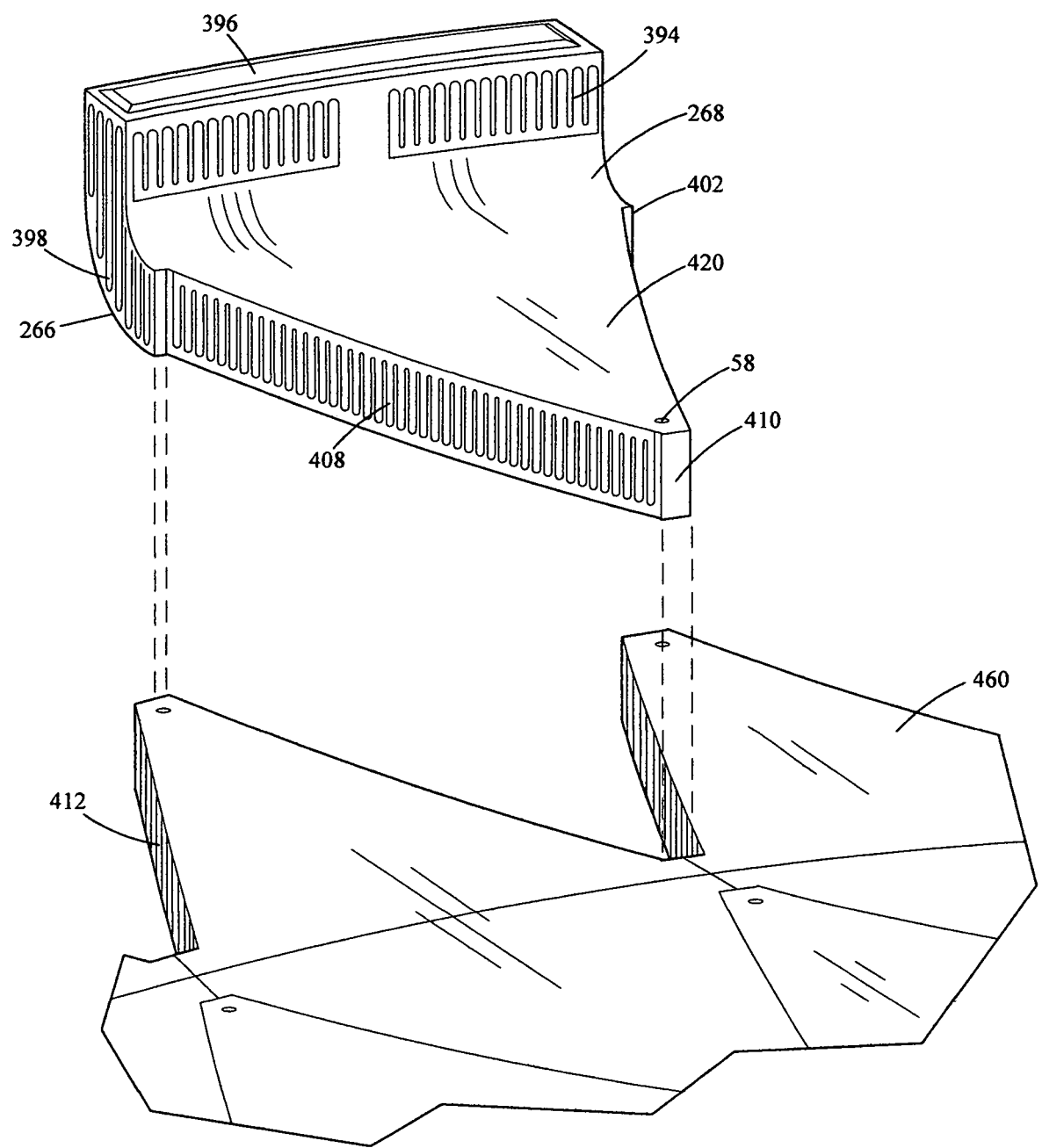

Referring to FIG. 59, there is illustrated a perspective view of the double-curved central foundation assembly of the first preferred embodiment, showing: vacuum ports 58, the first triangulated row 138 of the inverted-lamella pattern 134, as applied to the interlocking building system 10. Further, there is illustrated a female isosceles-triangle panel 120 having two female sides 122, 124, a continuous outer perimeter of female interlocks 130, a descending male right-triangle panel 128, and a segment 136 of one of the eight inverted arches of the lamella pattern 134. Additionally, there is illustrated a male right-triangle panel 126 having two male sides 132, 52, a first foundation panel row 556, and the upper seams 262, 410 of the panel corner features of the interlocking building system 10 of the first-preferred embodiment. Referring to FIG. 60, there is illustrated: vacuum ports 58, a foundation-toroid panel 420, having: male side interlocks 408, upper, inner-face, female interlocks 394 for receiving a first-floor panel; a stationary female foundation panel 460, female side interlocks of a stationary triangular foundation panel 412, toroid interlocks 398, the panel top plate 396 for receiving a descending vertical wall panel; the outer and inner toroids 266, 268, and the side and corner features 402, 410, respectively.

Figure 61:
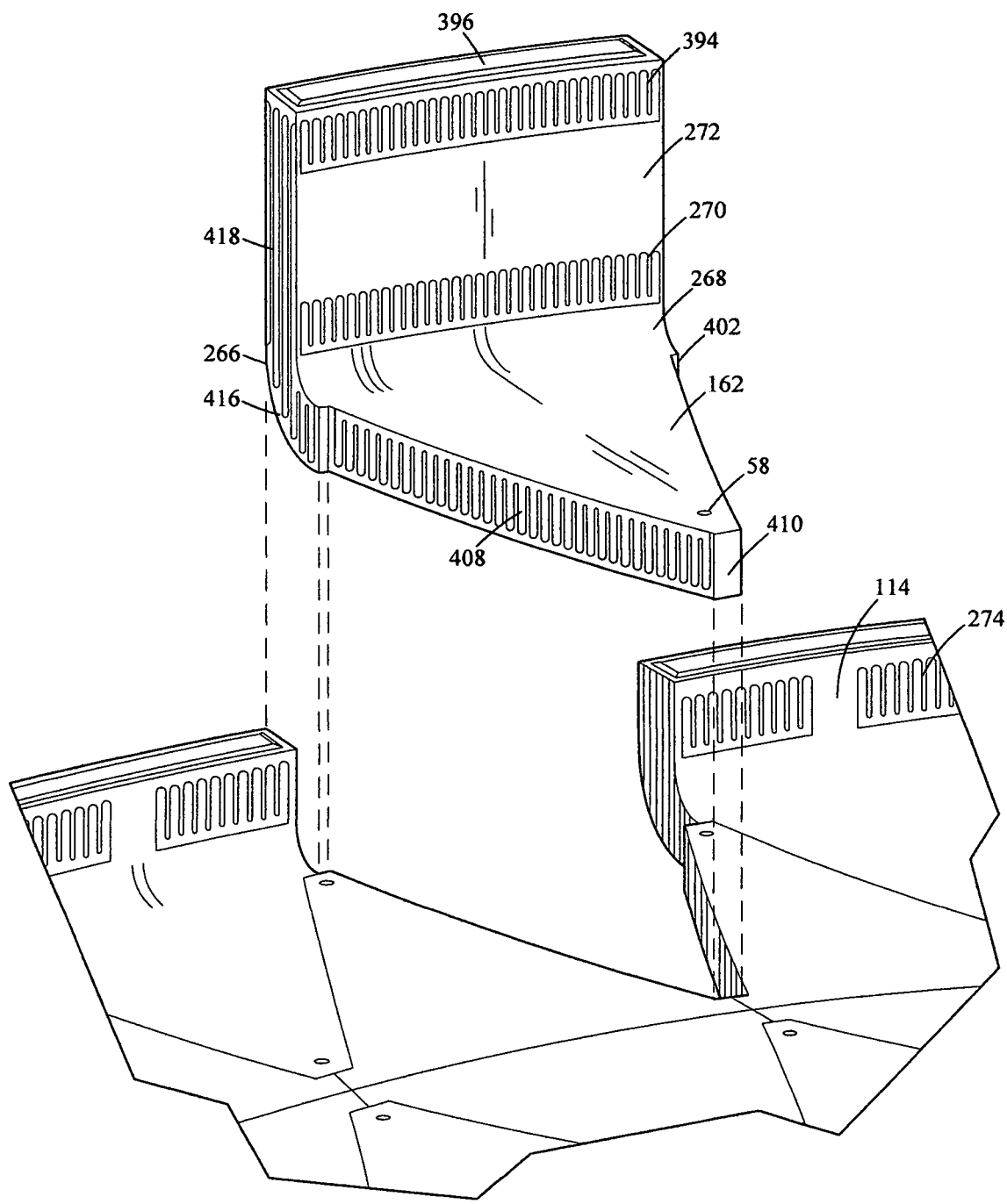

Referring now to FIGS. 61-64, there are illustrated perspective views of each type of panel placement of the interior-walls and perimeter-wall of the interlocking building system 10 of the first preferred embodiment. In FIG. 61, there is illustrated: vacuum ports 58, a perimeter-toroid panel 162 having: a single-curved upward-extension 272 with long-slide tongues and grooves 418 on vertical panel sides; further having male side interlocks 408; horizontal female interlocks 270, 274, 394 for receiving lower floor panels; the panel top plate 396; the interlocks of the perimeter-toroid joint 416; and the corner feature 402. Additionally, there is illustrated: open space for an interior-wall long-slide 114, the outer and inner surfaces of the panel-toroid 266, 268, respectively; and the panel tip 410 of the first preferred embodiment.

Figure 62:
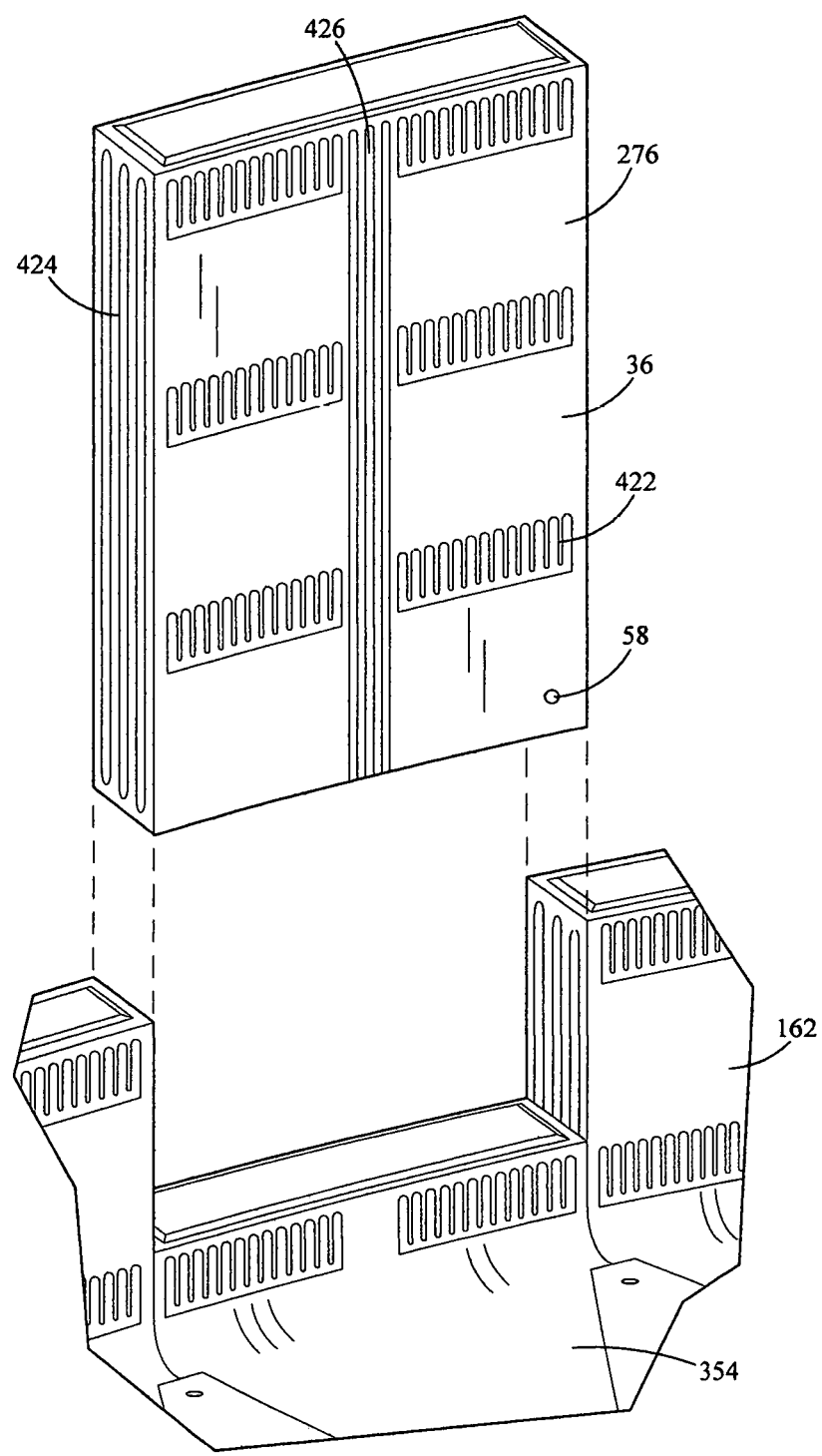
Figure 63:
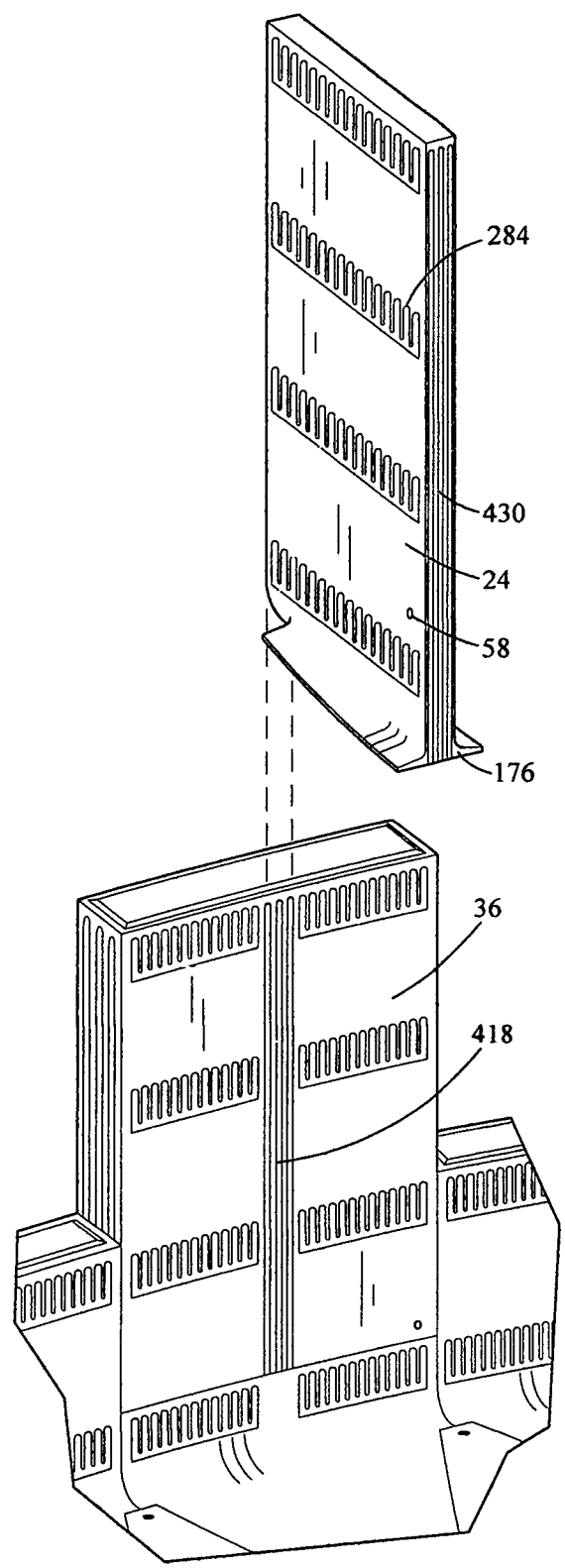
Figure 64:
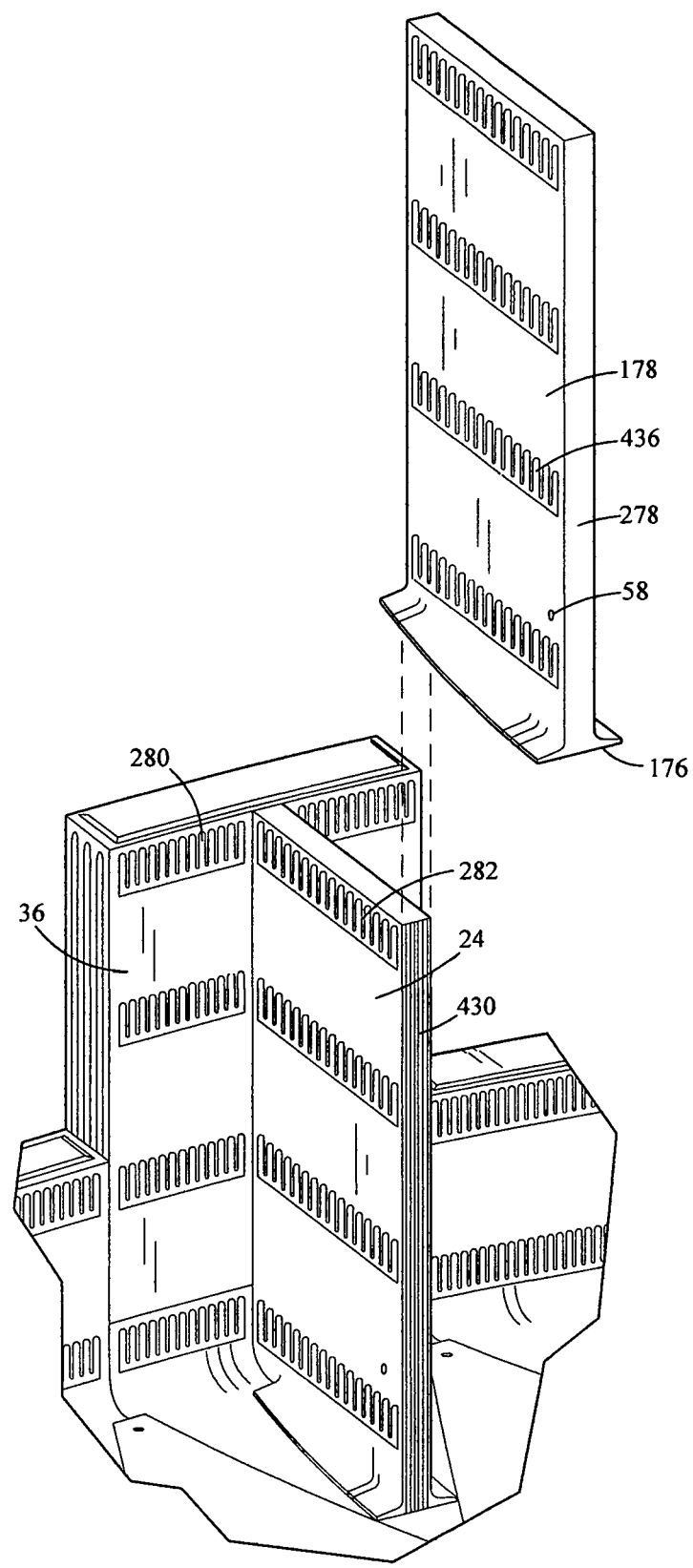
Figure 65:
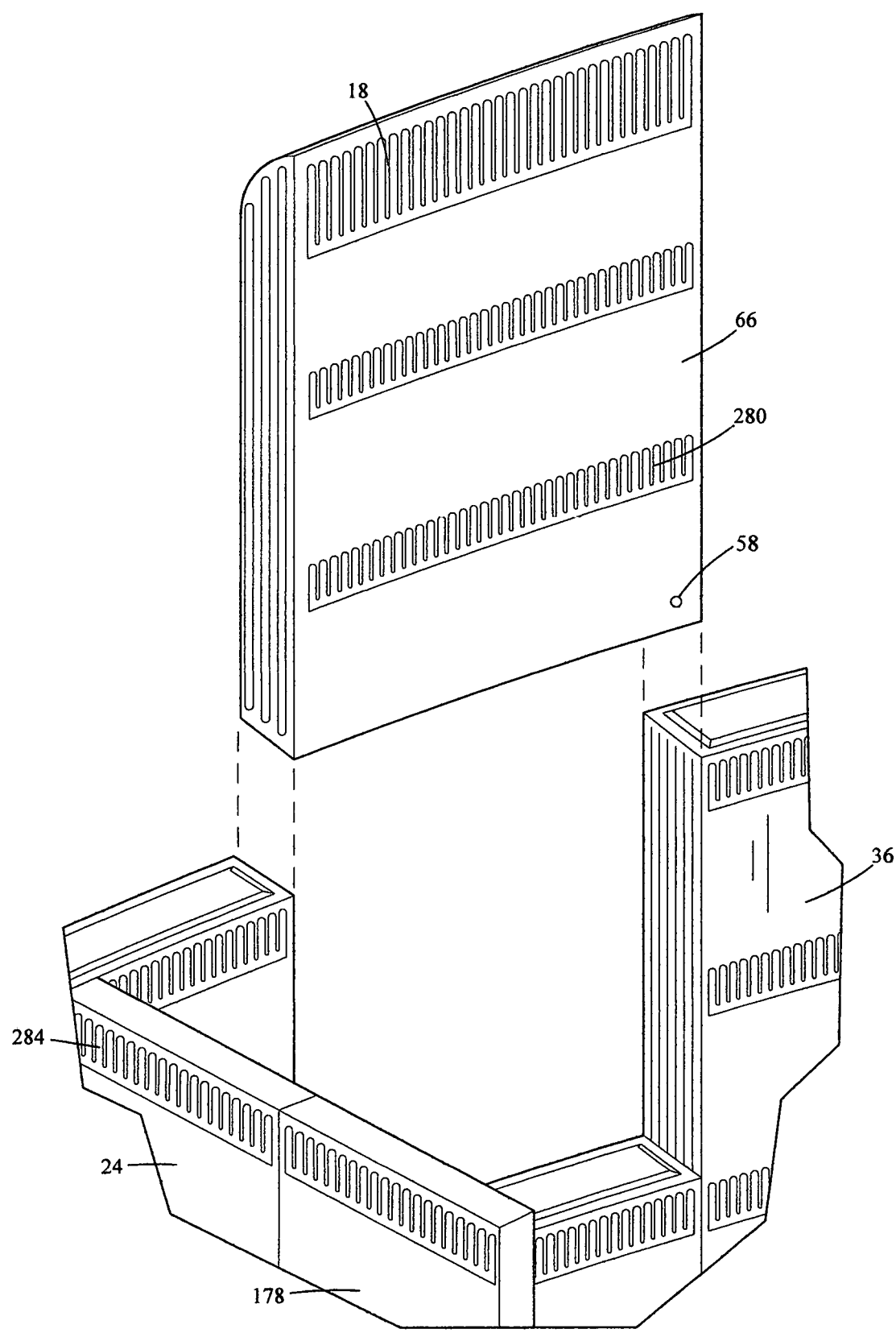

Referring to FIG. 62, there is illustrated a perspective view of the interlocking building system 10 of the first preferred embodiment, showing: the vertical long-slide interlocks 424 on the panel sides of a perimeter-wall panel 36 aligned for mating with the side interlocks of a pair of perimeter-toroid panels 162 and supported from below by a foundation-toroid panel 354. Further, there is illustrated: vacuum ports 58, horizontal strips of female interlocks 422 for receiving floor panels; and centered long-slide interlocks 426 on the inner faces 276 of perimeter-wall panels 36. Referring to FIG. 63, there is illustrated: a perspective view of a first interior-wall panel 24 aligned for mating with the long-slide interlocks 418 of a perimeter-wall panel 36. Also, there is shown: vacuum ports 58, the horizontal strips of female interlocks for floors 284; an interior-wall footing 176; and the second long-slide interlocks 430 of the interlocking building system 10 of the first preferred embodiment. Referring to FIG. 64, there is illustrated a perspective view of vacuum ports 58, a second interior-wall panel 178 aligned for mating with the first interior-wall panel 24 that is fully slide-locked with the perimeter-wall panel 36 and provides long-slide interlocks 430. Further, there is illustrated female interlocks 280, 282, 436, for floors; an interior-wall panel side having no interlocks 278; and the second interior-wall panel footings 176. Referring now to FIG. 65, there is further illustrated perspective views of each type of panel placement of the walls of the interlocking building system 10, of the first preferred embodiment. In FIG. 65, there is illustrated a perspective view of: a vacuum port 58, an upper-perimeter panel 66 aligned for mating with the perimeter-wall panels 36; a first interior-wall panel 24; a second interior-wall panel 178; the deep interlocks 18 of the the interior face of an upper-perimeter panel 66 having female interlocks for floors 280, and the female interlocks for top floors on the first and second interior-wall panels 284.

Figure 66:
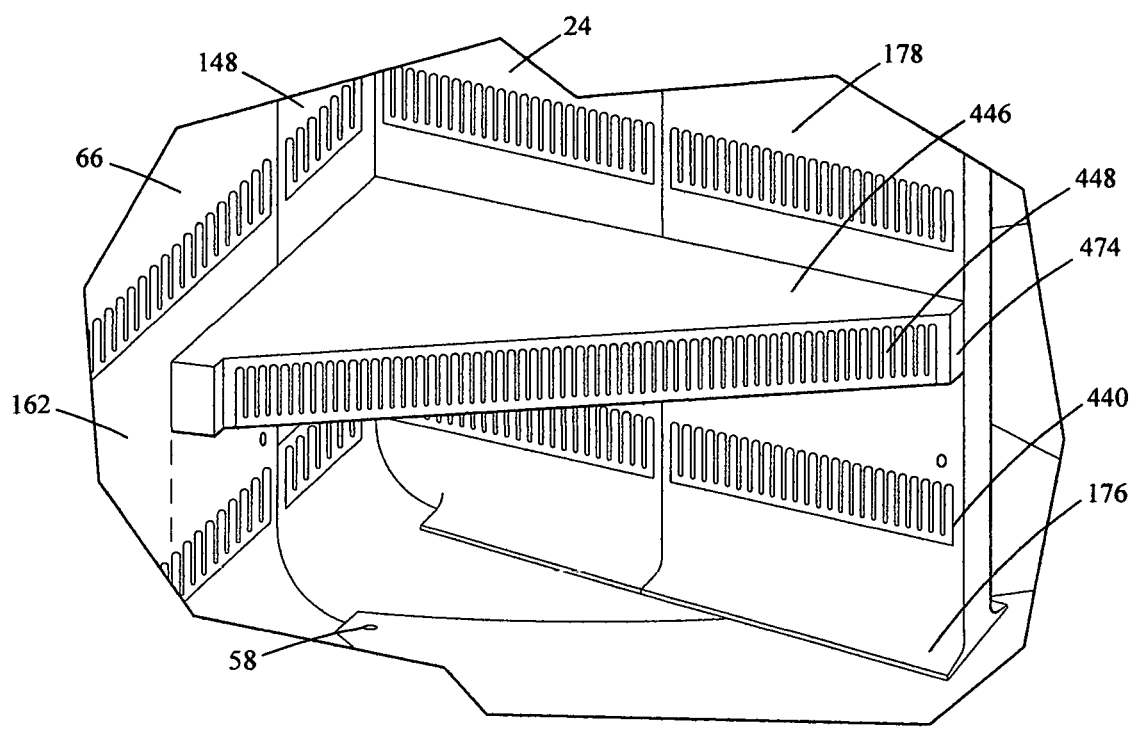
Figure 67:
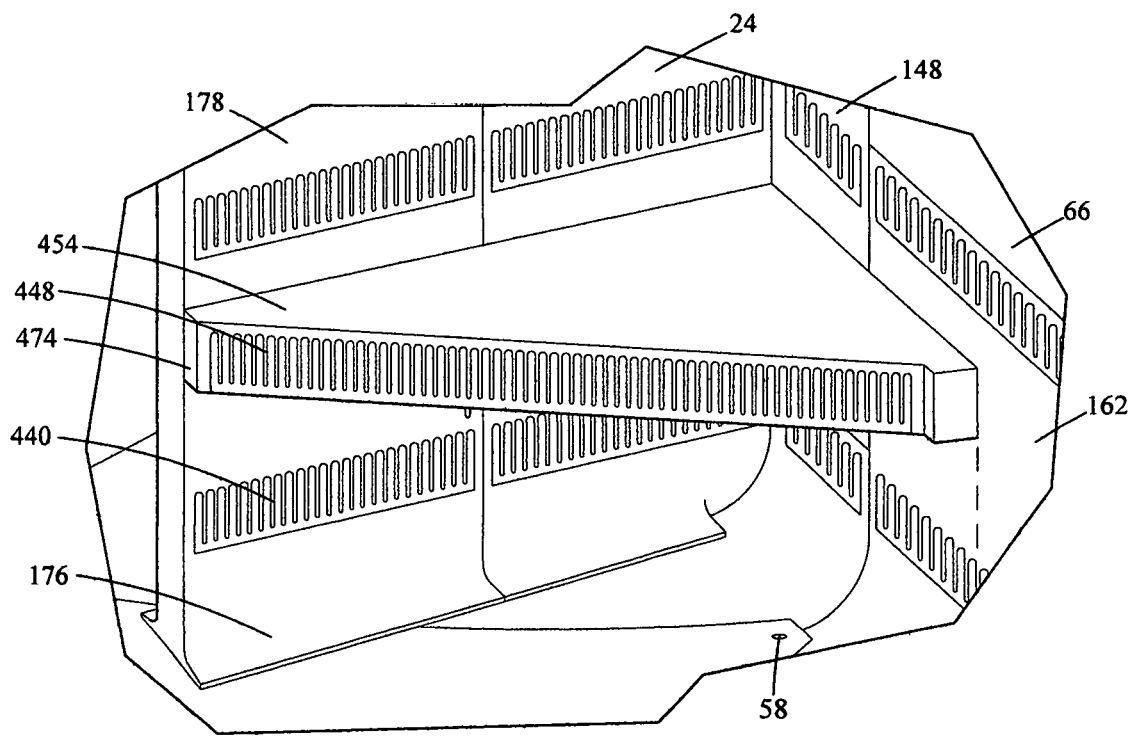

Referring to FIG. 66 and FIG. 67, which are mirror images of one another, there are illustrated perspective views of: vacuum ports 58, a first, triangular, corner floor-panel 446 and a second triangular corner floor-panel 454 aligned for mating with the bottom-floor female interlocks 440 of first interior-wall panels 24, second interior-wall panels 178, perimeter-toroid panels 162, and perimeter-wall panels 148 for providing the female interlocks of the diagonal, corner floor-panel sides 448. Additionally, there is illustrated: corner floor-panel tips 474, interior-wall footings 176, and the upper-perimeter panels 66 of the interlocking building system 10 of a first preferred embodiment.

Figure 68:
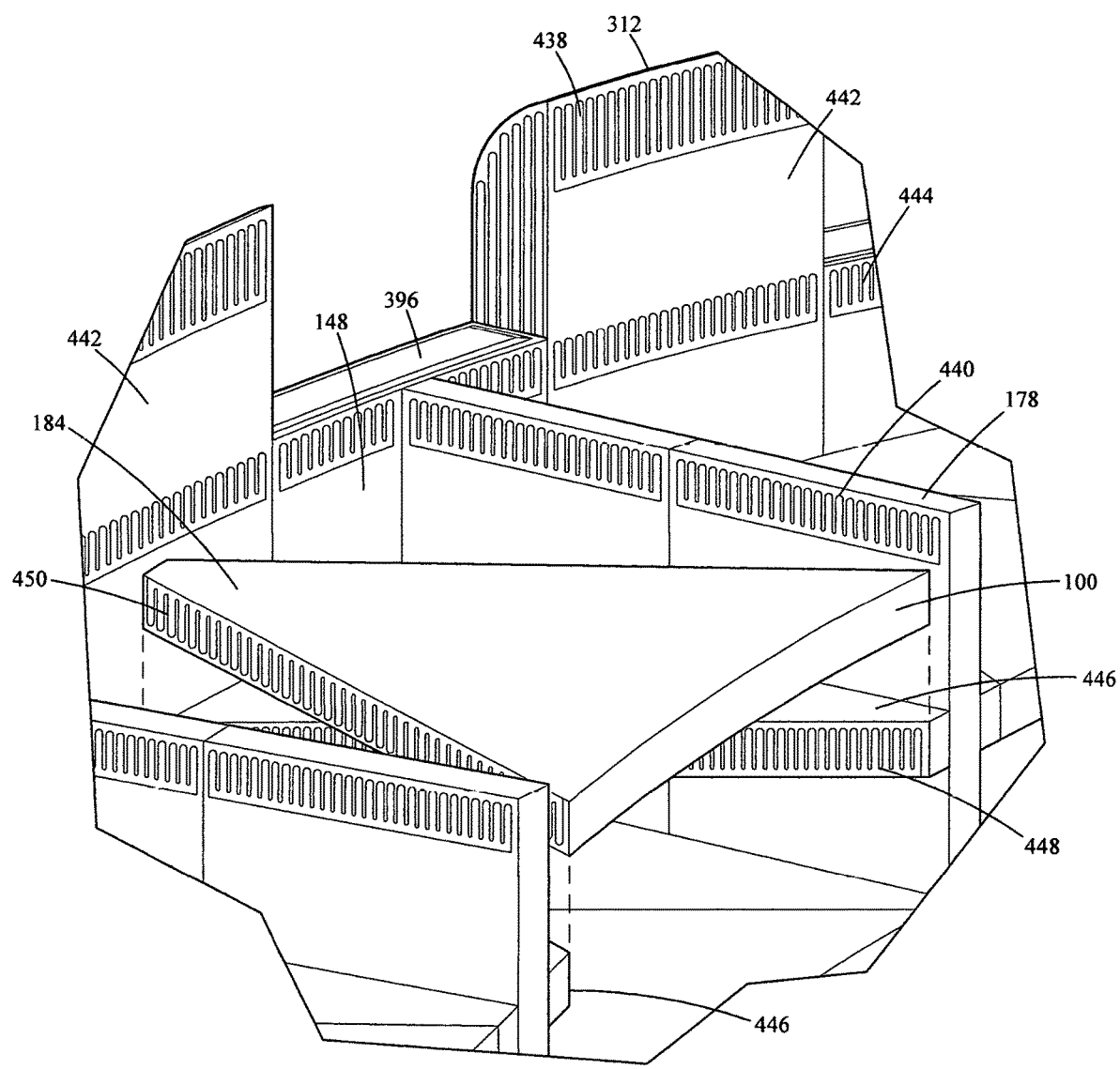

Referring to FIG. 68, there is illustrated a perspective view of the interlocking building system 10 of the first preferred embodiment, showing: the male side-interlocks 450 of a central triangular floor-panel 184 aligned for mating with the female-interlocks 448 of the corner floor-panels 446; the central panel having a facia 100 without interlocks. Further, there is shown: upper-perimeter panels 442; a perimeter-wall panel 148 having a panel top-plate 396; a segment of an upper-toroid 312; deep female enclosure-interlocks 438; and the female interlocks 440, 444 of a second interior-wall panel 178 and a perimeter-wall panel 148, respectively, of the interlocking building system 10, of the first preferred embodiment.

Figure 69:
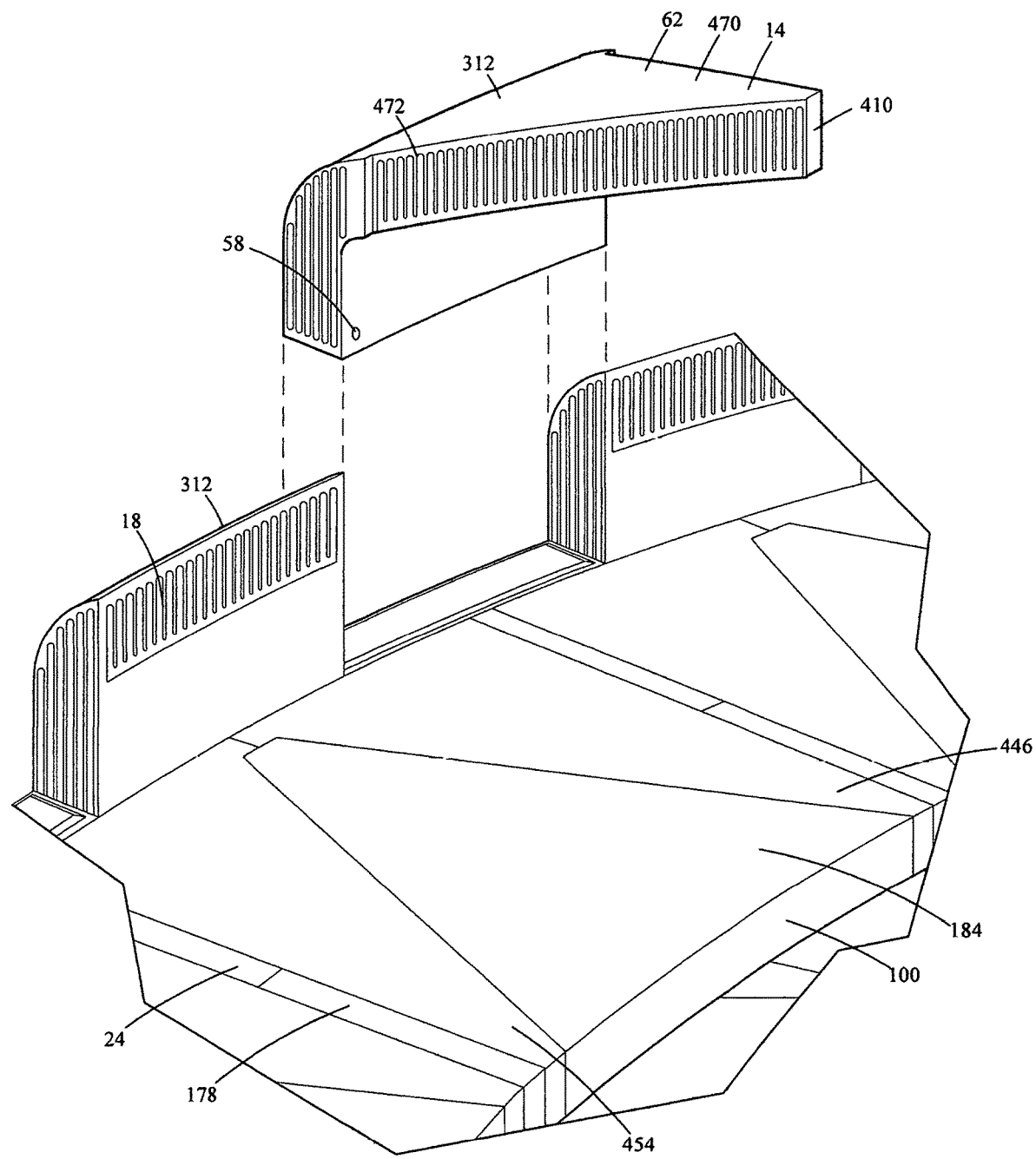

Referring now to FIGS. 69-74, there are illustrated perspective views of each type of panel placement of the dome of the interlocking building system 10, of the first preferred embodiment. In FIG. 69, there is illustrated a perspective view of the first preferred embodiment, showing: a vacuum port 58, a female dome-panel 470 aligned for mating with the deep female interlocks 18 of a perimeter-dome panel 62 having a segment of the upper toroid 312; the female dome-panel 470 having an integral outer skin 14, a panel tip 410, and female side-interlocks 472. Additionally, there is shown: a first, triangular, corner floor-panel 446; a second, triangular, corner floor-panel 454; a central triangular floor-panel 184; a first interior-wall panel 24, a second interior-wall panel 178; and a central-panel facia 100.

Figure 70:
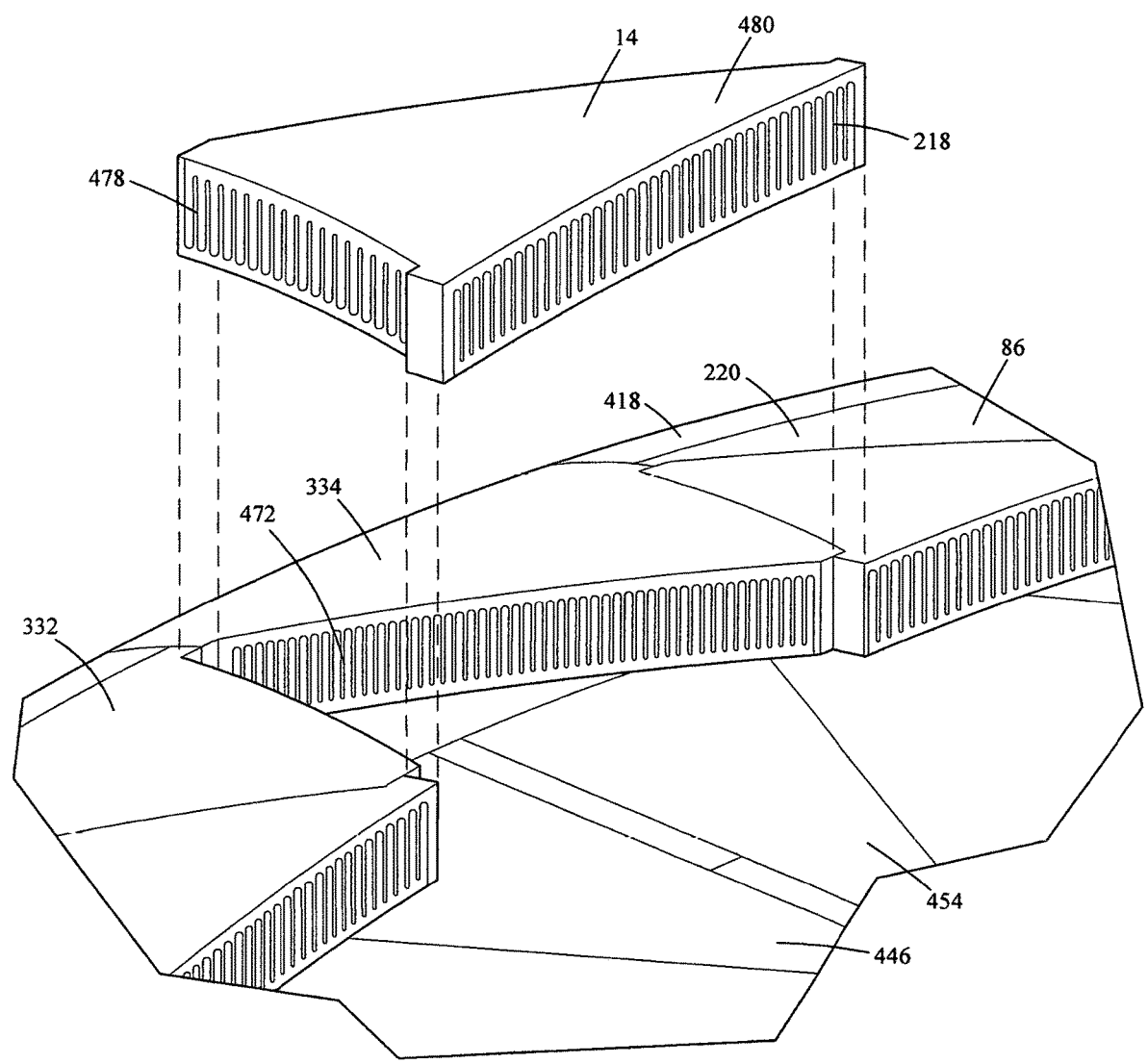
Figure 71:
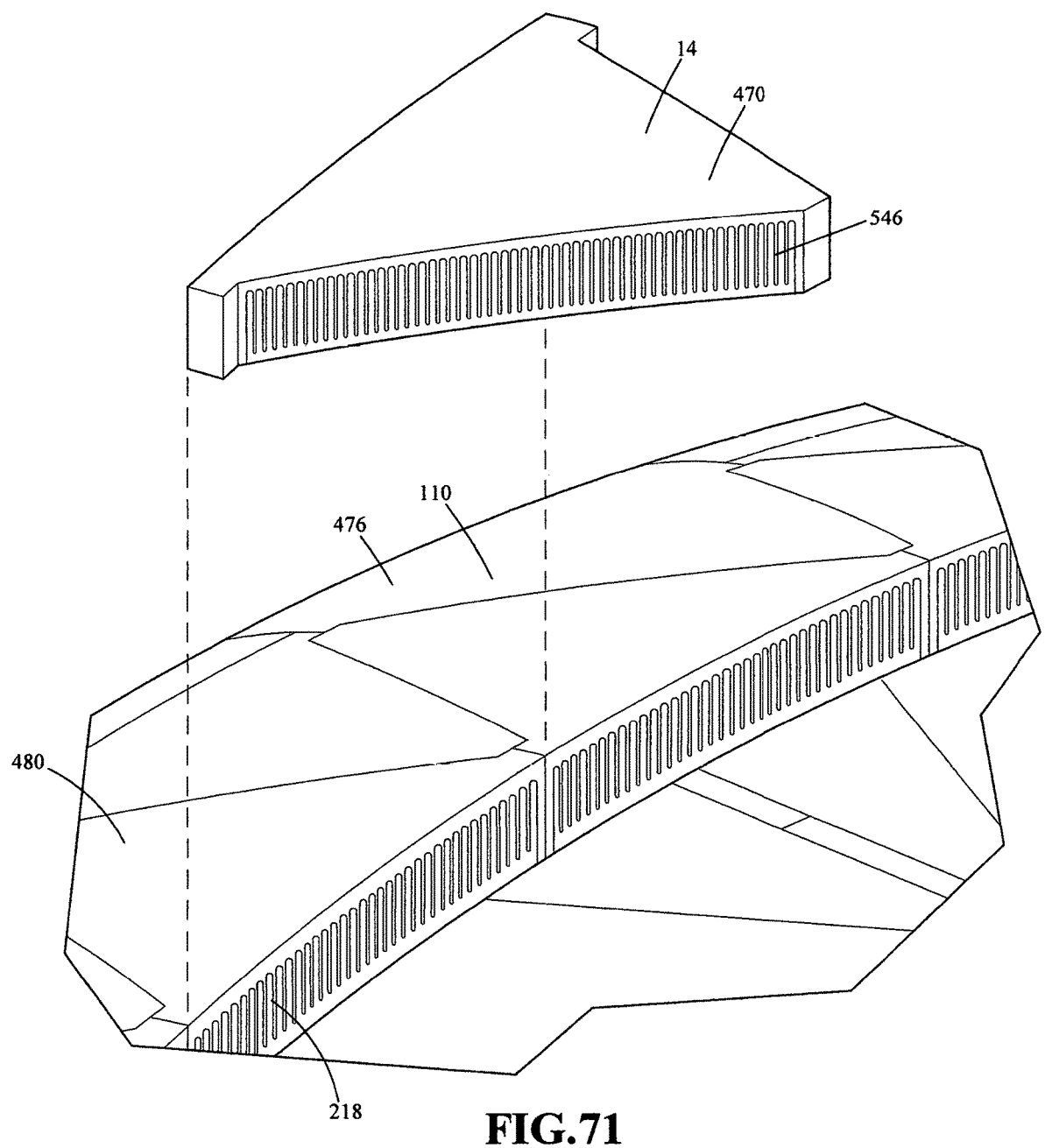

Referring to FIG. 70, there is illustrated: a perspective view of a male dome-panel 480 having an outer structural skin 14, a ring-segment of female interlocks 218, and two panel-braces with male interlocks 478 aligned for mating with the two female dome-panels 332, 334 of the first outer-row 220 of the spheric-dome 86. Additionally, there is illustrated: the upper-toroid 418; a first triangular corner floor-panel 446, a second triangular corner floor panel 454, and the female interlocks 472, of the female dome panel 334, of a first preferred embodiment of the interlocking building system 10. In FIG. 71, there is shown: a perspective view of a female dome-panel 470 aligned for mating with a ring-segment of female interlocks 218 of a male dome-panel 480; the female dome-panel 470 having a double-curved structural skin 14 of a dome perimeter 110, and the female interlocks 546 of the female dome-panel 470 of a first preferred embodiment of the interlocking building system 10.

Figure 72:
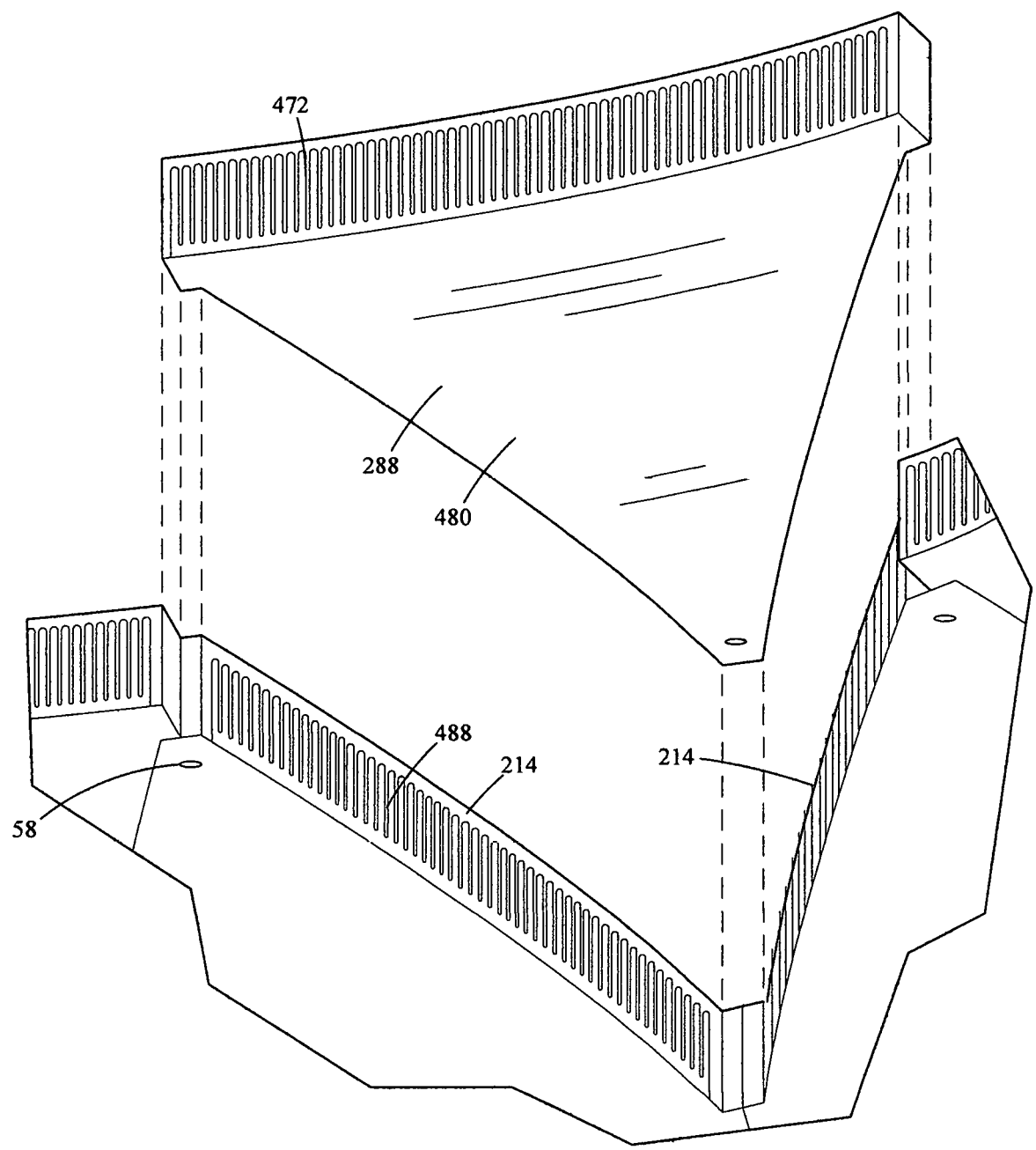
Figure 73:
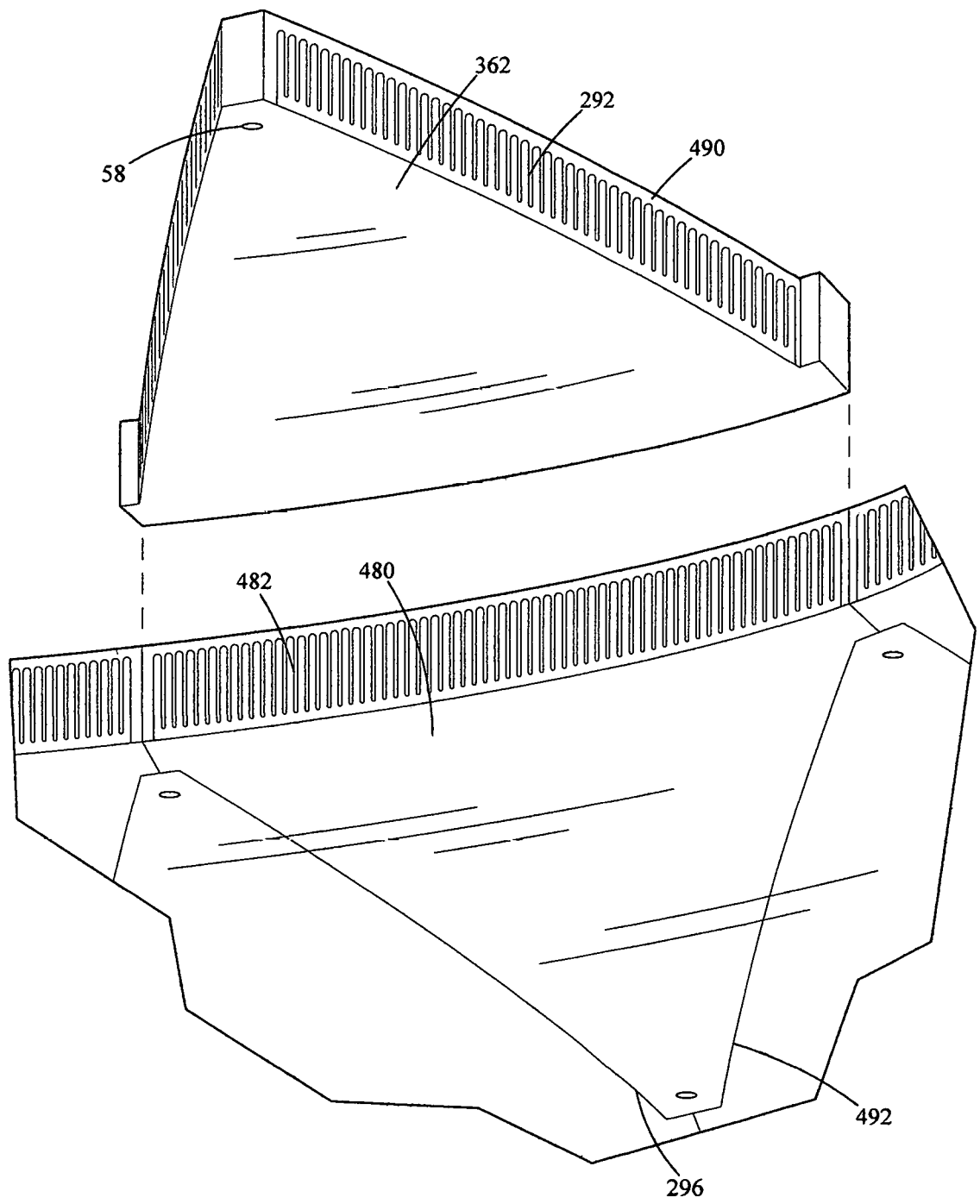
Figure 74:
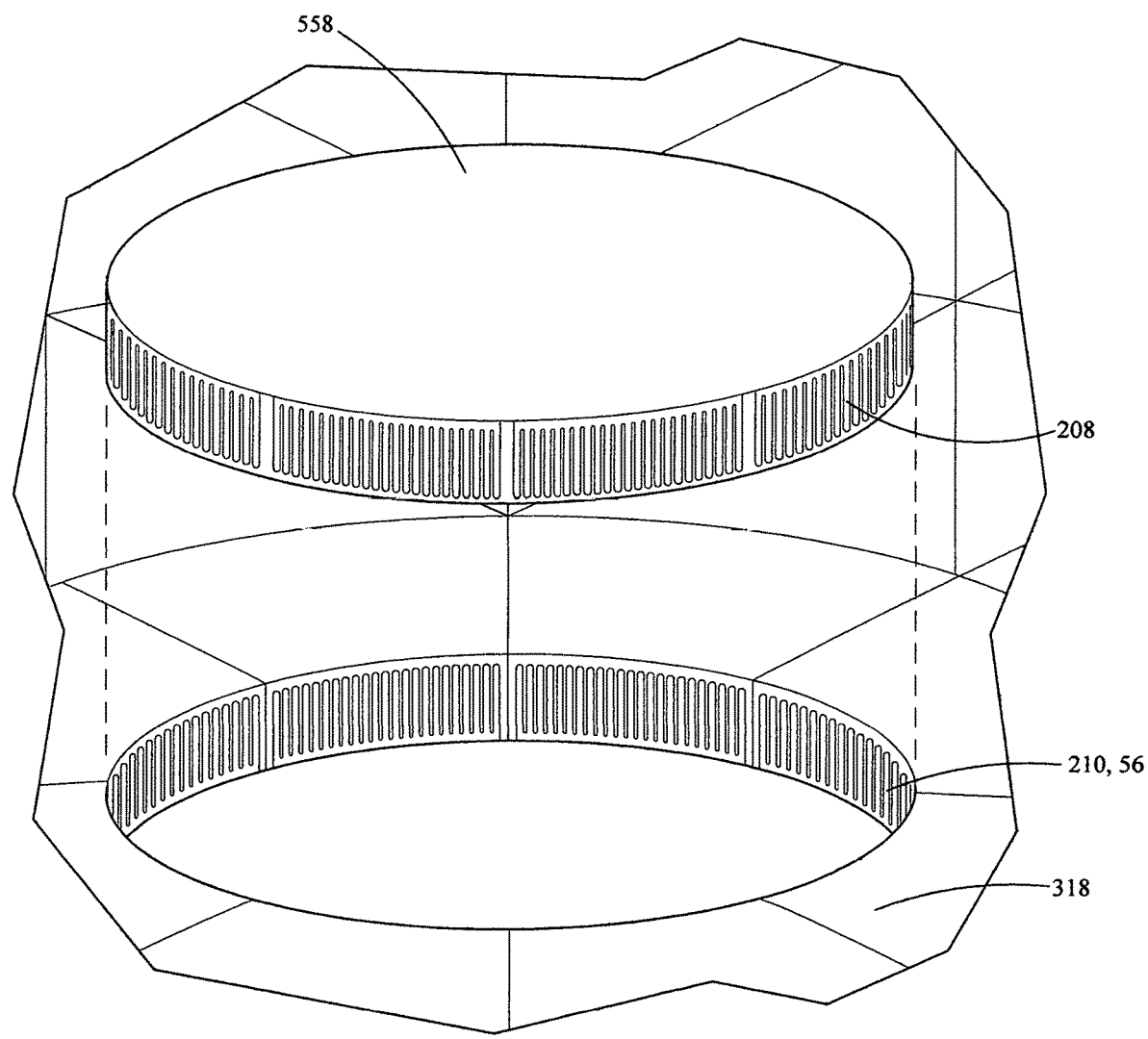

Referring to FIG. 72, there is illustrated a perspective view of the interlocking building system 10 of the first preferred embodiment, showing: vacuum ports 58, a male dome-panel 480 aligned for mating with the female interlocks 488 of the two bracing panel-sides 214. Further, there is shown: the lower interior panel-skin 288 and the female interlocks 472 of the male dome-panel 480 having a concave-downward spheric slope of the interlocking building system 10 of the first preferred embodiment. Referring to FIG. 73, there is illustrated a perspective view of: vacuum ports 58, a female dome-panel 362 aligned for mating with the curved horizontal strip of female interlocks 482 of the male dome-panel 480, and having female side-interlocks 292 of a curved concave-downward side 490, further showing the seams of adjacent panel sides 296, 492. Referring to FIG. 74, there is illustrated a perspective view of the circular, male, dome-apex panel 558 having male tongues and grooves 208 aligned for mating with the female vertical tongues 210 and the female vertical grooves 56 of the opening below, and the top row of curved trapezoidal dome panels 318 of the first preferred embodiment.

Accordingly, there are a number of advantages provided by the present invention. Each panel of the interlocking building system has a structural interlocking perimeter with one or two integral structural skins and integral, internal, perforated triangular bracing, thus providing the advantage of high-resistance to extreme loads from natural and man-made disasters, such as, but not limited to: bomb explosions, earthquakes, liquifaction, tornadoes, hurricanes, tsunamis, floods, wildfires, avalanches, mudslides, volcanic explosions, and continental drift.

Also, the durable tongue and groove connections of the panels fully slide-lock with the durable tongue and groove connections of adjacent panels, providing the advantage of a joint having high-resistance to the extreme loads of natural and man-made catastrophes.

Further, the vertical interlocks throughout the interlocking panel assemblies allow for buildings and panels to have virtually any profile at all, providing the advantage of broad design flexibility.

Further yet, the rounded overall building shape is entirely convex-outward, providing the advantage of high resistance to all loads acting on the enclosure from the outside, whether they are from above, below, or the sides.

Furthermore, the exterior of a completed building assembly is completely smooth, providing the advantage of high-resistance to the high winds of tornadoes and hurricanes.

Moreover, upper and lower courses of automatic snap joints lock panels in position after the panels slide into place, providing the advantage of full structural integrity in a single sliding motion.

Further, the interlocking building system is free of welds, rivets, screws, bolts, adhesives, siding, roofing, and interior gypsum boards, providing the advantage of simple building construction.

Also, all panels of the interlock system are made from a high-performance steel or alloy, providing the advantages of high corrosion-resistance, high specific-strength, and a high service-temperature.

Also, all panels of the interlock system are made from a single metal, steel, or alloy, providing the advantages of uniform thermal expansion and contraction and resistance to electrogalvanic corrosion.

I claim:

1. A building assembly comprising:
a plurality of structural skin-and-frame panels, wherein a first one of said structural skin-and-frame panels adjacent to a second one said structural skin-and-frame panels is in a slide-locking relationship in a direction of the Z-axis for providing gravity-assisted slide-locking, each of said structural skin-and-frame panels defined by two spaced parallel face plates integral with at least one internal brace plate and at least one circular perforation, a first portion of said structural skin-and-frame panels being a male panel with at least two of a male side plate being integral with respective ones said spaced parallel face plates and having a plurality of male interlocks, a second portion of said structural skin-and-frame panels being a female panel with at least two of a female side plate integral with respective ones of said spaced parallel face plates and having a plurality of female interlocks, each of said male side plates having a solid header extending across a full length of said respective ones of said male side elates, and respective ones of said female side plates are integral with a solid footer extending across a full length of said respective ones of said female side plates,
each of said male interlocks comprising a groove defined by a central slide-locking channel having an opening with widening semi-circular sides at a first end and having a semi-circular pocket formed into said solid header at a second end opposite said first end of said central slide-locking channel, each of said female interlocks comprise a groove defined by a central slide-locking channel and having an opening with widening semi-circular sides at a second end opposite said first end of female interlock and having a semi-circular pocket formed into a respective one of said solid footers at said first end of said respective ones of said central slide-locking channels, each said groove of said male side plate and said female side plate being configured to receive a solid tongue defined by a straight segment integral with a semi-circular tongue tip, said building assembly further comprising:
(a) said straight segment further defined by a symmetrical cross-section parallel with the X-Y plane,
(b) said semi-circular tongue tip defined by a 180-degree rotation,
(c) said grooves and said solid tongues of said male and said female interlocks being adjacent to one another and repeating together at a regular interval along said full length of said male side plate and said female side plate, respectively, such that a plurality of said solid tongues completely inserts into an equal number of said grooves in a sliding manner,
(d) said skin-and-frame panels being shaped to assemble and forming a spherical foundation having a first toroidal rim supporting a cylindrical perimeter wall with a second toroidal rim that supports a spherical dome, said cylindrical perimeter wall braced by a plurality of multi-story interior walls normal to said cylindrical perimeter wall and together supporting at least a first ring-shaped floor,
(e) each said male side plates of said structural skin-and-frame panels having a plurality of female snap-lock cavities on opposite sides of said male interlocks, and each said female side plates of said structural skin-and-frame panels having a plurality of male snap-lock cavities on opposite sides of said female interlocks, each said male snap-lock cavity comprising a rectangular opening having a first rectangular depth wherein a rectangular block of a compressible solid is adhered to a surface of said male snap-lock cavity,
(f) said structural skin-and-frame panels of said spherical foundation and said spherical dome along with said ring-shaped floor having a maximum of three corner plates parallel with said Z-axis, a first of said corner plates defined by one of a straight surface whereas each of a second and a third of said corner plates is defined by a straight surface normal to said male side plate or said female side plate, said corner plates dimensioned to contact a respective one of said corner plates of an adjacent one of said structural skin-and-frame panels,
(g) each of said structural skin-and-frame panels comprising an airtight enclosure wherein a vacuum is retained as a sound insulator and as a heat insulator, said skin-and-frame panels including a threaded quarter-turn ball valve in a threaded hole.

2. The building assembly according to claim 1 wherein a single material forms said structural skin-and-frame panels of said building assembly.

3. The building assembly according to claim 2 wherein said single material is stainless-steel.

4. The building assembly according to claim 2 wherein said single material is a metal-ceramic composite.

5. The building assembly according to claim 1 wherein said structural skin-and-frame panels are formed of sheet metal.

6. The building assembly according to claim 1 wherein said building assembly has no bolts, rivets, screws or nails.

7. The building assembly according to claim 1 wherein each said male side plate and each said female side plate is coated with a compressible solid lubricant.

8. The building assembly according to claim 1 wherein said structural skin-and-frame panels form a sphere or a toroid.

9. The building assembly according to claim 1 wherein each said upper perimeter panel comprises at least a first structural window cylinder.

10. The building assembly according to claim 1 wherein at least a first of said structural skin-and-frame panels of said spherical dome comprise a structural skylight cylinder.

11. The building assembly according to claim 1 wherein said structure is geodesic in shape.

12. The building assembly according to claim 1 wherein said building assembly comprises an entirely convex-out enclosure.

* * * * *